(12) United States Patent
Maruyama

(10) Patent No.: US 12,034,893 B2
(45) Date of Patent: Jul. 9, 2024

(54) IMAGE FORMING APPARATUS AND INFORMATION PROCESSING APPARATUS, CAPABLE OF PERFORMING MEMORY RECEPTION OF FACSIMILE DATA, METHODS OF CONTROLLING IMAGE FORMING APPARATUS AND INFORMATION PROCESSING APPARATUS, AND STORAGE MEDIUM

(71) Applicant: CANON KABUSHIKI KAISHA, Tokyo (JP)

(72) Inventor: Naoki Maruyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/363,010

(22) Filed: Aug. 1, 2023

(65) Prior Publication Data
US 2024/0048660 A1 Feb. 8, 2024

(30) Foreign Application Priority Data
Aug. 3, 2022 (JP) .................. 2022-124177

(51) Int. Cl.
*G06F 15/00* (2006.01)
*H04N 1/00* (2006.01)
(52) U.S. Cl.
CPC ....... *H04N 1/0044* (2013.01); *H04N 1/00244* (2013.01); *H04N 1/00328* (2013.01); *H04N 1/00464* (2013.01)

(58) Field of Classification Search
None
See application file for complete search history.

(56) References Cited

U.S. PATENT DOCUMENTS

| | | | | |
|---|---|---|---|---|
| 2004/0174558 | A1* | 9/2004 | Mori | .............. H04N 1/00244 358/1.15 |
| 2014/0036299 | A1* | 2/2014 | Norota | .............. G06F 3/121 358/1.14 |

FOREIGN PATENT DOCUMENTS

JP     2004215083 A     7/2004

\* cited by examiner

*Primary Examiner* — Mark R Milia
(74) *Attorney, Agent, or Firm* — ROSSI, KIMMS & McDOWELL LLP

(57) ABSTRACT

An image forming apparatus includes a communication section configured to receive facsimile data, a console section, a print unit configured to perform printing on a sheet, and a CPU configured to determine whether or not facsimile data received by the communication section can be printed by the print unit. In a case where the facsimile data cannot be printed by the print unit, the CPU displays a screen for enabling a facsimile image of the facsimile data to be displayed on at least an external device. The screen includes a two-dimensional code which enables access to a Web page for displaying the facsimile image on the external device, and the two-dimensional code includes a URL for viewing the facsimile image and authentication information for accessing the image forming apparatus.

14 Claims, 43 Drawing Sheets

TOKEN MANAGEMENT DB 600

| Index | IN USE? | TOKEN | SESSION ID | FAX RECEPTION NUMBER | ACCESS-PERMITTED PAGE |
|---|---|---|---|---|---|
| 1 | TRUE | "TKN123" | "A123456" | FAX0001 | faxPrev.html |
| 2 | FALSE | "TKN456" | "" | FAX0001 | faxPrev.html |

601
602

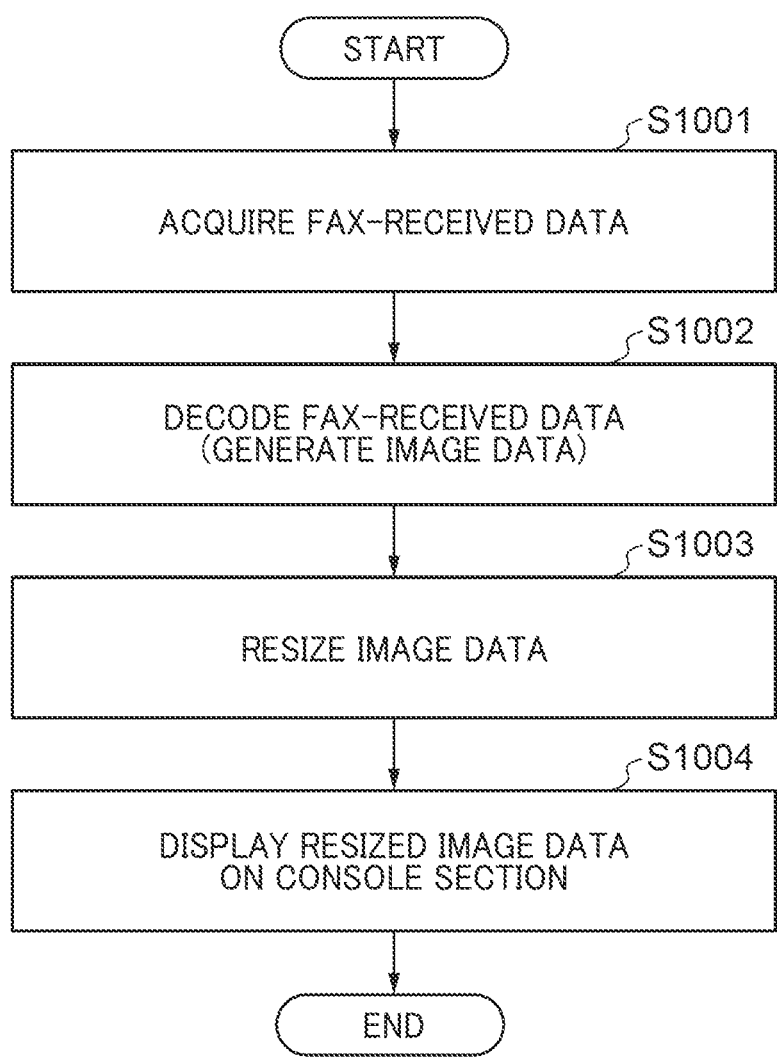

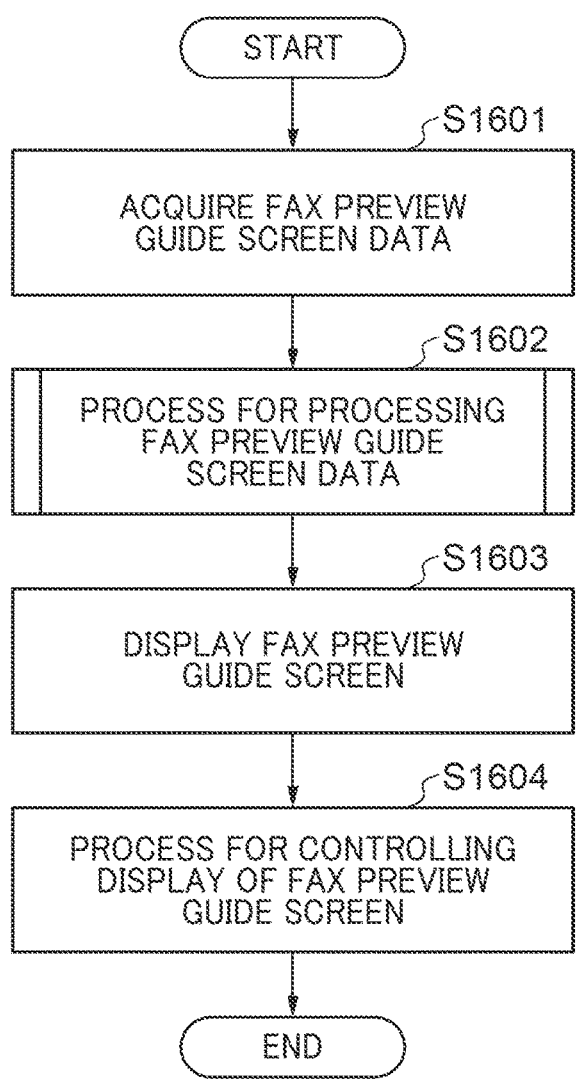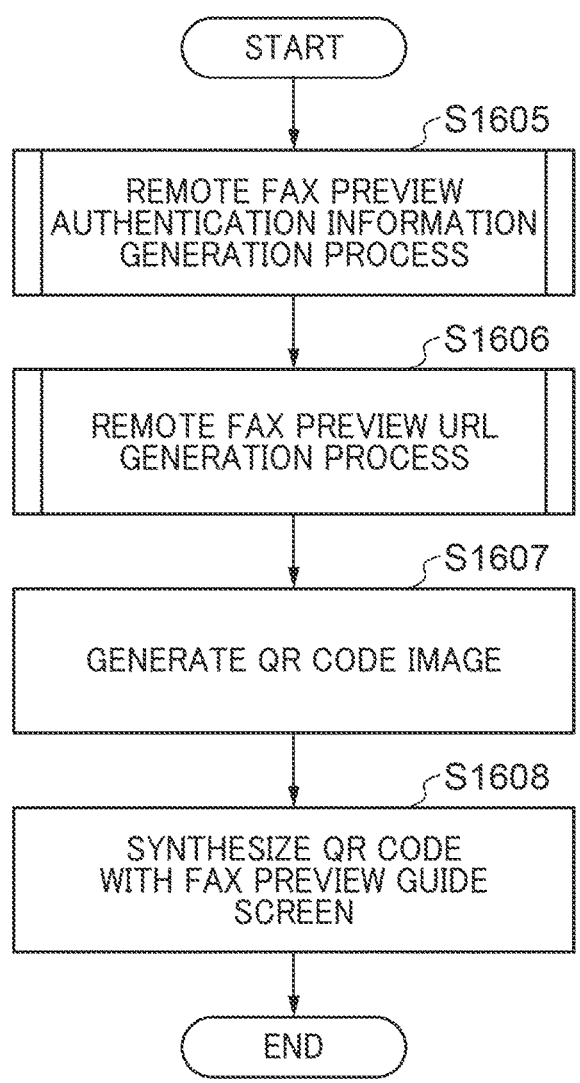

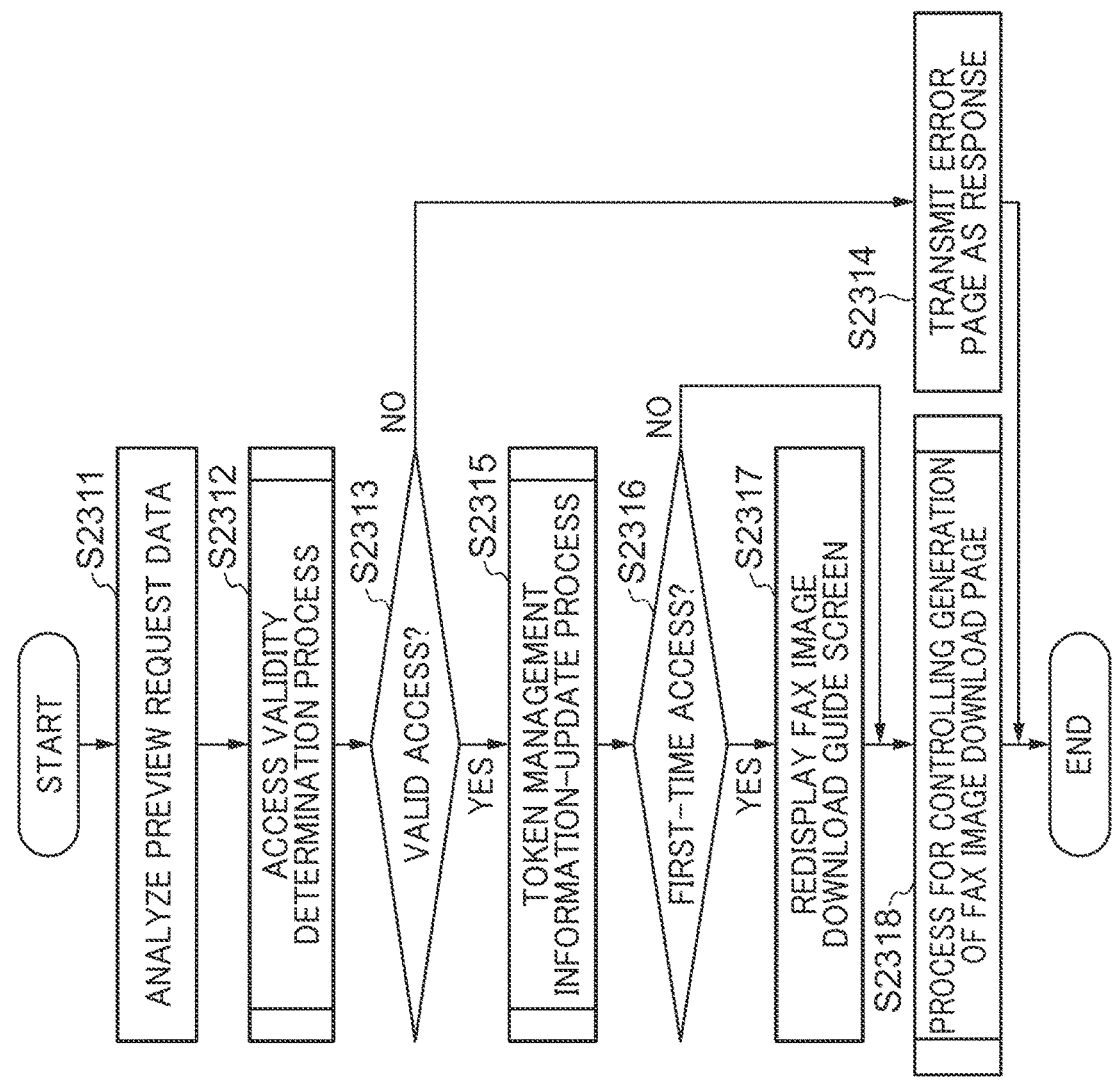
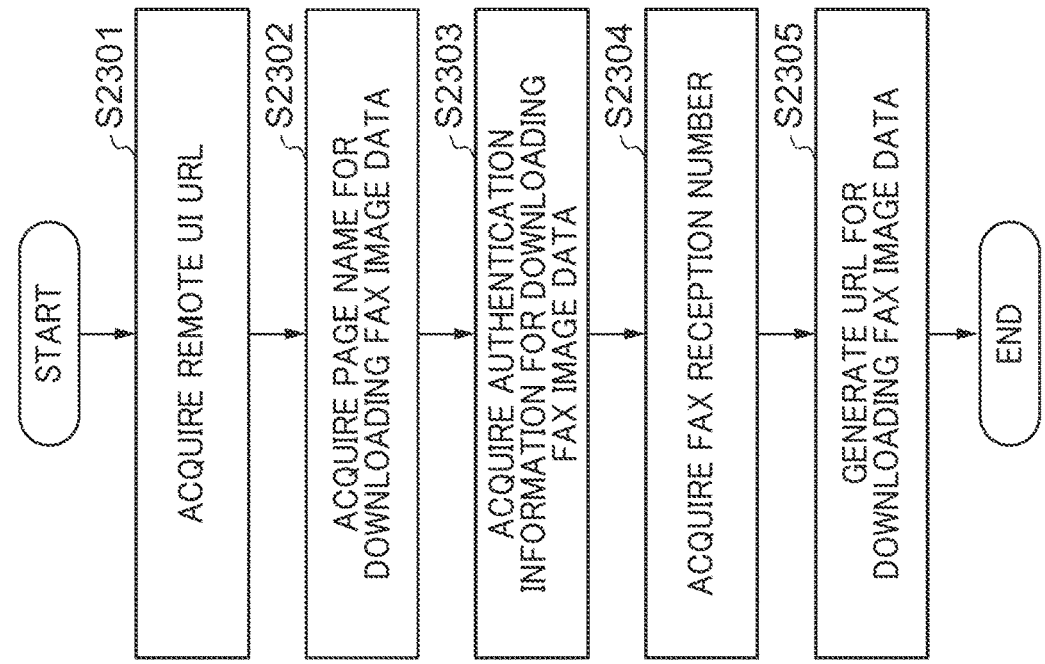

IMAGE FORMING APPARATUS AND INFORMATION PROCESSING APPARATUS, CAPABLE OF PERFORMING MEMORY RECEPTION OF FACSIMILE DATA, METHODS OF CONTROLLING IMAGE FORMING APPARATUS AND INFORMATION PROCESSING APPARATUS, AND STORAGE MEDIUM

BACKGROUND OF THE INVENTION

Field of the Invention

The present invention relates to an image forming apparatus and an information processing apparatus, control methods, and a storage medium, and more particularly to control performed in a case where an apparatus equipped with a function of receiving facsimile data is in a state incapable of printing received data.

Description of the Related Art

In an image forming apparatus equipped with a facsimile function, there is known a technique in which if toner is insufficient for printing facsimile-received data (hereinafter referred to as the "FAX-received data"), facsimile printing is switched to memory reception without printing the received data (see e.g. Japanese Laid-Open Patent Publication (Kokai) No. 2004-215083). According to this technique, it is possible to prevent a printout having an unclear image from being generated e.g. due to a faint print, and further, it is possible to prevent such a problem that a user is required to request a transmission source to retransmit the facsimile data (hereinafter referred to as the "FAX data").

However, in the technique described in Japanese Laid-Open Patent Publication (Kokai) No. 2004-215083, a user of the image forming apparatus having received FAX data is required to actively execute a facsimile preview (hereinafter referred to as the "FAX preview") to confirm the FAX data received by memory reception by viewing an image thereof. When executing the FAX preview, if the user has never used a memory reception setting, the user does not know how to confirm the data using the FAX preview and is required to perform an operation e.g. by referring to an operation manual of the apparatus, which lowers the usability. Further, in the image forming apparatus described in Japanese Laid-Open Patent Publication (Kokai) No. 2004-215083, if toner is insufficient, facsimile printing is automatically switched to memory reception, and hence there is a possibility that a user does not notice that FAX data has been received.

SUMMARY OF THE INVENTION

The present invention provides a technique that enables, when memory reception of FAX data is performed, a user to easily confirm the FAX data by FAX preview.

In a first aspect of the present invention, there is provided an image forming apparatus including a communication section configured to receive facsimile data, a display section, a print unit configured to perform printing on a sheet, a first determination unit configured to determine whether or not facsimile data received by the communication section can be printed by the print unit, and a control unit configured to, in a case where the facsimile data cannot be printed by the print unit, display on the display section a screen for enabling a facsimile image of the facsimile data to be displayed on at least an external device, wherein the screen includes a two-dimensional code which enables access to a Web page for causing the facsimile image to be displayed on the external device, and wherein the two-dimensional code includes a URL for viewing the facsimile image and authentication information for accessing the image forming apparatus.

In a second aspect of the present invention, there is provided an information processing apparatus including a communication section configured to receive facsimile data and enable communication with a printer, a display section, a determination unit configured to determine whether or not the facsimile data received by the communication section can be printed by the printer, and a control unit configured to, in a case where the facsimile data cannot be printed by the printer, display on the display section a screen for enabling a facsimile image of the facsimile data to be displayed on at least an external device, wherein the screen includes a two-dimensional code which enables access to a Web page for causing the facsimile image to be displayed on the external device, and wherein the two-dimensional code includes a URL for viewing the facsimile image and authentication information for accessing the information processing apparatus.

According to the present invention, it is possible to provide a technique that enables, when memory reception of FAX data is performed, a user to easily confirm the FAX data by FAX preview.

Further features of the present invention will become apparent from the following description of exemplary embodiments (with reference to the attached drawings).

BRIEF DESCRIPTION OF THE DRAWINGS

FIG. 4 is a diagram showing a conventional execution procedure of the FAX preview on a mobile terminal.

FIG. 6 is a diagram showing an example of a token management database for managing authentication information in the multifunction peripheral.

FIG. 10 is a flowchart of a local FAX preview control process in a step in FIG. 9A.

FIG. 16A is a flowchart of a process for controlling the display of the FAX preview guide screen shown in FIG. 15.

FIG. 16B is a flowchart of a process for processing FAX preview guide screen data.

FIG. 23A is a flowchart of a URL generation process for generating a URL for downloading a FAX image in the fifth embodiment.

FIG. 23B is a flowchart of a display control process for displaying a FAX image DL page on a touch panel of a mobile terminal.

DESCRIPTION OF THE EMBODIMENTS

The present invention will now be described in detail below with reference to the accompanying drawings showing embodiments thereof.

Figure 1:
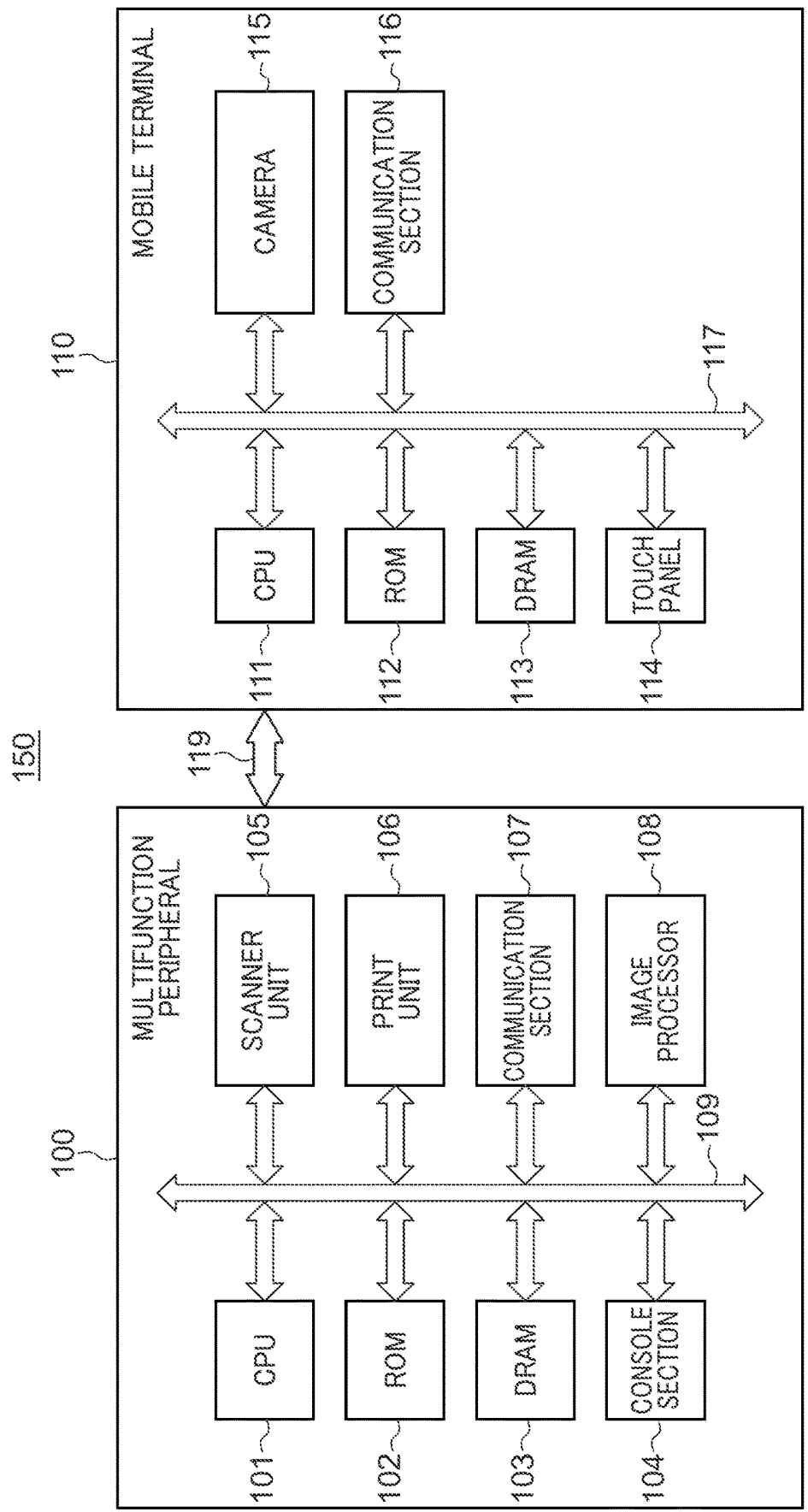
FIG. 1 is a diagram showing a schematic configuration of an information processing system according to a first embodiment of the present invention.

As an image forming apparatus of an information processing system according to a first embodiment of the present invention, there will be described a multifunction peripheral (MFP). FIG. 1 is a diagram showing a schematic configuration of the information processing system, denoted by reference numeral 150. The information processing system 150 is formed by communicably connecting the multifunction peripheral, denoted by reference numeral 100, and a mobile terminal 110, via a network 119. A user of the mobile terminal 110 can access the multifunction peripheral 100 from the mobile terminal 110 to confirm a variety of information of the multifunction peripheral 100, and further, transmit print data from the mobile terminal 110 to the multifunction peripheral 100 to print the print data by the multifunction peripheral 100.

The multifunction peripheral 100 includes a central processing unit (CPU) 101, a read only memory (ROM) 102, a dynamic random access memory (DRAM) 103, a console section 104, a scanner unit 105, a print unit 106, a communication section 107, and an image processor 108, and these components are communicably connected via a data bus 109.

The CPU 101 is system controlling means for controlling the overall operation of the multifunction peripheral 100 and performs centralized control of the operations of the components of the multifunction peripheral 100 by loading a variety of programs, including control programs stored in the ROM 102, into a work area of the DRAM 103. The ROM 102 is nonvolatile storing means, such as a flash memory (e.g. an embedded multi-media card (eMMC)). The ROM 102 stores a variety of control programs which can be executed by the CPU 101, and further, can also store image data and the like. The DRAM 103 is volatile storing means for storing program control variables and the like, and further, has a storage area for temporarily storing image data and the like processed by the CPU 101 and the work area used by the CPU 101 to load programs therein.

The console section 104 has a touch panel formed by superimposing touch sensors for receiving a touch operation of a user on a display panel, such as a liquid crystal display, for displaying a variety of information of the multifunction peripheral 100, and functions as an interface with a user. The user can perform an intuitive operation by tapping an icon or the like displayed on the display panel. Note that the console section 104 has not only the touch panel, but also buttons, switches, and the like, which are mechanical input means.

The scanner unit 105 optically reads an original (sheet surface) and converts the read data to binary data. The image data generated by reading the original using the scanner unit 105 can be transmitted to the mobile terminal 110 or transmitted to another image forming apparatus, not shown, as FAX data via the communication section 107. The following description of the present embodiment will be given assuming that the print unit 106 is configured to perform printing (image formation) on a recording sheet by an electrophotographic method.

The communication section 107 is an interface for enabling bi-directional communication with an external apparatus, including the mobile terminal 110, via the network 119, and for example, the communication section 107 receives FAX data from an external multifunction peripheral (not shown) and further, receives print data from the mobile terminal 110. The image processor 108 is implemented e.g. by an application specific integrated circuit (ASIC) that performs image processing, such as resolution conversion, compression/decompression, and rotation, on input image data from an external apparatus and the scanner unit 105, and output image data to be transmitted from the multifunction peripheral 100 to an external apparatus, such as the mobile terminal 110.

The mobile terminal 110 includes a CPU 111, a ROM 112, a DRAM 113, a touch panel 114, a camera 115, and a communication section 116, and these components are communicably connected via a bus 117. The mobile terminal 110 is a smartphone, a tablet PC or the like, but is not limited to these.

The CPU 111 is system controlling means for controlling the overall operation of the mobile terminal 110 and performs centralized control of the operations of the components of the mobile terminal 110 by loading a variety of programs, including control programs stored in the ROM 112, into a work area of the DRAM 113. For example, the CPU 111 reads and executes an application, such as a browser or a QR code reader ("QR code" is a registered trademark), stored in the ROM 112. The ROM 112 is nonvolatile storing means, such as a flash memory (e.g. an eMMC). The ROM 112 stores a variety of control programs which can be executed by the CPU 111, and further, can also store a variety of data. The DRAM 113 is volatile storing means for storing program control variables, and further, has a storage area for temporarily storing a variety of data processed by the CPU 111 and the work area used by the CPU 111 to load programs therein.

The touch panel 114 is formed by superimposing touch sensors for receiving a touch operation of a user on a display panel, such as a liquid crystal display, for displaying a variety of information in the mobile terminal 110, and functions as an interface with a user. The camera 115 is a device for photographing an object and converting the photographed image to binary data. For example, when a QR code is photographed by the camera 115 in a state in which the QR code reader has been started, it is possible to display information included in the QR code on the touch panel 114. The communication section 116 is an interface for enabling bi-directional communication with external apparatuses including the multifunction peripheral 100, via the network 119.

Figure 2A:
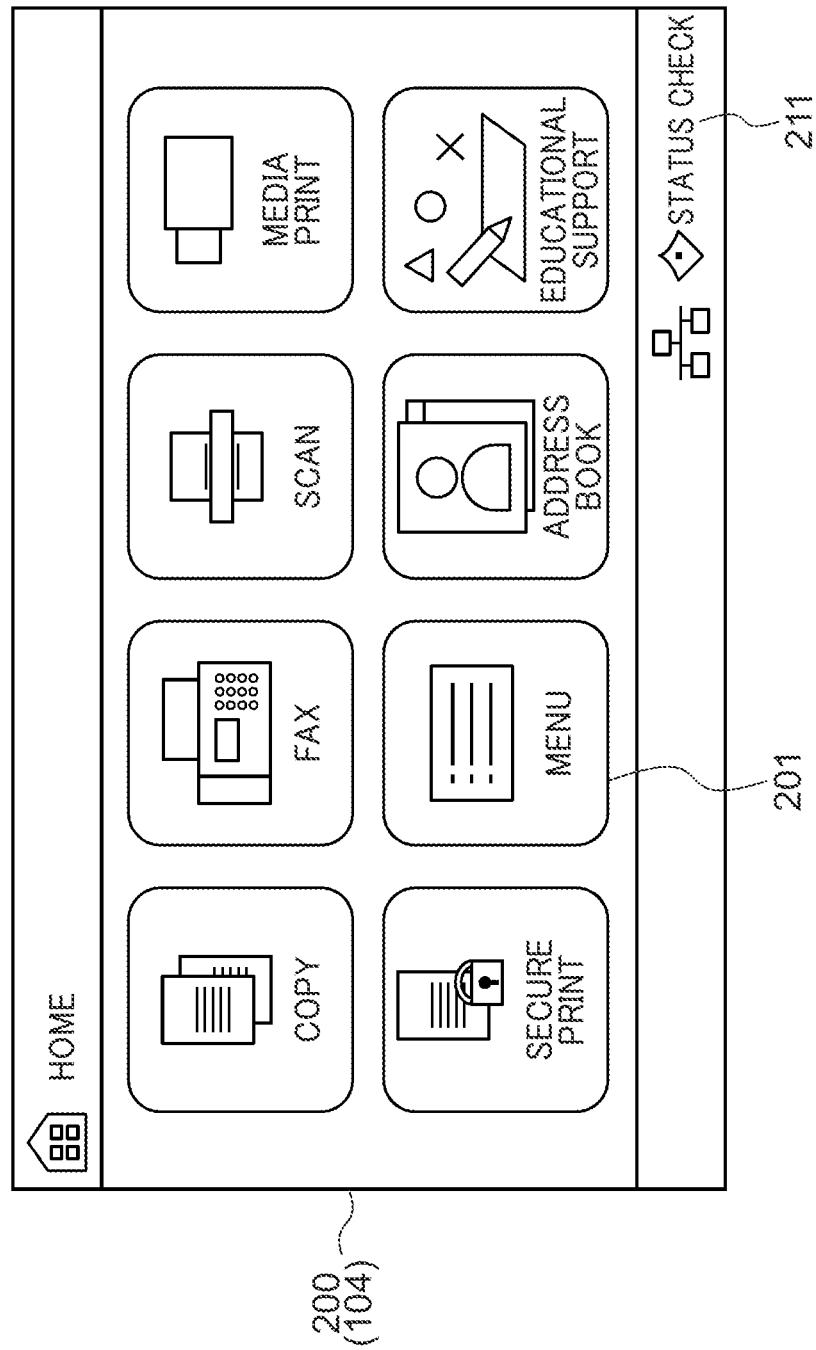
FIGS. 2A to 2D are diagrams each showing an example of a display screen on a console section of a multifunction peripheral appearing in FIG. 1.
Figure 2B:
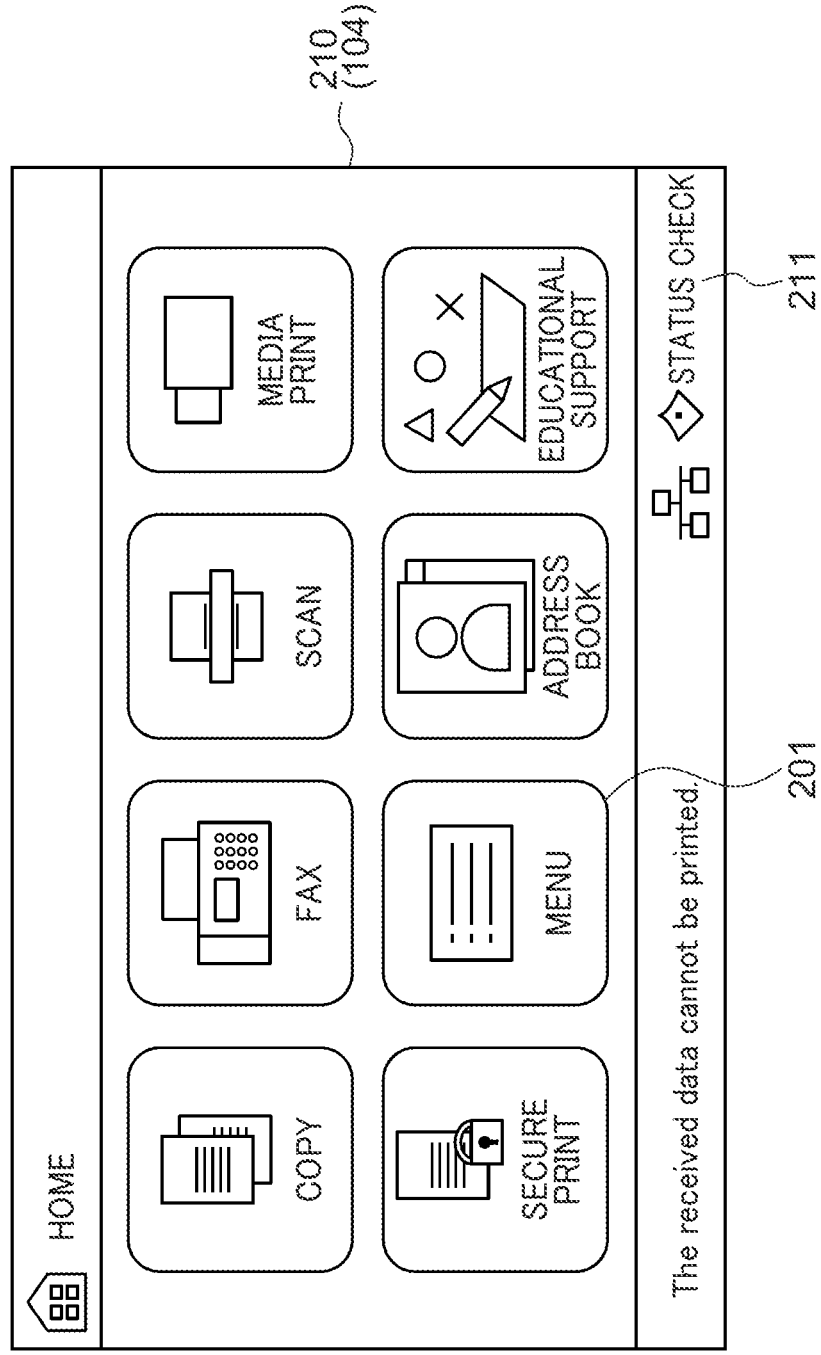

FIGS. 2A and 2B are diagrams each showing an example of a display screen on the console section 104 of the multifunction peripheral 100. FIG. 2A shows a screen displayed on the console section 104 e.g. immediately after the multifunction peripheral 100 is started up, and the illustrated screen is a home screen 200 displayed in a case where there is no notification to a user (hereinafter referred to as the "first home screen 200"). When a user performs a tap operation (hereinafter referred to as "pressing") on one of icons displayed on the first home screen 200, which corresponds to processing desired by the user, a screen associated with the pressed icon is displayed.

FIG. 2B shows a home screen 210 displayed in a case where there is a notification to a user (hereinafter referred to as the "second home screen 210"). On the bottom part of the second home screen 2100, there are displayed states of the scanner unit 105 and the print unit 106 and information on various types of jobs executed by the multifunction peripheral 100, including a state or result of transmission/reception of data to and from an external apparatus. In the illustrated example shown in FIG. 2B, a state of the multifunction peripheral 100 in which FAX-received data cannot be printed on a recording sheet is notified to a user by the display of "The received data cannot be printed.". The user is required to perform an appropriate action in response to this notification.

Note that when a "status check" button (icon) 211 disposed at lower right part on the second home screen 210 is pressed, the screen display on the console section 104 is shifted to a notification screen 220 on which details of the notification are specifically shown, as described hereinafter with reference to FIG. 2C. Therefore, the notification on the second home screen 210 may be in the form of general words, such as "An error has occurred." or "There are points to be checked.". Further, in a case where the console section 104 is equipped with notification means, such as a light emitting diode (LED) warning lamp, the LED warning lamp may be blinked or lit in parallel with the display on the second home screen 210. In doing this, if the light emission color and the blinking speed of the LED warning lamp can be adjusted, the operation of the LED warning lamp may be controlled by associating a combination of the light emission color and the blinking speed with details of the notification.

Figure 2C:
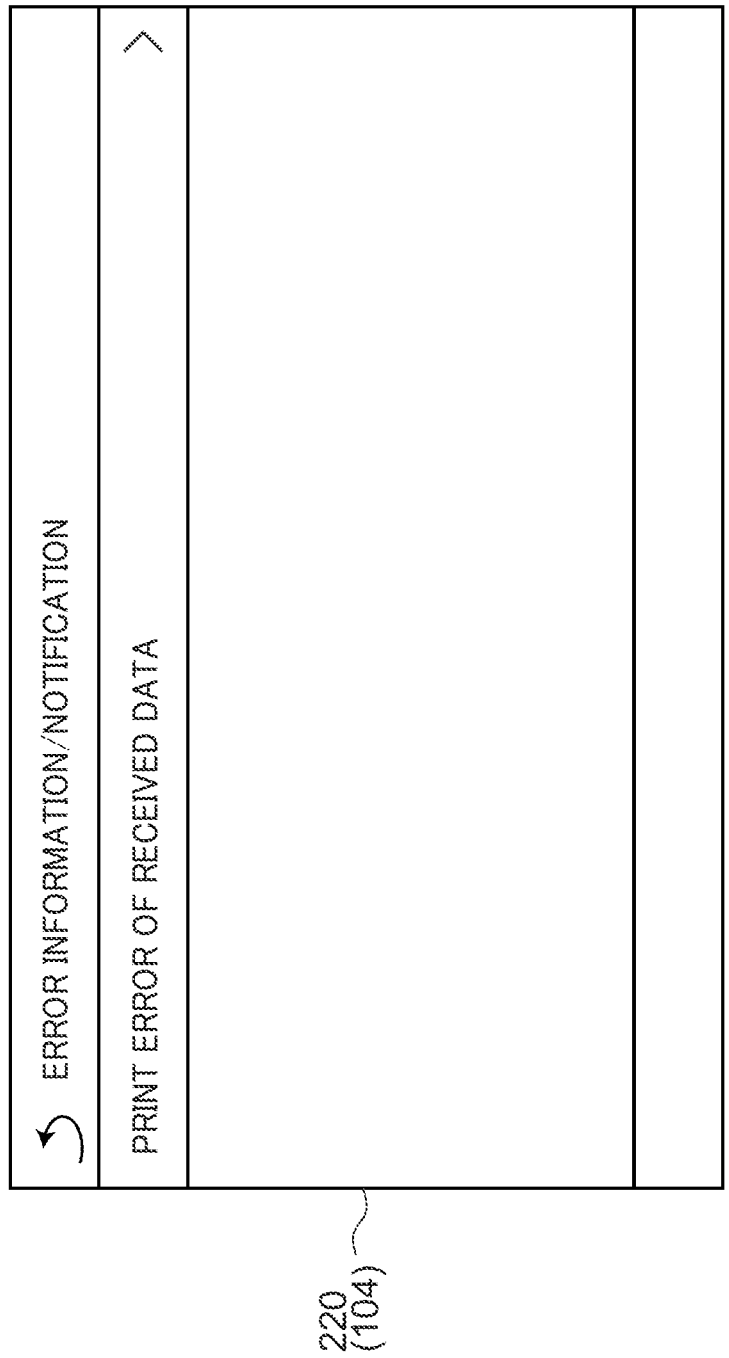

FIG. 2C shows the notification screen 220 displayed on the console section 104 when the "status check" button 211 is pressed on the second home screen 210. The user can check more specific details of the notification on the second home screen 210 by viewing the notification screen 220. On the notification screen 220 shown in FIG. 2C, a fact that a print error (error state in which FAX-received data cannot be printed) has occurred is displayed in accordance with the notification that "The received data cannot be printed" in FIG. 2B.

Figure 2D:
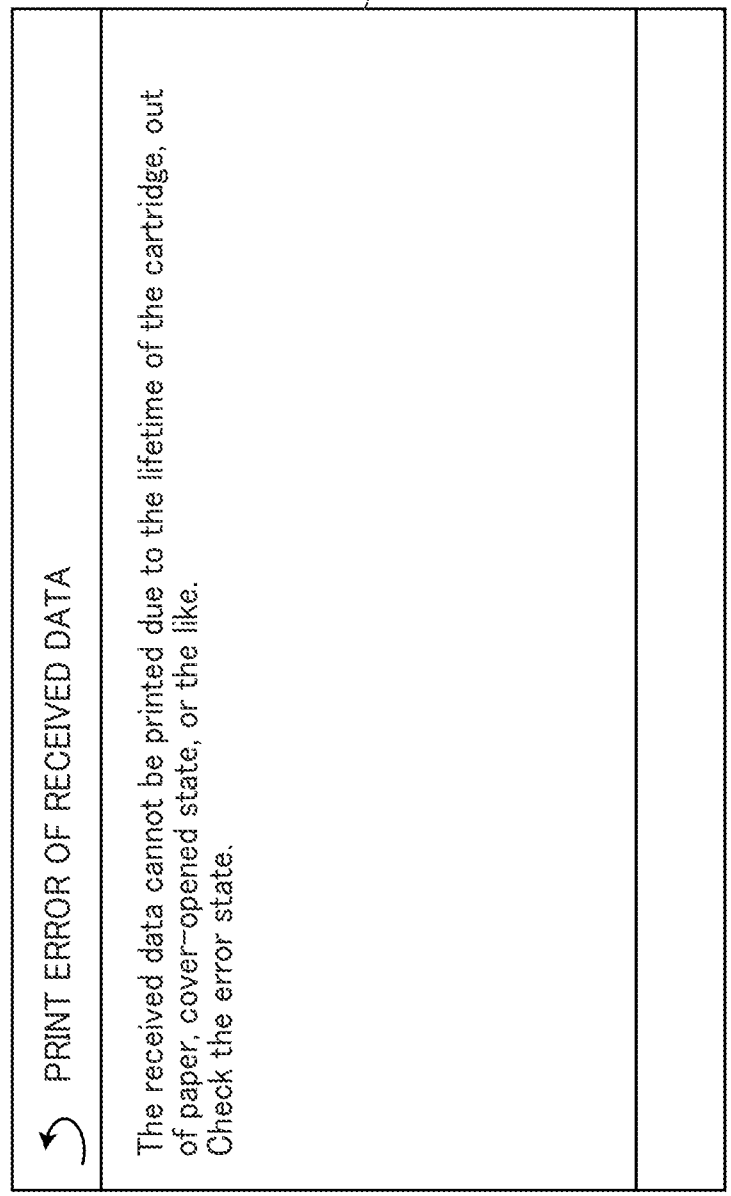

FIG. 2D shows an information screen 230 displayed on the console section 104 when a right arrow (>) appearing on the right side of the message on the notification screen 220 is pressed. The information screen 230 includes e.g. more detailed contents of the notification screen 220 and a message for prompting the user to perform a predetermined action. In the illustrated example shown in FIG. 2D, there are displayed a cause of occurrence of the error which makes it impossible to print the FAX-received data and the message for prompting the user to perform the predetermined action to resolve the error having occurred. By confirming the information screen 230, the user can resolve the cause of the error (such as expiration of lifetime of a cartridge, out of paper, and cover-opened state) and restore the multifunction peripheral 100 to the printable state. Alternatively, the user can take an action to check the contents of the FAX-received data, by displaying the preview screen of the FAX-received data on the console section 104.

Note that the screens shown in FIGS. 2B to 2D are conventional examples of the display screen in a situation where an error making it impossible to print the FAX-received data has occurred in the multifunction peripheral 100, and examples of the screen display according to the present invention will be described hereinafter with reference to FIG. 5A and subsequent FIGS.

Figure 3:
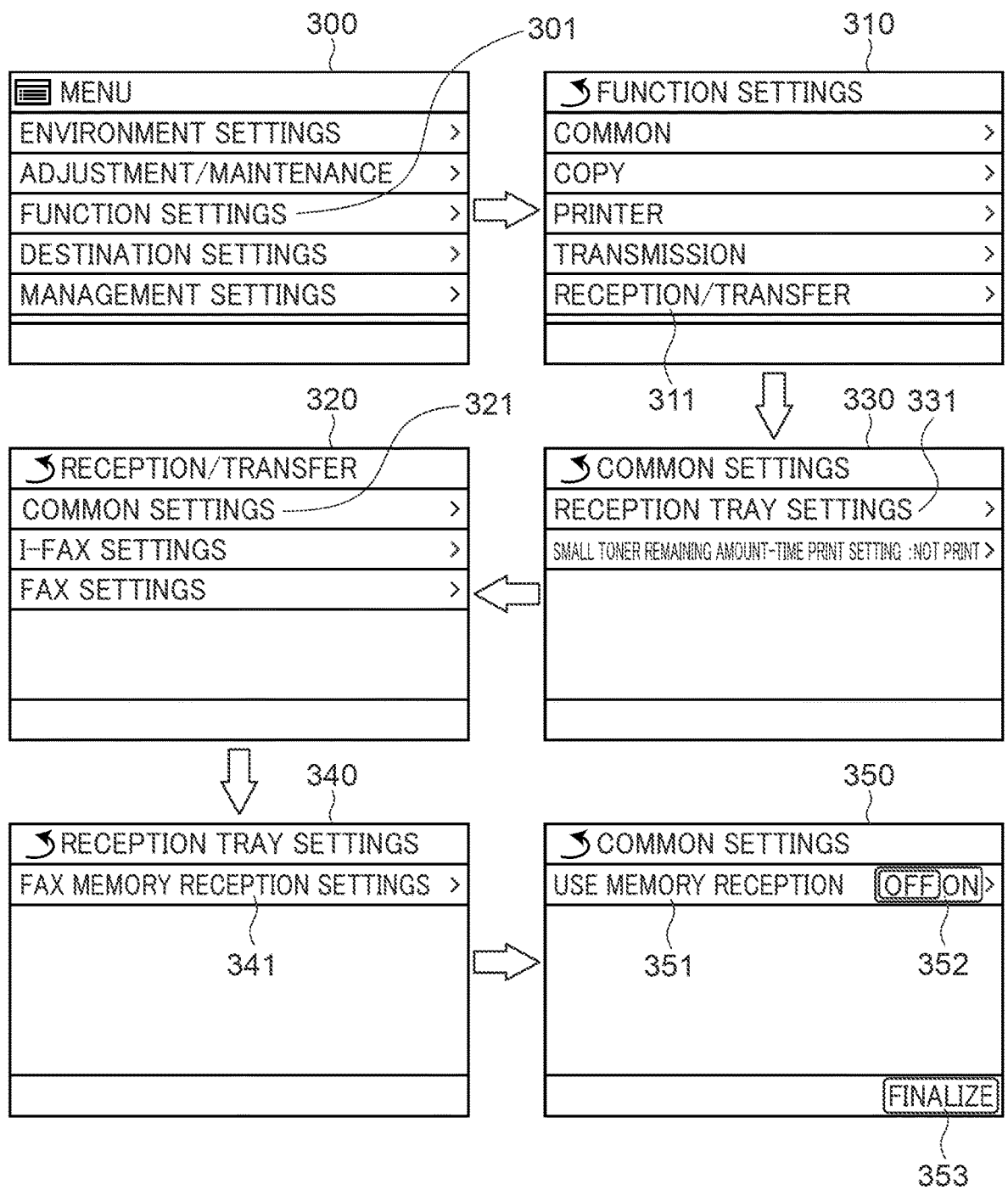
FIG. 3 is a diagram showing a conventional procedure for enabling a FAX preview function of the multifunction peripheral.

FIG. 3 is a diagram showing a conventional example of a procedure for enabling the FAX preview function in the multifunction peripheral 100. When a "menu" button 201 is pressed on the first home screen 200 (or the second home screen 210), the display on the console section 104 is shifted to a guide screen 300 for changing settings. When "function settings" 301 is pressed on the guide screen 300, the display on the console section 104 is shifted to a function setting screen 310. When "reception/transfer" 311 is pressed on the function setting screen 310, the display on the console section 104 is shifted to a reception/transfer setting screen 320. When "common settings" 321 is pressed on the reception/transfer setting screen 320, the display on the console section 104 is shifted to a common settings screen 330.

When "reception tray settings" 331 is pressed on the common settings screen 330, the display on the console section 104 is shifted to a reception tray-setting screen 340. When "FAX memory reception settings" 341 is pressed on the reception tray-setting screen 340, the display on the console section 104 is shifted to a common settings screen 350. In a case where "use memory reception" 351 has been set to "OFF", as indicated on the common settings screen 350, after pressing an "ON" button 352 and then pressing a "finalize" button 353, the multifunction peripheral 100 is restarted. With this, the FAX preview function is set enabled in the multifunction peripheral 100.

The procedure shown in FIG. 3 for performing setting for enabling the FAX preview function is an example, but the operation path is not clear enough, and further, this procedure has a problem that a lot of operations are required. Therefore, it is desired that the operation path is made clearer and the number of operations is reduced.

Figure 4:
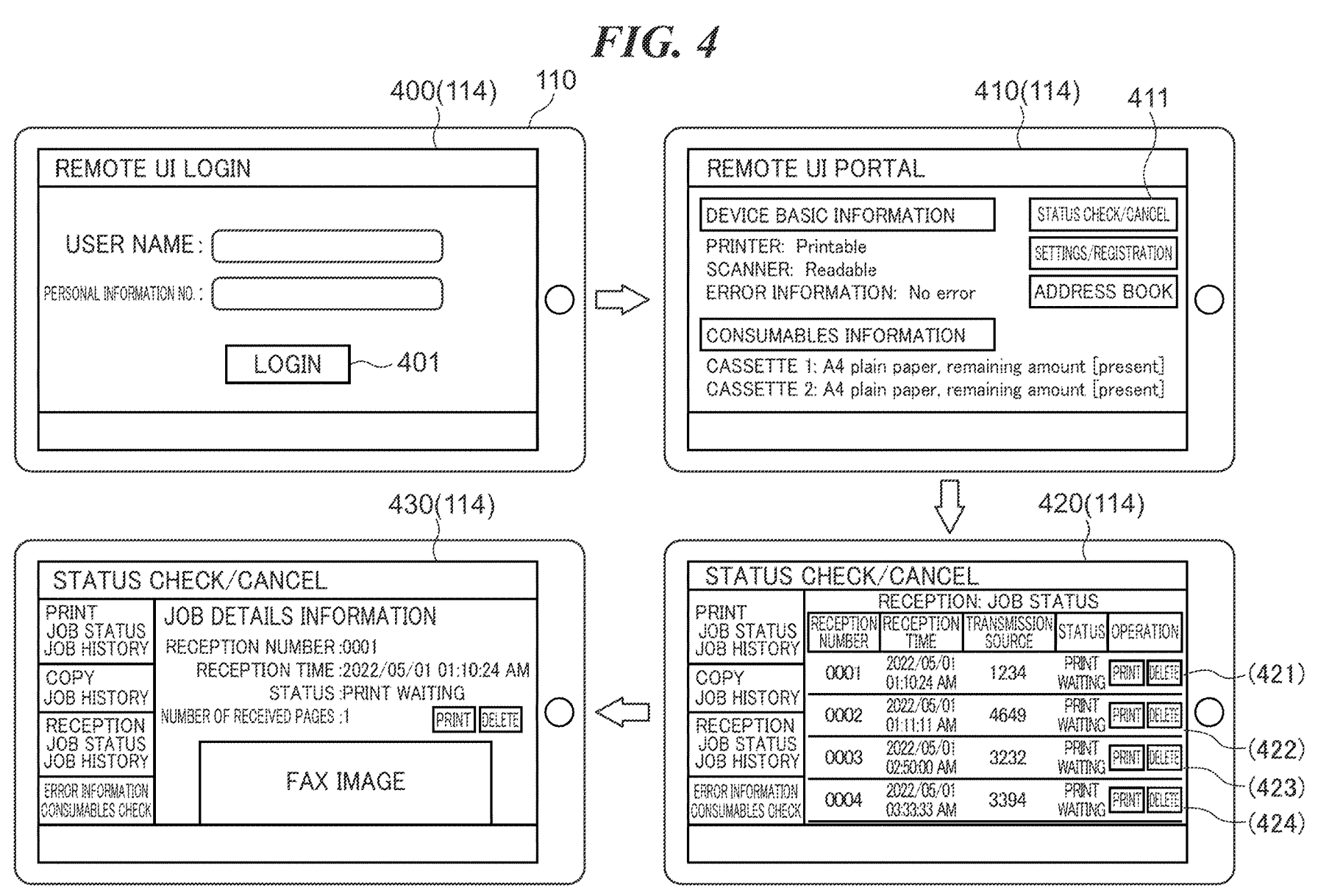

FIG. 4 is a diagram showing a conventional execution procedure of a remote FAX preview. Note that the remote FAX preview refers to displaying a FAX image (contents (image) to be printed on a recording sheet by imaging and printing FAX-received data) on an external apparatus, such as the mobile terminal 101.

The user can display a remote UI login screen 400 on the touch panel 114 by accessing an IP address of the multifunction peripheral 100 from the mobile terminal 110. When the user inputs a user name and a personal identification number on the remote UI login screen 400 and then presses a "login" button 401, the display on the touch panel 114 is shifted to a remote UI portal screen 410. The user can check information on consumables and a job status of the multifunction peripheral 100, and check and edit a variety of settings of the multifunction peripheral 100, based on the contents displayed on the remote UI portal screen 410.

When a "status check/cancel" button 411 is pressed on the remote UI portal screen 410, the display on the touch panel 114 is shifted to a first status check/cancel screen 420. With the first status check/cancel screen 420, the user can confirm a list of FAX jobs (FAX-received data items) in a print-waiting state up to the present time, and in the illustrated example, a plurality of items 421 to 424 of FAX-received data (FAX-received data items 421 to 424) are displayed.

On the first status check/cancel screen 420, not only a print instruction, but also a deletion instruction can be provided to the multifunction peripheral 100 for each of the FAX-received data items 421 to 424. When the user presses a reception number of one, desired by the user to confirm the contents (FAX image), of the FAX-received data items 421 to 424 displayed on the first status check/cancel screen 420, the display on the touch panel 114 is shifted to a second status check/cancel screen 430.

On the second status check/cancel screen 430, there is displayed a FAX preview of the reception number-pressed one of the FAX-received data items 421 to 424 in the print waiting state on the first status check/cancel screen 420. With this, the user can confirm a FAX image of each page of the FAX-received data item before printing. Note that, similar to the first status check/cancel screen 420, the user can provide a print instruction and a deletion instruction with respect to the FAX-received data item from the second status check/cancel screen 430 to the multifunction peripheral 100.

Note that in the procedure described with reference to FIG. 4 with respect to the execution procedure of the remote FAX preview on the mobile terminal 101, the user is required to perform e.g. the operations for inputting the authentication information (a user name and a personal identification number) and selecting a FAX-received data item as the FAX preview target, and these operations require a lot of time and effort. Therefore, there is a demand for a method which makes it possible to more easily perform the remote FAX preview.

To solve the problems involved in the conventional method, which are described with reference to FIGS. 2A to 4, a guide screen for displaying the FAX preview and an example of the screen display of the FAX preview in the first embodiment will be described with reference to FIGS. 5A to 5C.

Figure 5A:
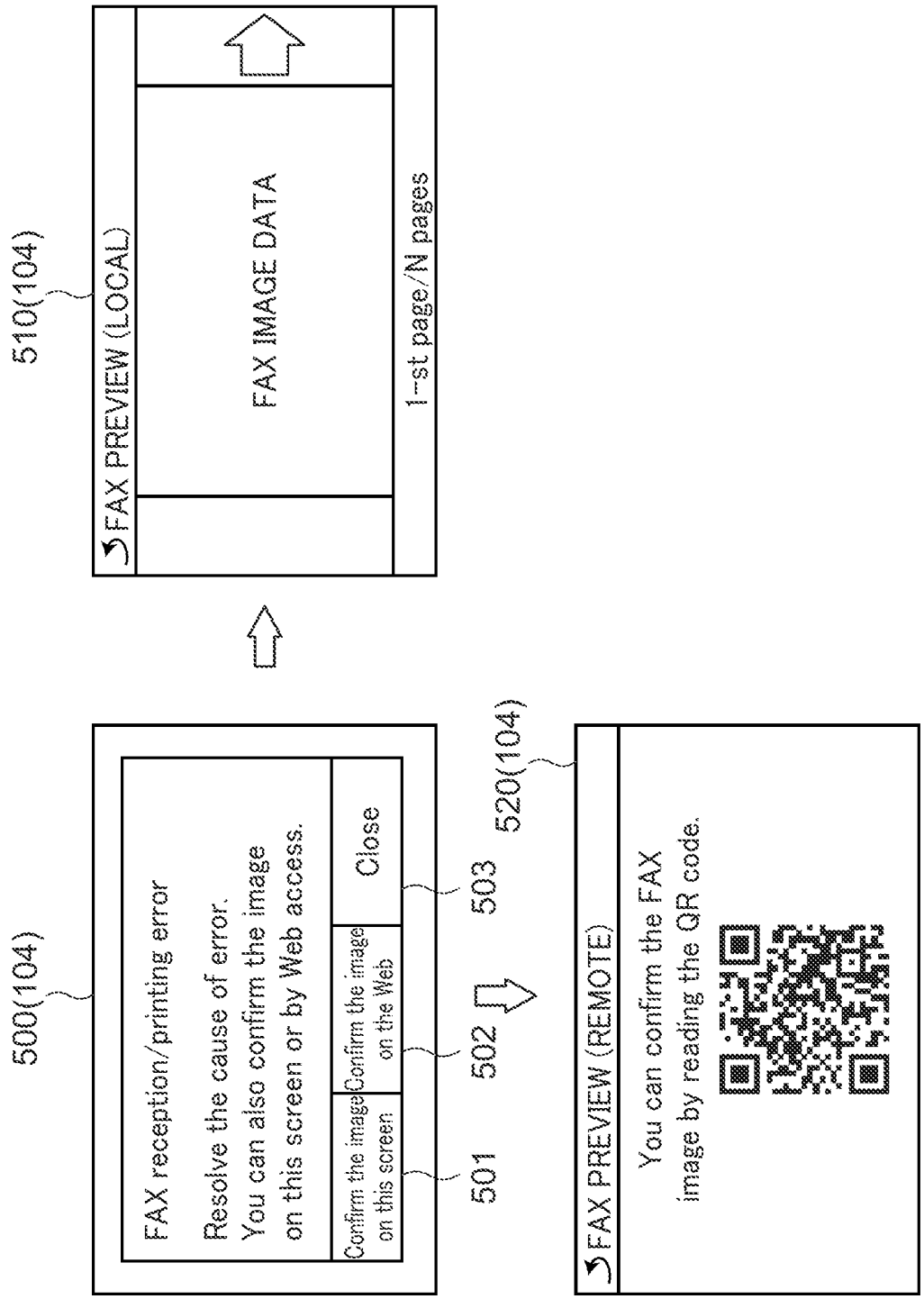
FIGS. 5A to 5C are diagrams showing an execution procedure of the FAX preview in the multifunction peripheral of the information processing system according to the first embodiment.

A FAX preview guide screen 500 shown in FIG. 5A is displayed on the console section 104 in a case where when the multifunction peripheral 100 receives FAX data, the FAX-received data cannot be printed but memory reception is performed instead. By performing respective operations on the FAX preview guide screen 500, the user can shift the display to a local FAX preview screen 510 and a remote FAX preview guide screen 520, and further, close the FAX preview guide screen 500.

Specifically, when a "Confirm the image on this screen" button 501 is pressed on the FAX preview guide screen 500, the display on the console section 104 is shifted to the local FAX preview screen 510 displaying a FAX image on the console section 104. This enables the user to confirm the FAX image on the console section 104.

When a "Confirm the image on the Web" button 502 is pressed on the FAX preview guide screen 500, the display on the console section 104 is shifted to the remote FAX preview guide screen 520. On the remote FAX preview guide screen 520, a QR code is displayed, which is an example of a two-dimensional code for displaying a FAX preview on the touch panel 114 of the mobile terminal 110. The QR code includes a reception number of a FAX-received data item as the FAX preview target, authentication information for accessing the multifunction peripheral 100, and a URL. When the QR code reader (application) is started in the mobile terminal 110, and the QR code is photographed by the camera 115, it is possible to access the multifunction peripheral 100 from the mobile terminal 110 and display the FAX image on the touch panel 114.

Figure 5B:
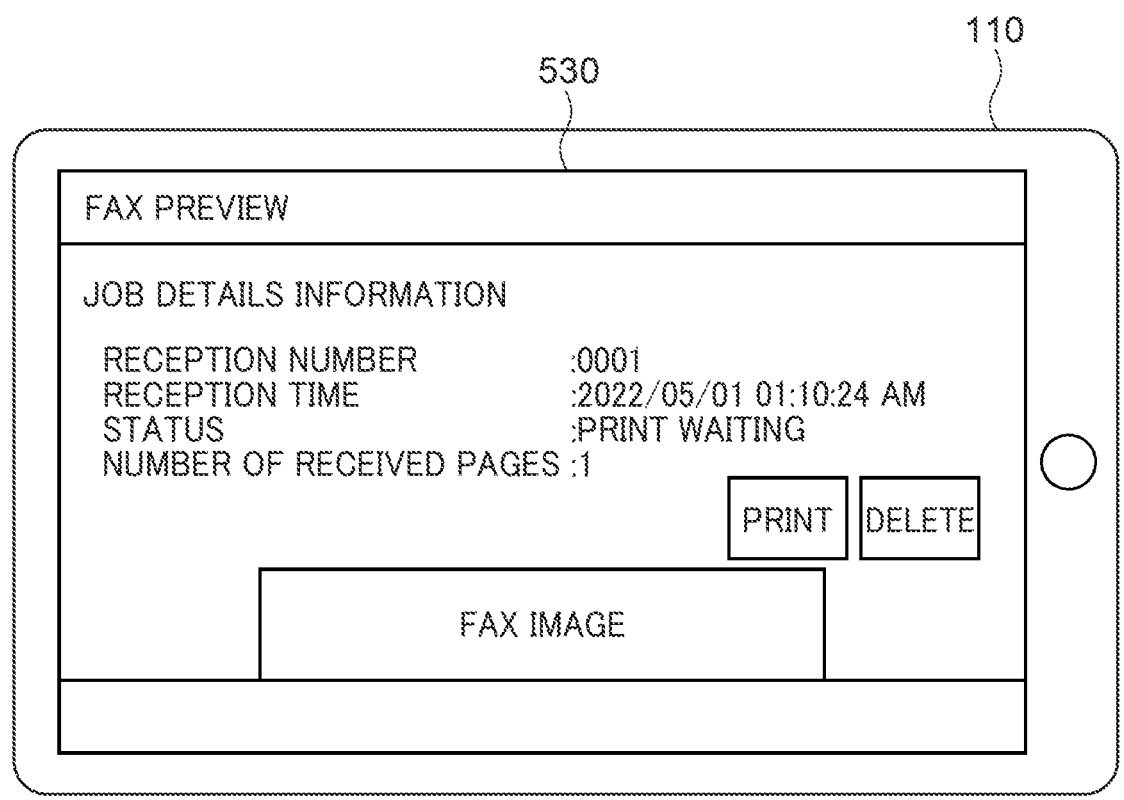
Figure 5C:
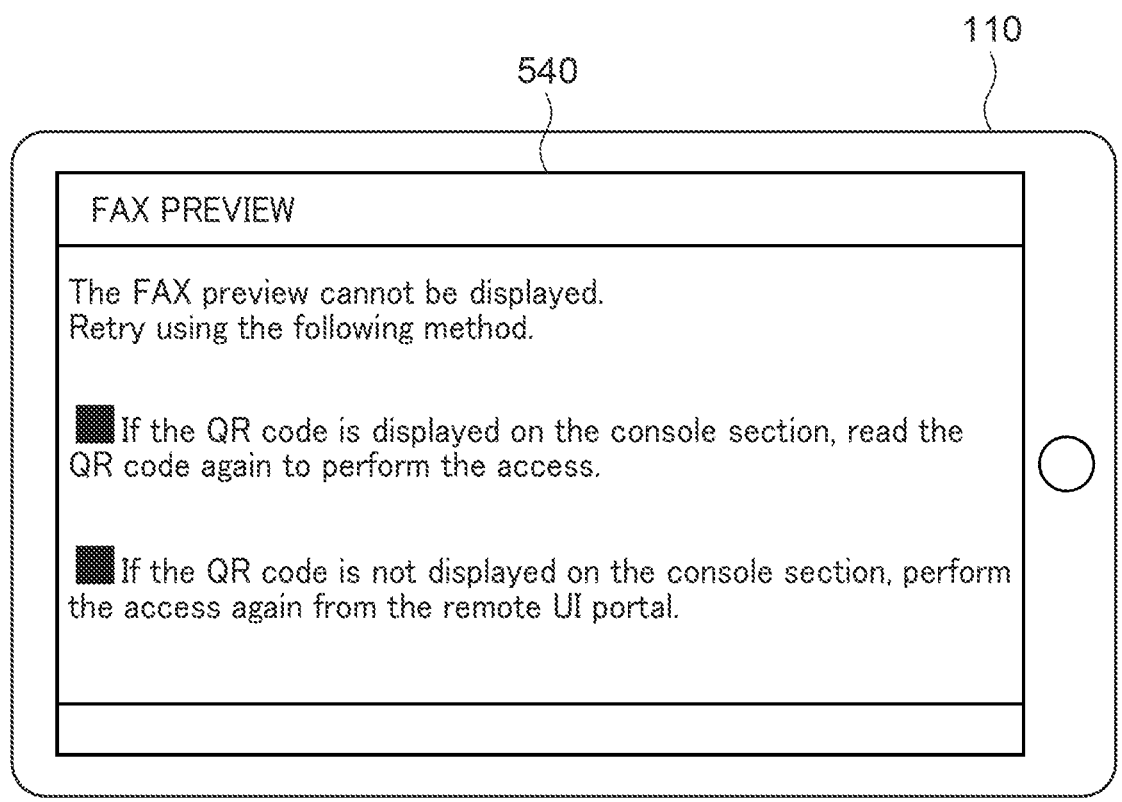

A remote FAX preview screen 530 shown in FIG. 5B shows an example of a state in which the user has accessed the multifunction peripheral 100 from the mobile terminal 110 by using the QR code displayed on the remote FAX preview guide screen 520, and the FAX image is displayed on the touch panel 114. The user can confirm the FAX image corresponding to the read QR code from the remote FAX preview screen 530. On the other hand, a remote FAX preview error screen 540 shown in FIG. 5C is displayed on the touch panel 114 in a case where the remote FAX preview is not performed due to some error when the user accesses the multifunction peripheral 100 from the mobile terminal 110. The remote FAX preview error screen 540 is displayed, for example, in a case where the target FAX-received data has already been printed or deleted.

To enable the user to easily perform the FAX preview using the mobile terminal 110, it is desirable that authentication processing can be skipped when the user accesses the multifunction peripheral 100. Therefore, in the first embodiment, a one-time token which can be used only once is issued, and a session ID generated by the issued one-time token is managed in association with a FAX reception number and a display-permitted page, which can be accessed by using the issued one-time token. With this, it is possible to display the FAX preview without requiring time and effort of the user, while limiting the FAX preview which can be displayed.

FIG. 6 is a diagram showing an example of a token management database (hereinafter referred to as the "token management DB") provided in the multifunction peripheral 100, for managing authentication information for displaying the remote FAX preview screen 530 on the touch panel 114 of the mobile terminal 110. In the token management DB, denoted by reference numeral 600, first token management information 601 indicates an example of management information set when the user accesses the multifunction peripheral 100 using a QR code. When the user accesses the multifunction peripheral 100 using one-time token issued according to a QR code, a session ID is generated by the one-time token and set, and further, a value of "TRUE" indicating that information included in the QR code is being used is set as a use state (denoted as "IN USE?" in the illustrated example).

Second token management information 602 in the token management DB 600 indicates an example of management information newly generated when another user accesses the multifunction peripheral 100 using the QR code. Although the QR code is always displayed on the console section 104 of the multifunction peripheral 100, in a case where after a user accesses the multifunction peripheral 100 using the displayed QR code, the user leaves the issued one-time token as it is without performing any operation, another user is prevented from accessing the multifunction peripheral 100. As the management information for avoiding occurrence of such a situation, the second token management information 602 is newly generated when the other user accesses the multifunction peripheral 100 for the first time. At a time point at which the second token management information 602 is generated, the information included in the QR code has not been used yet, and hence "FALSE" indicating an unused state is set as the use state, and the session ID is made blank.

Figure 7:
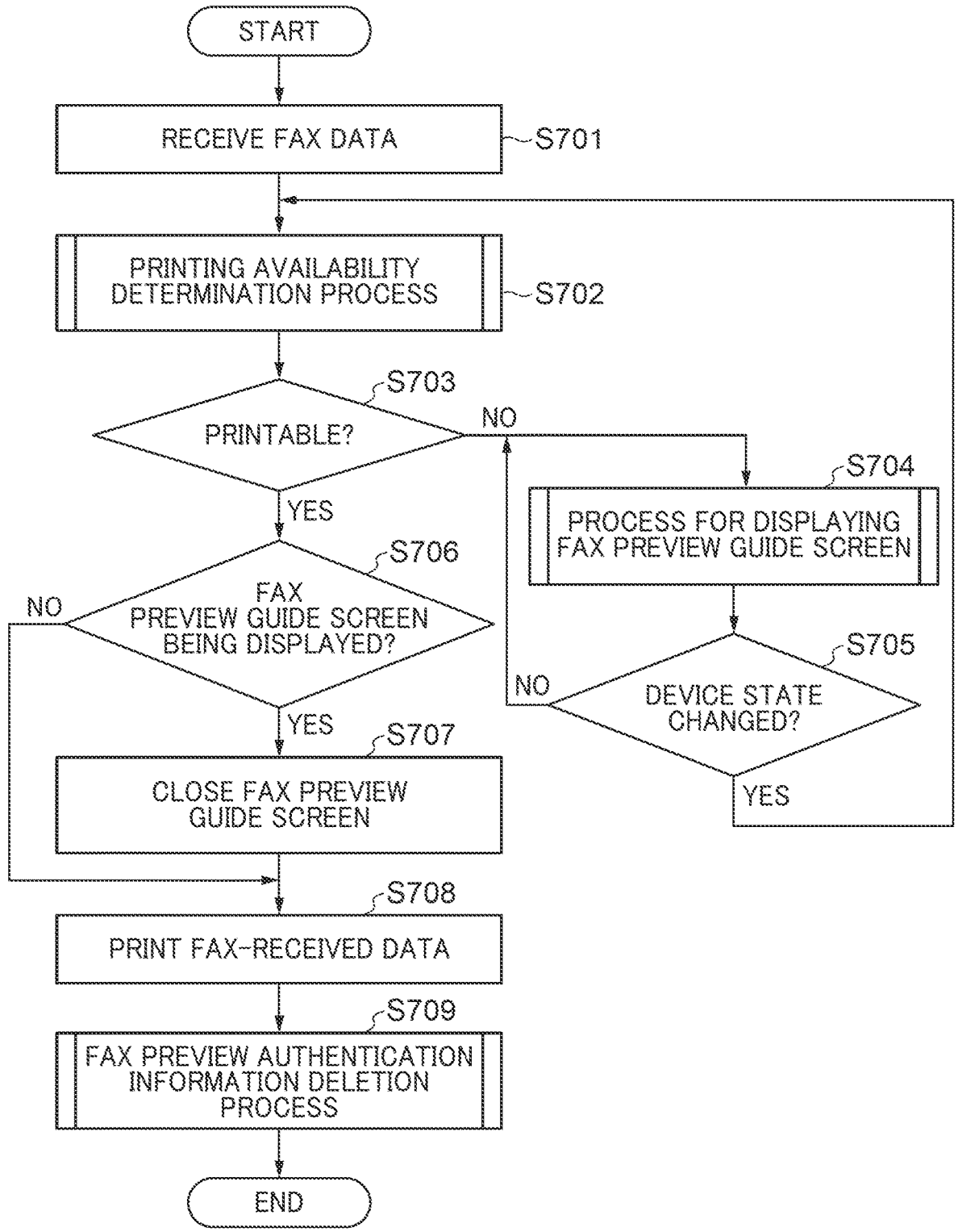
FIG. 7 is a flowchart of a control process performed when FAX data is received by the multifunction peripheral.

FIG. 7 is a flowchart of a control process performed when FAX data is received by the multifunction peripheral 100. Each processing operation (step) denoted by S number in the present flowchart is realized by the CPU 101 that loads a predetermined program stored in the ROM 102 into the DRAM 103 to perform centralized control of the operations of the components of the multifunction peripheral 100.

In a step S701, the CPU 101 receives FAX data via the communication section 107, writes the received FAX data into the DRAM 103, and transfers the FAX data from the DRAM 103 to the ROM 102 upon completion of the reception. In the following step S702, the CPU 101 executes a printing availability determination process for determining whether or not printing of the FAX-received data (operation for imaging and printing the data on a recording sheet) can be executed by the print unit 106. Note that details of the printing availability determination process in the step S702 will be described hereinafter with reference to FIG. 8.

In the following step S703, the CPU 101 determines whether or not a result of the determination in the step S702 indicates that printing can be executed. If printing cannot be executed (NO to S703), the CPU 101 executes a process for displaying a FAX preview guide screen in a step S704 to display the FAX preview guide screen on the console section 104. Note that details of the process for displaying the FAX preview guide screen in the step S704 will be described hereinafter with reference to FIGS. 9A and 9B.

In the following step S705, the CPU 101 determines whether or not a device state of the multifunction peripheral 100 has been changed. If it is determined that the device state of the multifunction peripheral 100 has not been changed (NO to S705), the CPU 101 executes the process for displaying the FAX preview guide screen in the step S704 to continue to display the FAX preview guide screen. On the other hand, if it is determined that the device state of the multifunction peripheral 100 has been changed (YES to S705), the CPU 101 returns to the step S702 to execute the printing availability determination process in the step S702 to redetermine whether or not printing can be executed. With this, in a case where a cause making it impossible to perform printing is eliminated e.g. by replenishing recording sheets or replacing a toner cartridge with a new one while the FAX preview guide screen is being displayed, it is possible to immediately print the FAX-received data.

If it is determined in the step S703 that printing can be executed (YES to S703), in a step S706, the CPU 101 determines whether or not the FAX preview guide screen is being displayed. If it is determined that the FAX preview guide screen is being displayed (YES to S706), the CPU 101 executes a step S707, whereas if it is determined that the FAX preview guide screen is not being displayed (NO to S706), the CPU 101 executes a step S708.

In the step S707, the CPU 101 closes the FAX preview guide screen being displayed, and the process proceeds to the step S708. In the step S708, the CPU 101 reads out the FAX-received data item from the ROM 102, writes the read data item into the DRAM 103, controls the print unit 106 to print the FAX-received data item, and upon completion of printing, deletes the FAX-received data item from the DRAM 103 and the ROM 102. Next, in a step S709, the CPU 101 executes a FAX preview authentication information deletion process, followed by terminating the present process. Note that details of the FAX preview authentication information deletion process in the step S709 will be described hereinafter with reference to FIG. 12.

Figure 8:
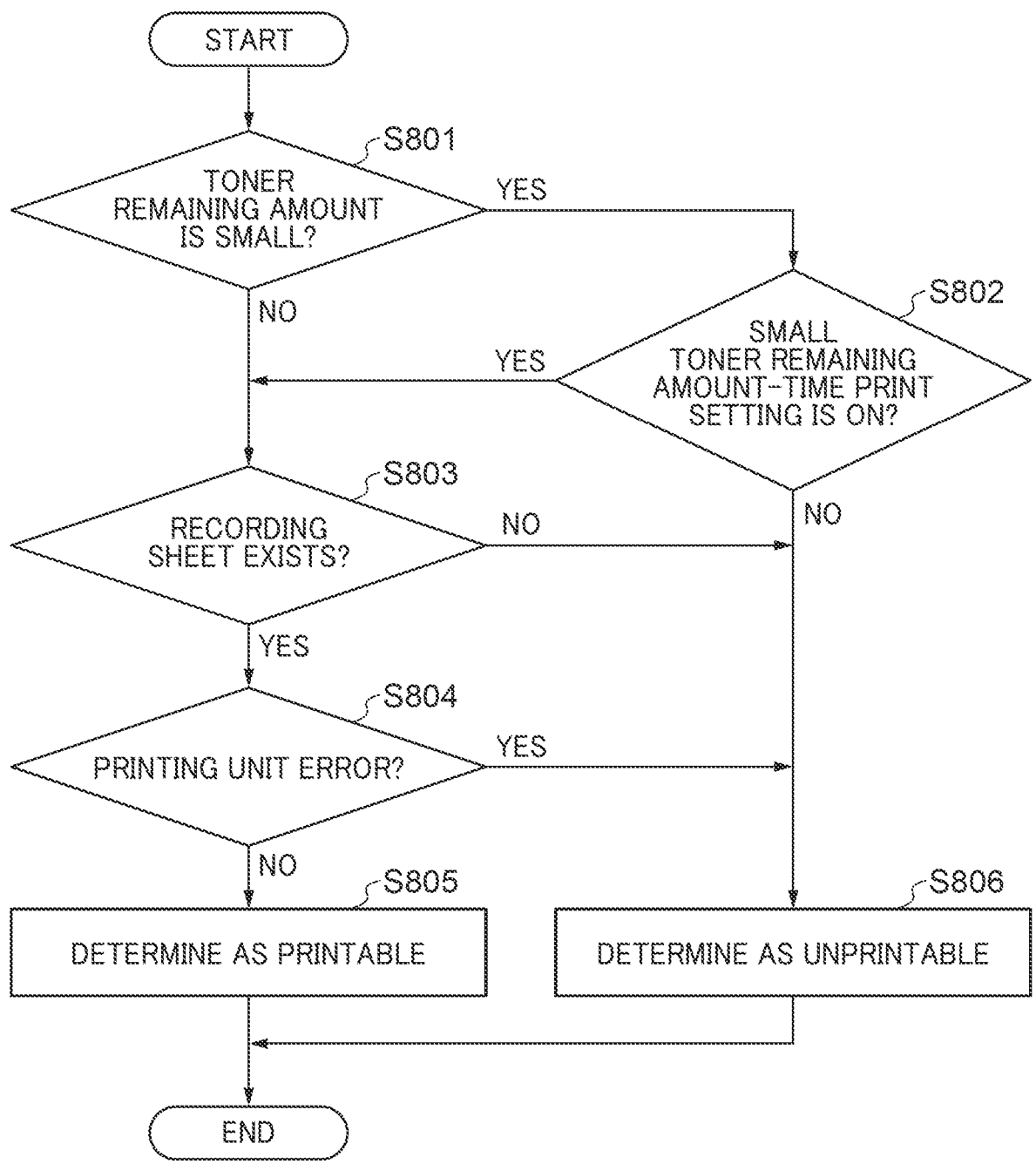
FIG. 8 is a flowchart of a printing availability determination process in a step in FIG. 7.

FIG. 8 is a flowchart of the printing availability determination process in the step S702 in FIG. 7. In a step S801, the CPU 101 determines whether or not a toner remaining amount in the print unit 106 is small. In the step S801, in a case where the toner remaining amount of a cartridge included in the print unit 106 is smaller than a predetermined amount, it is determined that the toner remaining amount is small. If it is determined that the toner remaining amount is small (YES to S801), the CPU 101 executes a step S802, whereas if it is determined that the toner remaining amount is not small (NO to S801), the CPU 101 execute a step S803.

In the step S802, the CPU 101 determines whether or not a setting for executing printing even in a case where the toner remaining amount is small (hereinafter referred to as the "small toner remaining amount-time print setting") is set to on (enabled) in the multifunction peripheral 100. If it is determined that the small toner remaining amount-time print setting is set to on (YES to S802), the CPU 101 executes the step S803, whereas if it is determined that the small toner remaining amount-time print setting is set to off (disabled) (NO to S802), the CPU 101 executes a step S806. Note that in a case where the small toner remaining amount-time print setting is set to on, a faint print or the like may be caused in a printout, and hence in general, it is desirable that the small toner remaining amount-time print setting is set to off.

In the step S803, the CPU 101 determines whether or not a recording sheet exists in the print unit 106. If it is determined that a recording sheet exists (YES to S803), the CPU 101 executes a step S804, whereas if it is determined that no recording sheet exists (NO to S803), the CPU 101 executes the step S806.

In the step S804, the CPU 101 determines whether or not an error has occurred in the print unit 106. If it is determined that no error has occurred in the print unit 106 (NO to S804), the CPU 101 executes a step S805, whereas if it is determined that an error has occurred in the print unit 106 (YES to S804), the CPU 101 executes the step S806.

In the step S805, the CPU 101 determines that the FAX-received data can be printed by the print unit 106, followed by terminating the present process. On the other hand, in the step S806, the CPU 101 determines that the FAX-received data cannot be printed by the print unit 106, followed by terminating the present process.

Figure 9A:
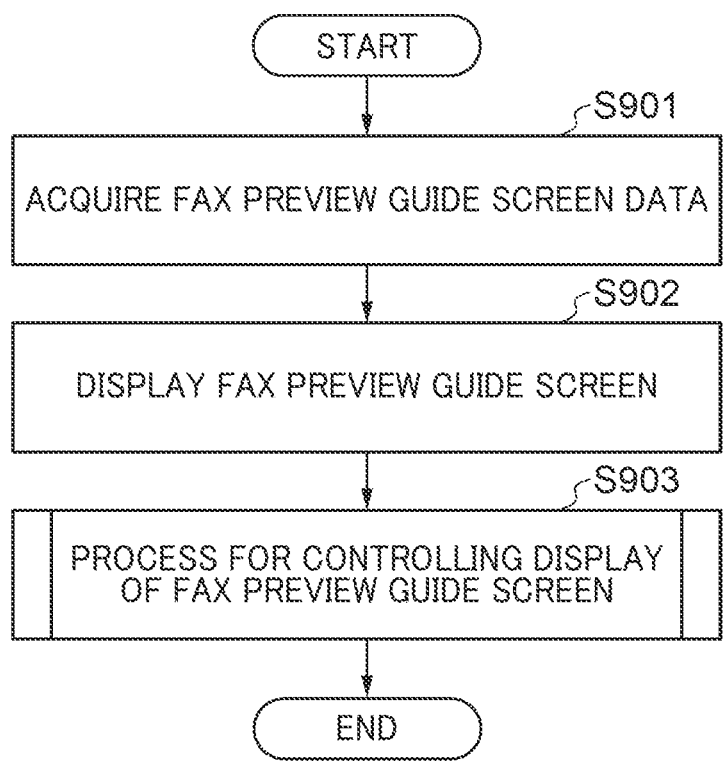
FIG. 9A is a flowchart of a process for displaying a FAX preview guide screen in a step in FIG. 7.

FIG. 9A is a flowchart of the process for displaying a FAX preview guide screen in the step S704 in FIG. 7. In a step S901, the CPU 101 receives image data of the FAX preview guide screen 500 to be displayed on the console section 104. In the following step S902, the CPU 101 displays the FAX preview guide screen 500 on the console section 104. In the following step S903, the CPU 101 performs a process for controlling the display of the FAX preview guide screen 500 displayed on the console section 104, followed by terminating the present process.

Figure 9B:
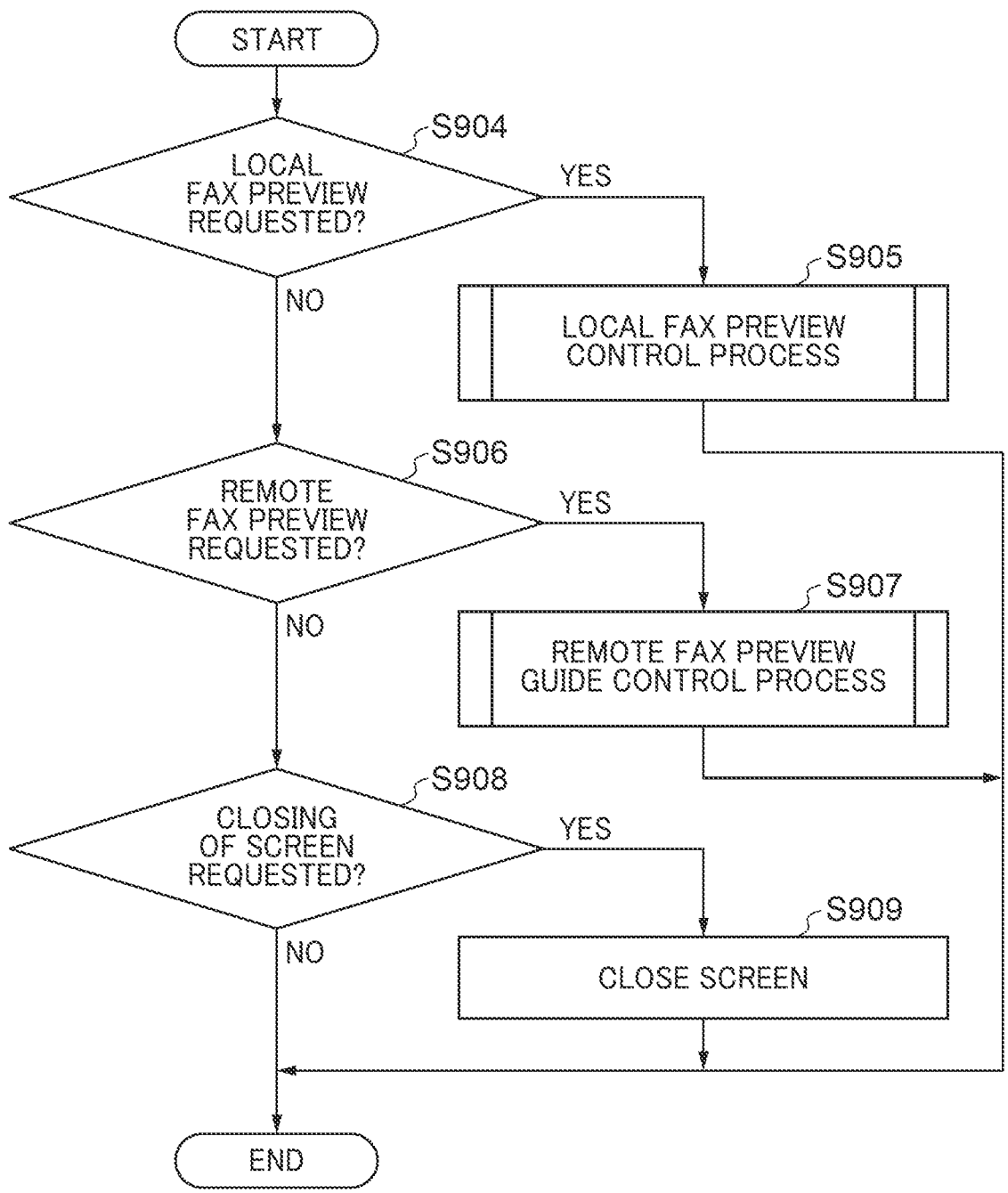
FIG. 9B is a flowchart of a process for controlling the display of the FAX preview guide screen in a step in FIG. 9A.

FIG. 9B is a flowchart of the process for controlling the display of the FAX preview guide screen 500 in the step S903 in FIG. 9A. In a step S904, the CPU 101 determines whether or not a local FAX preview has been requested from the console section 104. The request for a local FAX preview refers to a request for displaying a FAX preview on the console section 104, and more specifically, refers to an operation of pressing the "Confirm the image on this screen" button 501 on the FAX preview guide screen 500. If it is determined that the local FAX preview has been requested (YES to S904), the CPU 101 executes a local FAX preview control process in a step S905, whereas if it is determined that the local FAX preview has not been requested (NO to S904), the CPU 101 executes a step S906.

In the step S905, the CPU 101 executes the local FAX preview control process for the console section 104, followed by terminating the present process. Note that details of the local FAX preview control process in the step S905 will be described hereinafter with reference to FIG. 10. In the step S906, the CPU 101 determines whether or not a remote FAX preview has been requested from the console section 104. The request for a remote FAX preview refers to a request for displaying a FAX preview on the touch panel 114 of the mobile terminal 110, and more specifically, refers to an operation of pressing the "Confirm the image on the Web" button 502 on the FAX preview guide screen 500. If it is determined that the remote FAX preview has been requested (YES to S906), the CPU 101 executes a remote FAX preview guide control process in a step S907, whereas if it is determined that the remote FAX preview has not been requested (NO to S906), the CPU 101 executes a step S908.

In the step S907, the CPU 101 executes the remote FAX preview guide control process for the console section 104, followed by terminating the present process. Note that details of the remote FAX preview guide control process in the step S907 will be described hereinafter with reference to FIGS. 11A to 11C. In the step S908, the CPU 101 determines whether or not a request for closing the screen has been received from the console section 104. The request for closing the screen specifically refers to an operation of pressing a "Close" button 503 on the FAX preview guide screen 500. If it is determined that the request for closing the screen has been received (YES to S908), in a step S909, the CPU 101 closes the FAX preview guide screen 500 displayed on the console section 104, followed by terminating the present process. If it is determined that the request for closing the screen has not been received (NO to S908), the present process is terminated.

FIG. 10 is a flowchart of the local FAX preview control process in the step S905 in FIG. 9B. In a step S1001, the CPU 101 reads out the FAX-received data item from the ROM 102 and temporarily stores the read data item in the DRAM 103. In the following step S1002, the CPU 101 controls the image processor 108 to perform decoding processing (processing for generating image data in a format displayable on the console section 104) on the FAX-received data item temporarily stored in the DRAM 103. In the following step S1003, the CPU 101 controls the image processor 108 to perform resize processing for converting the image data item generated in the step S1002 to a size displayable on the console section 104. In the following step S1004, the CPU 101 displays the image data item resized in the step S1003 on the console section 104, followed by terminating the present process.

Figure 11B:
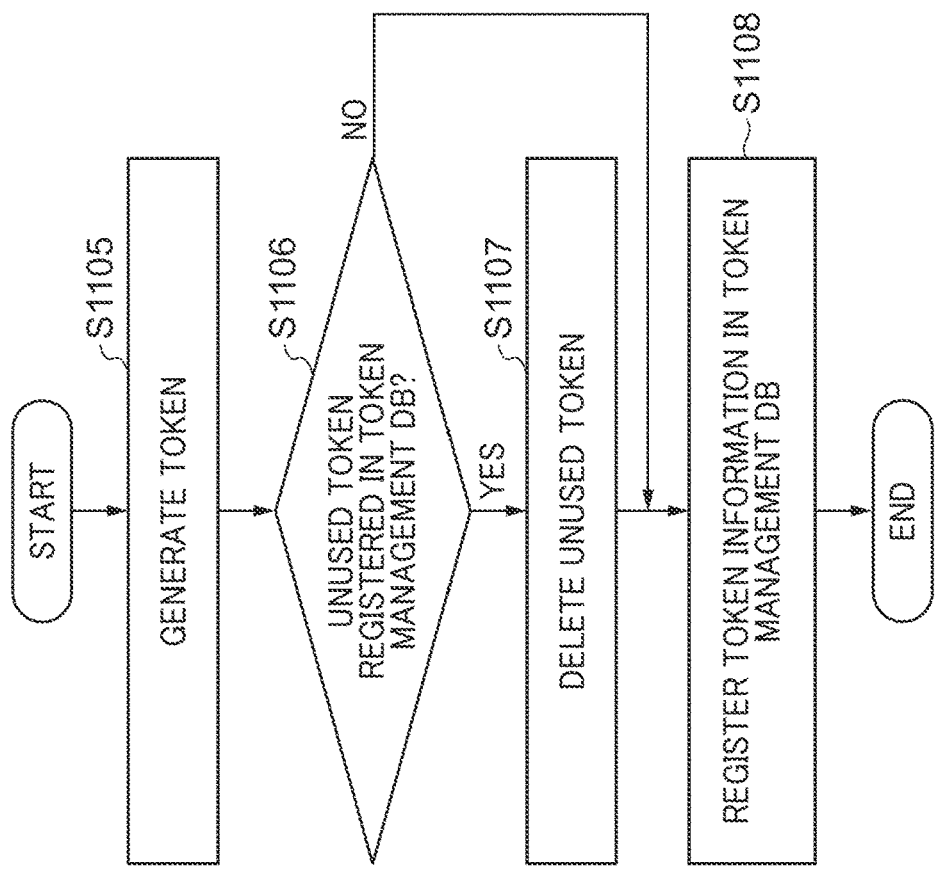
FIG. 11B is a flowchart of a remote FAX preview authentication information generation process in a step in FIG. 11A.
Figure 11A:
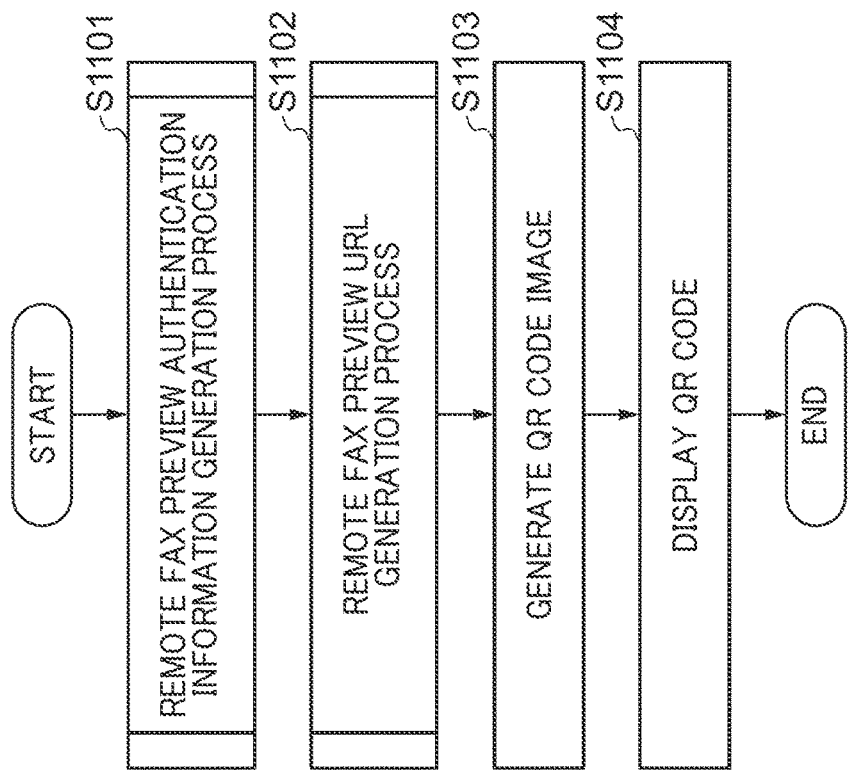
FIG. 11A is a flowchart of a remote FAX preview guide control process in a step in FIG. 9A.

FIG. 11A is a flowchart of the remote FAX preview guide control process in the step S907 in FIG. 9B. In a step S1101, the CPU 101 executes a remote FAX preview authentication information generation process to generate authentication information for the remote FAX preview. Note that details of the remote FAX preview authentication information generation process in the step S1101 will be described hereinafter with reference to FIG. 11B. In the following step S1102, the CPU 101 executes a remote FAX preview URL generation process to generate a URL for the remote FAX preview. Note that details of the remote FAX preview URL generation process in the step S1102 will be described hereinafter with reference to FIG. 11C. In the following step S1103, the CPU 101 generates an image of a QR code using the information of the URL for the remote FAX preview, which is generated in the step S1102. Note that the processing for generating the QR code can be performed by using a known technique, and hence detailed description thereof is omitted. In the following step S1104, the CPU 101 displays the generated QR code on the console section 104, followed by terminating the present process. Thus, the QR code for accessing the multifunction peripheral 100 is displayed on the console section 104, and further, the authentication information is generated.

FIG. 11B is a flowchart of the remote FAX preview authentication information generation process in the step S1101 in FIG. 11A. In a step S1105, the CPU 101 generates a token for accessing the multifunction peripheral 100. Note that the token generation processing can be performed by using a known technique, such as JSON Web Token generation, and hence detailed description thereof is omitted. In the following step S1106, the CPU 101 determines whether or not there is an unused token registered in the token management DB 600. If it is determined that there is an unused token registered in the token management DB 600 (YES to S1106), the CPU 101 executes a step S1107, whereas if there is no unused token registered in the token management DB 600 (NO to S1106), the CPU 101 executes a step S1108. In the step S1107, the CPU 101 deletes the registered unused token. By executing the step S1107, it is possible to avoid occurrence of a situation where a token is generated whenever the remote FAX preview guide screen is displayed, causing a leak of the token. In the step S1108, the CPU 101 registers the token information generated in the step S1105 in the token management DB 600, followed by terminating the present process.

Figure 11C:
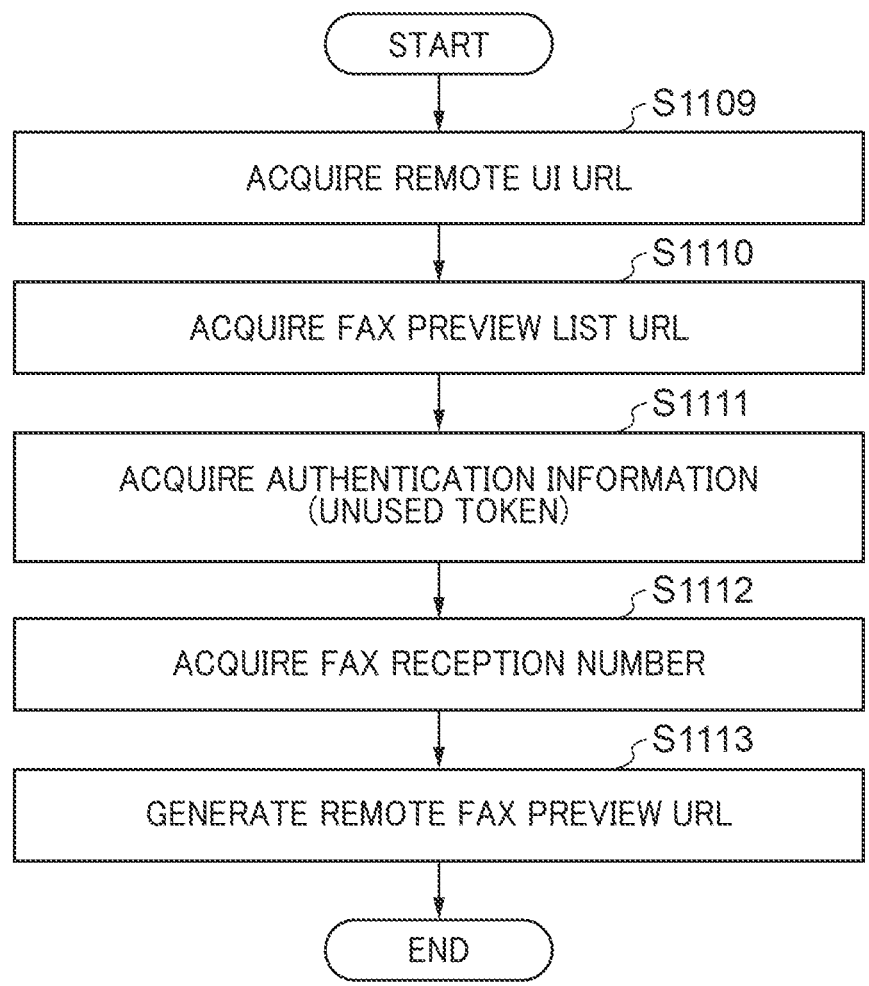
FIG. 11C is a flowchart of a remote FAX preview URL generation process in a step in FIG. 11A.

FIG. 11C is a flowchart of the remote FAX preview URL generation process in the step S1102 in FIG. 11A. In a step S1109, the CPU 101 acquires a URL of the remote UI. In the following step S1110, the CPU 101 acquires a URL for displaying a FAX preview list. The URL for displaying the FAX preview list is a URL indicating a location of a list of FAX reception jobs which have not been printed yet.

In the following step S1111, the CPU 101 acquires the unused token from the token management DB 600. In the following step S1112, the CPU 101 acquires a FAX reception number of a FAX preview to be displayed. In the following step S1113, the CPU 101 generates a URL for the remote FAX preview using the information acquired in the steps S1109 to S1112, followed by terminating the present process.

An example of the URL for the remote FAX preview, which is generated by using the first token management information 601 and the remote UI address will be described below. Let it be assumed that the remote UI address is "aaa.bbb.ccc.ddd". In this case, the URL for preview can be expressed in a form using URL query parameters, such as http://aaa.bbb.ccc.ddd/faxPrev.html?token=TKN123&faxNum=FAX0001". In the multifunction peripheral 100, by analyzing such a URL, it is possible to acquire the FAX reception number as the preview target and perform authentication using the token. Note that although the token management DB 600 holds a session ID, the session ID is exchanged, not by using the URL query parameters similar to general communication, but by using a cookie, and hence the session ID is not involved in the process for generating a URL for preview.

Figure 12:
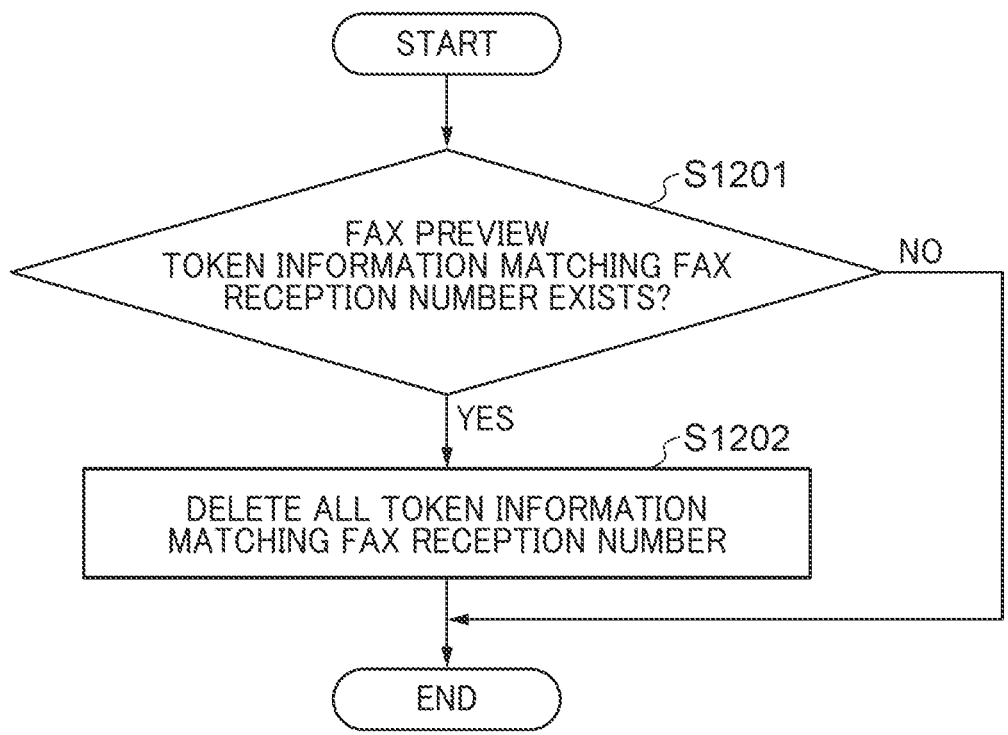
FIG. 12 is a flowchart of a FAX preview authentication information deletion process in a step in FIG. 7.

FIG. 12 is a flowchart of the FAX preview authentication information deletion process in the step S709 in FIG. 7. In a step S1201, the CPU 101 determines whether or not token information for FAX preview, which matches the FAX reception number, exists. If it is determined that the token information exists (YES to S1201), the CPU 101 executes a step S1202, whereas if the token information does not exist (NO to S1201), the present process is terminated. In the step S1202, the CPU 101 deletes all the token information for FAX preview, which matches the FAX reception number, followed by terminating the present process.

With this, it is possible to delete all the authentication information corresponding to the FAX reception number as the preview target. That is, since it is possible to delete all of the authentication numbers prepared for the FAX preview, it is possible to prevent the authentication information from being left after completion of printing of the FAX-received data.

Figure 13:
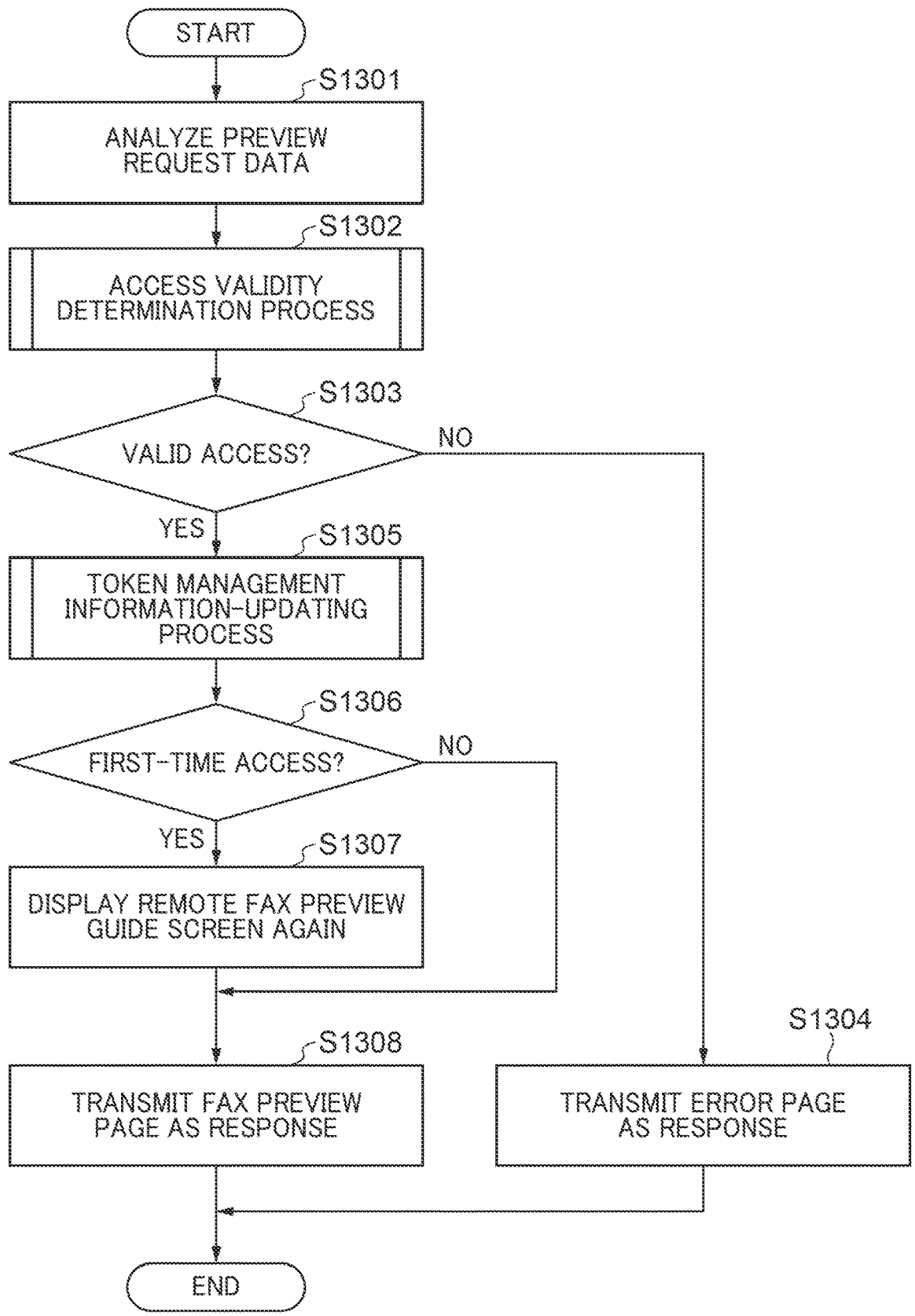
FIG. 13 is a flowchart of a remote FAX preview control process performed by the multifunction peripheral.

FIG. 13 is a flowchart of a remote FAX preview control process performed for the remote FAX preview by the multifunction peripheral 100. Upon receipt of a remote FAX preview request from the mobile terminal 110, the CPU 101 executes the remote FAX preview control process. Each processing operation (step) denoted by S number in the present flowchart is realized by the CPU 101 that loads a predetermined program stored in the ROM 102 into the DRAM 103 to perform centralized control of the operations of the components of the multifunction peripheral 100.

In a step S1301, the CPU 101 analyzes preview request data transmitted from the mobile terminal 110 to acquire token information, a FAX reception number, a cookie, and an access destination page name. Note that a cookie does not exist when accessed for the first time, and hence the CPU 101 generates the cookie at this timing. In the following step S1302, the CPU 101 executes an access validity determination process using the token information and the FAX reception number, which are acquired in the step S1301, to determine the validity of the access. Note that details of the access validity determination process in the step S1302 will be described hereinafter with reference to FIG. 14A.

In a step S1303, the CPU 101 determines whether or not a result of the determination in the step S1302 indicates that the access from the mobile terminal 110 is valid. If the result of the determination in the step S1302 indicates that the access is not valid (NO to S1303), in a step S1304, the CPU 101 transmits an error page indicating that the remote FAX preview cannot be performed, to the mobile terminal 110 as a response, followed by terminating the present process. Note that the remote FAX preview error screen 540 shown in FIG. 5C is an example of the error page transmitted to the mobile terminal 110 as a response in the step S1304.

If the result of the determination in the step S1302 indicates that the access is valid (YES to S1303), in a step S1305, the CPU 101 executes a token management information-updating process to update the token management information. Note that details of the token management information-updating process in the step S1305 will be described hereinafter with reference to FIG. 14B.

In the following step S1306, the CPU 101 determines whether or not the access from the mobile terminal 110 is a first-time access. If it is determined that the received access is the first-time access (YES to S1306), the CPU 101 executes a step S1307, whereas if it is determined that the received access is not the first-time access (NO to S1306), the CPU 101 executes a step S1308. Note that as the method of determining whether or not the access is the first-time access, a general method, such as a method of checking whether or not a cookie exists, can be used. More specifically, in the present embodiment, the FAX preview is performed by using a general http protocol, and hence in a case where the received access is the first-time access, a cookie is not attached to the preview request data from the mobile terminal 110, whereas in case where the received access is a second-time or subsequent access, the cookie is attached to the preview request data. Therefore, it is possible to determine whether or not the received access is the first-time access, based on whether the cookie is attached or not.

In the step S1307, the CPU 101 displays the remote FAX preview guide screen 520, i.e. executes the remote FAX preview guide control process in FIG. 11A again (steps S1101 to S1104). With this, the QR code displayed on the console section 104 is updated. Therefore, even in a case where one user leaves the operation after performing the remote FAX preview, another person or each of a plurality of users is capable of performing the remote FAX preview to confirm the contents of the FAX-received job.

In the step S1308, the CPU 101 generates a Web page of the remote FAX preview and transmits the generated Web page to the mobile terminal 110 as a response, followed by terminating the present process. Note that the image data of the remote FAX preview page is generated by executing the local FAX preview control process in FIG. 10 (steps S1001 to S1004) by setting the FAX reception number acquired in the step S1301 in a html file for the remote FAX preview. Then, the remote FAX preview is realized by displaying the image data generated as described above in the FAX preview page. Note that the remote FAX preview screen 530 shown in FIG. 5C is an example of the FAX preview page transmitted to the mobile terminal 110 as a response in the step S1308.

In the present embodiment, a page number of a page to be previewed first is not specified. Therefore, the first page is displayed when accessed, and then, the user causes a desired page to be displayed by selecting the page using the touch panel 114. The display control of the FAX preview is not limited to this, but the display of the FAX preview may be controlled such that a display page number is set to preview request data, and the FAX preview of the set page number is displayed when accessed.

Figure 14A:
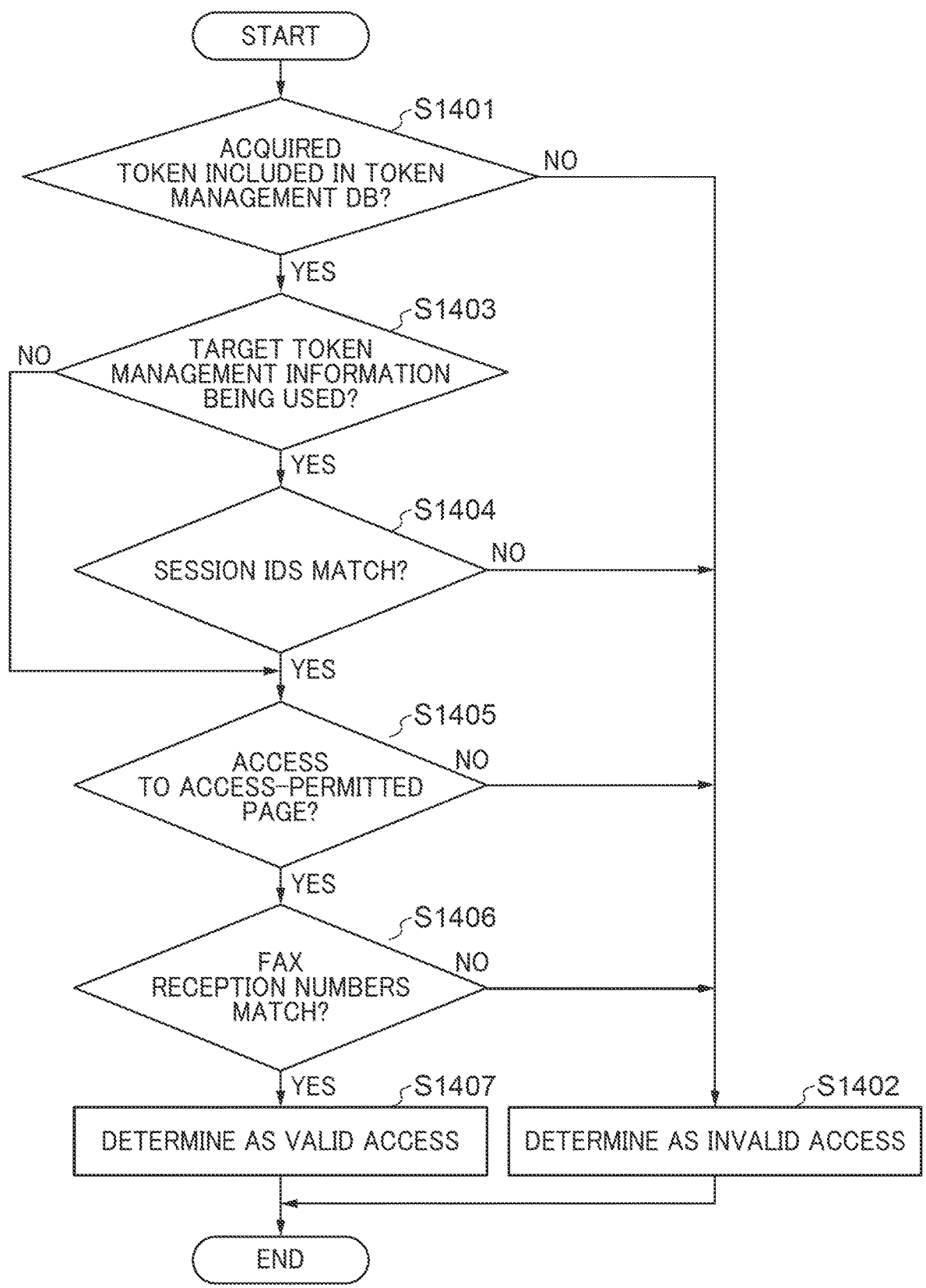
FIG. 14A is a flowchart of an access validity determination process performed in a step of the remote FAX preview control process in FIG. 13.

FIG. 14A is a flowchart of the access validity determination process in the step S1302 in FIG. 13. In a step S1401, the CPU 101 determines whether or not the token acquired in the step S1301 is included in the token management DB 600. If it is determined that the token acquired in the step S1301 is not included in the token management DB 600 (NO to S1401), in a step S1402, the CPU 101 determines that the received access is an invalid access, followed by terminating the present process. With this, it is possible to block an access using a deleted token or an unauthorized token which does not exist.

On the other hand, if it is determined in the step S1401 that the token acquired in the step S1301 is included in the token management DB 600 (YES to S1401), in a step S1403, the CPU 101 determines whether or not the token information determined to be included in the token management DB 600 in the step S1401 is being used (the use state set to TRUE). If it is determined that the token information is not being used (NO to S1403), the CPU 101 executes a step S1405, whereas if it is determined that the token information is being used (YES to S1403), the CPU 101 executes a step S1404.

In the step S1404, the CPU 101 acquires a session ID of http communication from the cookie acquired in the step S1301 and determines whether or not the acquired session ID matches the session ID of the token management information being used. If it is determined that the IDs match each other (YES to S1404), the CPU 101 executes the step S1405, whereas if it is determined that the IDs do not match each other (NO to S1404), the CPU 101 executes the step S1402. This makes it possible to prevent an unauthorized access due to multiple use by a plurality of users or the leak of a token.

In the step S1405, the CPU 101 determines whether or not the access destination page acquired in the step S1301 matches an access-permitted page in the token management information. If it is determined that the pages match each other (YES to S1405), the CPU 101 executes a step S1406, whereas if it is determined that the pages do not match each other (NO to S1405), the CPU 101 executes the step S1402. Thus, by limiting the page which can be viewed, it is possible to prevent an access to an unintended page and a change of settings, using an authorized token.

In the step S1406, the CPU 101 determines whether or not the FAX reception number acquired in the step S1301 matches a FAX reception number in the token management information. If it is determined that the FAX reception numbers match each other (YES to S1406), the CPU 101 executes a step S1407, whereas if it is determined that the FAX reception numbers do not match each other (NO to S1406), the CPU 101 executes the step S1402. In the step S1407, the CPU 101 determines that the received access is a valid access, followed by terminating the present process.

Figure 14B:
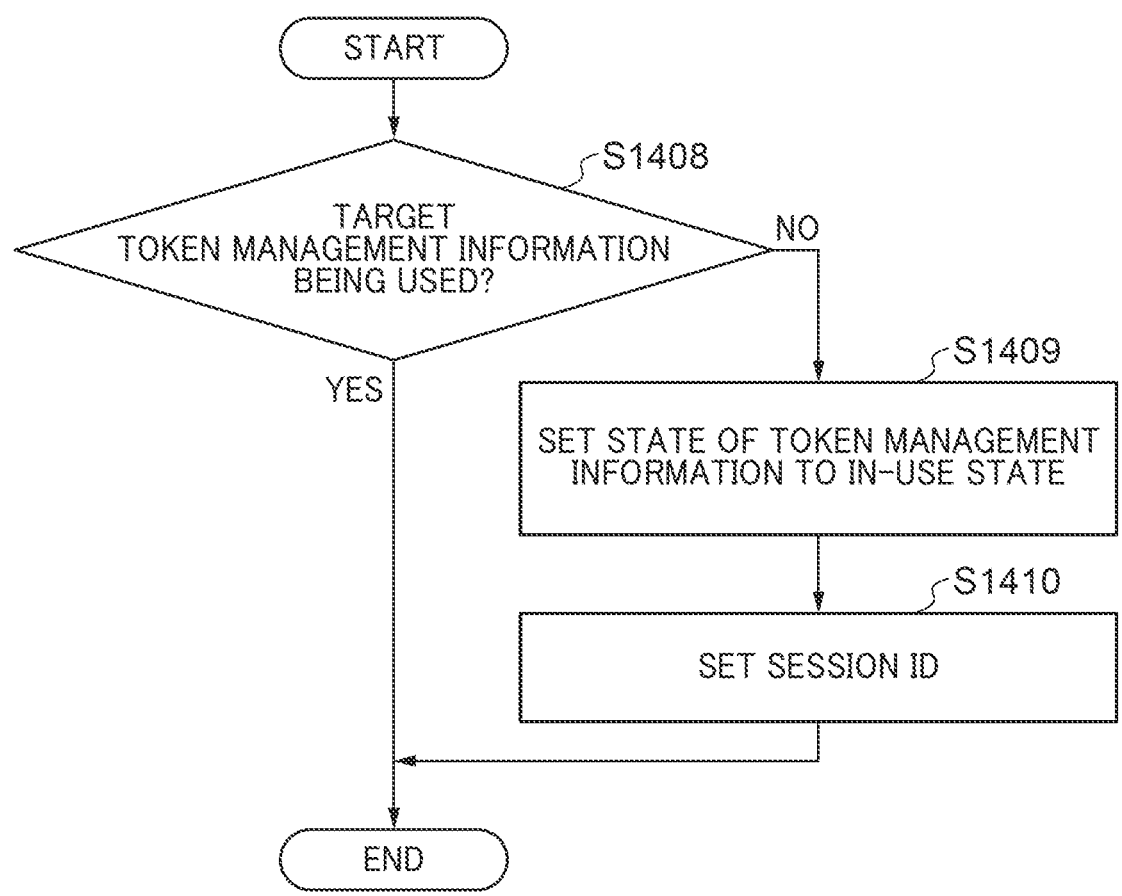
FIG. 14B is a flowchart of a token management information-updating process performed in a step of the remote FAX preview control process in FIG. 13.

FIG. 14B is a flowchart of the token management information-updating process in the step S1305 in FIG. 13. In a step S1408, the CPU 101 determines whether or not the state of the token information matching the token acquired in the step S1301 is being used. If it is determined that the token information is being used, i.e. in the in-use state (YES to S1408), the CPU 101 terminates the present flow, whereas if it is determined that the token information is not being used (NO to S1408), in a step S1409, the CPU 101 sets the state of the token information to the in-use state. Next, in a step S1410, the CPU 101 sets the session ID included in the cookie acquired in the step S1301 to the token management information, followed by terminating the present process. Thus, the token information matching the access request from the mobile terminal 110 is updated.

As described above, in the first embodiment, in a situation where the FAX-received data cannot be printed, the guide screen for performing the FAX preview is displayed, and at this time, a QR code is displayed for causing, from the guide screen, the mobile terminal to display the FAX preview. With this, by reading the QR code using the mobile terminal, the user can easily confirm the FAX image on the mobile terminal. Thus, even a user who has conventionally used only the FAX reception print function can easily confirm the FAX image by using the FAX preview, and further, the user can know an error state in which the FAX-received data has not been printed yet.

Next, a second embodiment of the present invention will be described. In the first embodiment, after the FAX preview guide screen 500 is displayed, the remote FAX preview guide screen 520 is displayed by an operation performed on the FAX preview guide screen 500. On the other hand, in the second embodiment, a screen formed by combining the FAX preview guide screen 500 and the remote FAX preview guide screen 520 is displayed, whereby it is possible to more quickly display the remote FAX preview on the mobile terminal 110.

Figure 15:
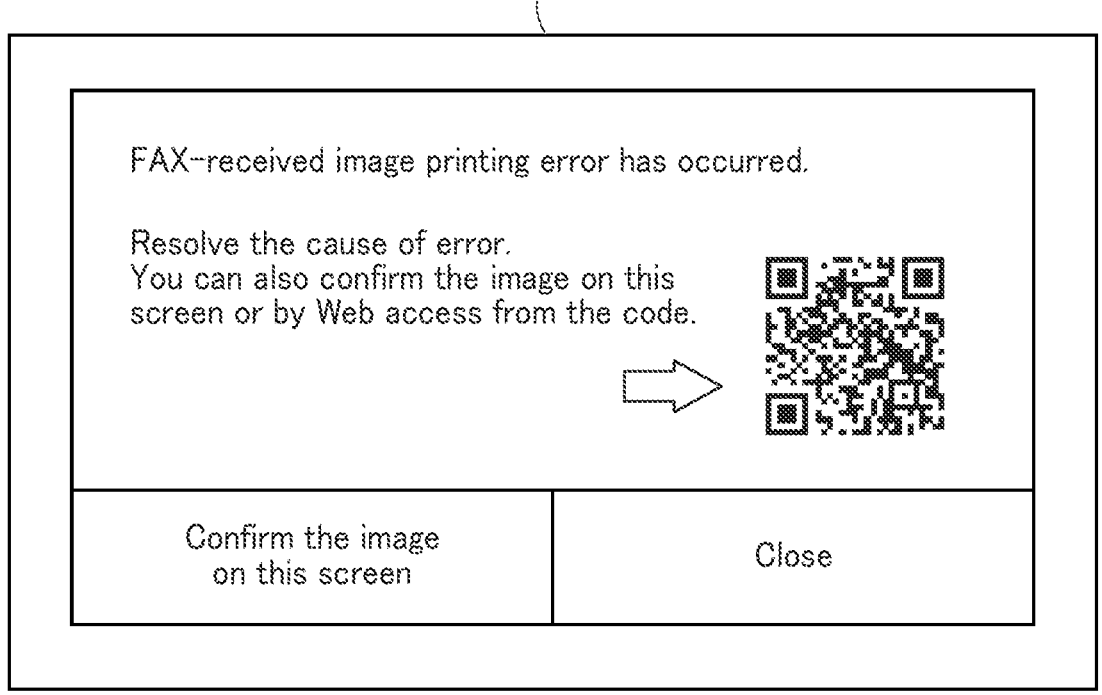
FIG. 15 is a diagram showing an example of a FAX preview guide screen displayed on a console section of a multifunction peripheral of an information processing system according to a second embodiment of the present invention.

FIG. 15 is a diagram showing an example of the FAX preview guide screen in the second embodiment. The FAX preview guide screen, denoted by reference numeral 1500, shown in FIG. 15, is displayed on the console section 104 of the multifunction peripheral 100, and includes not only a message to the effect that the multifunction peripheral 100 is in a state in which the FAX-received data cannot be printed, but also a QR code for the remote FAX preview. Therefore, by reading the QR code on the FAX preview guide screen 1500 using the mobile terminal 110, the user can display the remote FAX preview on the mobile terminal 110 with a reduced number of procedural operations than in the first embodiment. Note that similar to the first embodiment, it is also possible to cause the FAX preview to be displayed on the console section 104 of the multifunction peripheral 100 from the FAX preview guide screen 1500, i.e. it is also possible to perform the local FAX preview.

FIG. 16A is a flowchart of a process for controlling the display of the FAX preview guide screen for displaying the FAX preview guide screen 1500 on the console section 104 of the multifunction peripheral 100. Each processing operation (step) denoted by S number in the present flowchart is realized by the CPU 101 that loads a predetermined program stored in the ROM 102 into the DRAM 103 to perform centralized control of the operations of the components of the multifunction peripheral 100.

In a step S1601, the CPU 101 acquires data of the FAX preview guide screen to be displayed on the console section 104. In the following step S1602, the CPU 101 executes a process for processing FAX preview guide screen data to process the data of the FAX preview guide screen, which is acquired in the step S1601. Details of the process for processing FAX preview guide screen data in the step S1602 will be described hereinafter with reference to FIG. 16B. In the following step S1603, the CPU 101 displays the FAX preview guide screen processed in the step S1602 on the console section 104. In the following step S1604, the CPU 101 executes the process for controlling the display of the FAX preview guide screen 1500, followed by terminating the present process. Note that the process in the step S1604 is the same as the process for controlling the display of the FAX preview guide screen 500, described with reference to FIG. 9B (steps S904 to S909) in the first embodiment, and hence detailed description thereof is omitted here.

FIG. 16B is a flowchart of the process for processing FAX preview guide screen data in the step S1602 in FIG. 16A. In a step S1605, the CPU 101 executes the remote FAX preview authentication information generation process to generate authentication information for the FAX preview. Note that the process in the step S1605 is the same as the remote FAX preview authentication information generation process described with reference to FIG. 11B (steps S1105 to S1108) in the first embodiment, and hence detailed description thereof is omitted here.

In the following step S1606, the CPU 101 executes the remote FAX preview URL generation process to generate a URL for the FAX preview. Note that the remote FAX preview URL generation process in the step S1606 is the same as the remote FAX preview URL generation process, described with reference to FIG. 11C (steps S1109 to S1113) in the first embodiment, and hence detailed description thereof is omitted here.

In the following step S1607, the CPU 101 generates an image of a QR code. Note that the processing in the step S1607 is the same as the step S1103 in the remote FAX preview guide control process in FIG. 11A in the first embodiment. In the following step S1608, the CPU 101 synthesizes the QR code generated in the step S1607 with the FAX preview guide screen acquired in the step S1601, followed by terminating the present process.

Note that for image synthesis in the step S1608, there can be used e.g. a method of decoding image data of a QR code and synthesizing the decoded image data with the image data of the FAX preview guide screen to thereby generate one image data item. However, this is not limitative, but there may be employed a method of designating an order and coordinates for displaying each image data item of the FAX preview guide screen and each image data item of the QR code and superimposing the image data items for display.

Thus, in the second embodiment, in a case where a print error occurs when FAX data is received, it is possible to more easily perform the remote FAX preview.

Next, a third embodiment of the present invention will be described. In the first and second embodiments, the present invention is applied to the multifunction peripheral as an example of the image forming apparatus, and the FAX preview guide screen is displayed on the console section (display) of the multifunction peripheral. However, the present invention is applied not only to the multifunction peripheral (image forming apparatus), but can be applied to an apparatus equipped with a function of receiving FAX data. Therefore, in the third embodiment, a description will be given of a form in which the present invention is applied to an information processing apparatus capable of having at least a console device and a printer connected thereto. Note that description of details of components of the information processing apparatus, the console device, a scanner, a printer, and a mobile terminal, which are common with those in the first and second embodiments, is omitted.

Figure 17:
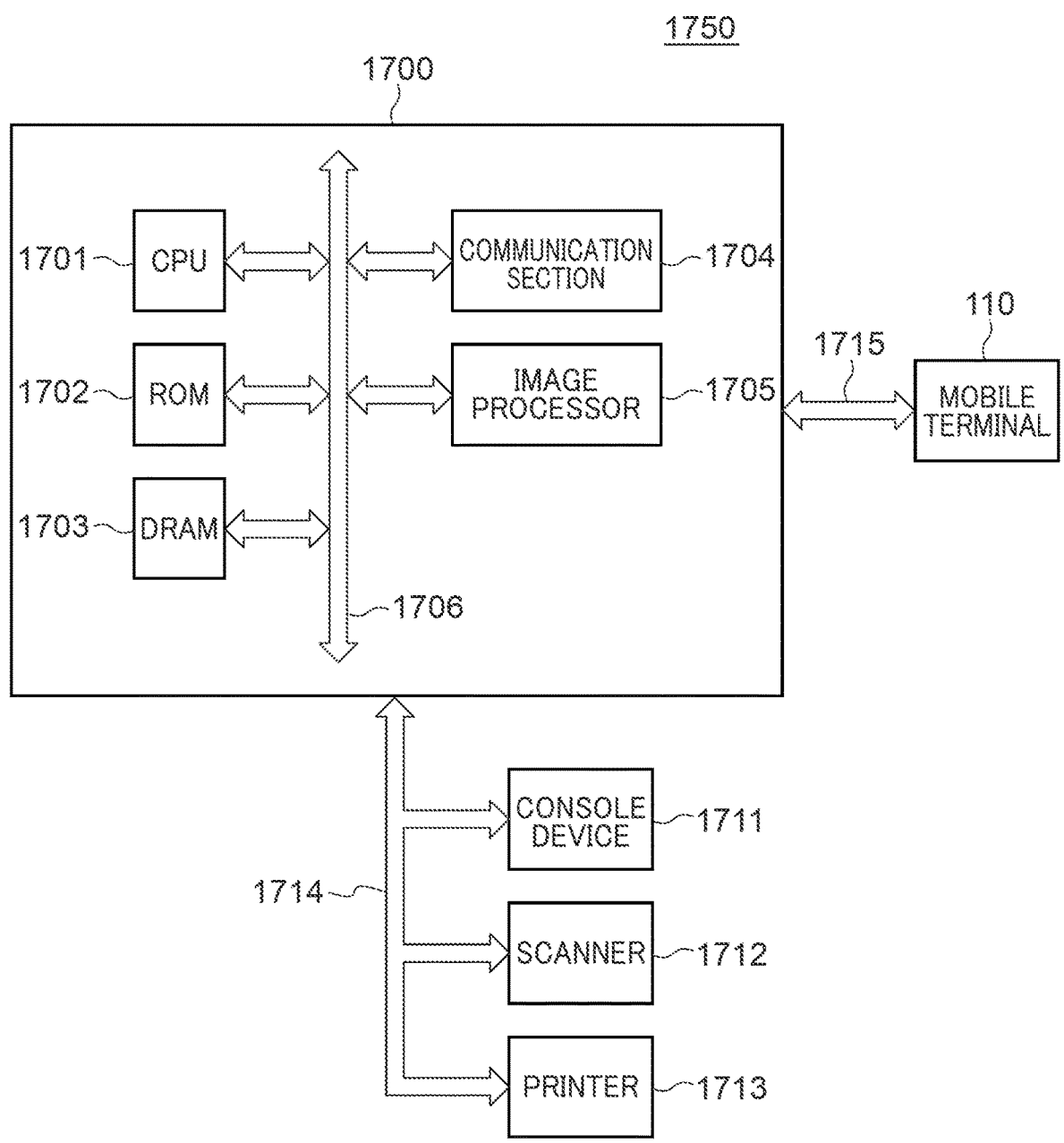
FIG. 17 is a diagram showing a schematic configuration of an information processing system according to a third embodiment of the present invention.

FIG. 17 is a diagram showing a schematic configuration of an information processing system 1750 according to the third embodiment. The information processing system 1750 has the configuration in which the mobile terminal 110 is communicably connected to the information processing apparatus, denoted by reference numeral 1700, via a network 1715, and the console device, denoted by reference numeral 1711, the scanner, denoted by reference numeral 1712, and the printer, denoted by reference numeral 1713 are connected to the information processing apparatus 1700 via a communication cable 1714. Note that examples of the communication cable 1714 include a USB cable. Further, a wireless connection, such as a wireless LAN, may be used in place of a wired connection using the communication cable 1714.

The information processing apparatus 1700 includes a CPU 1701, a ROM 1702, a DRAM 1703, a communication section 1704, and an image processor 1705, and these components are communicably connected via a data bus 1706. The CPU 1701, the ROM 1702, the DRAM 1703, the communication section 1704, and the image processor 1705 have the functions corresponding to the CPU 101, the ROM 102, the DRAM 103, the communication section 107, and the image processor 108, included in the multifunction peripheral 100 in the first embodiment, respectively. Further, the console device 1711, the scanner 1712, and the printer 1713 are devices corresponding to the console section 104, the scanner unit 105, and the print unit 106, included in the multifunction peripheral 100 in the first embodiment, respectively, and can be attached to and removed from the information processing apparatus 1700. The console device 1711 is assumed to have a so-called touch panel.

Figure 18A:
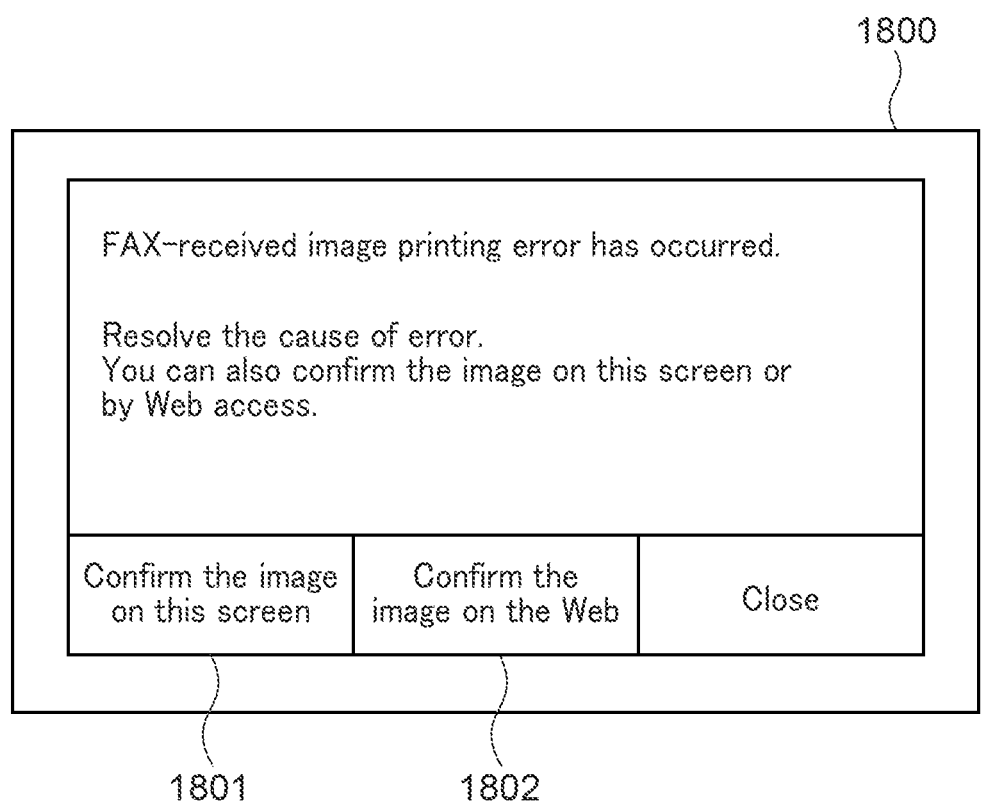
FIGS. 18A to 18F are diagrams each showing an example of a FAX preview guide screen displayed on a console device connected to an information processing apparatus in the third embodiment.

FIGS. 18A to 18F are diagrams each showing an example of a FAX preview guide screen generated by the information processing apparatus 1700 according to the screen size of the console device 1711 connected to the information processing apparatus 1700. FIG. 18A shows an example of a FAX preview guide screen 1800 for a Wide Video Graphics Array (WVGA) size (first size). The display screen of the WVGA size is large enough to display a FAX image. Therefore, the FAX preview guide screen 1800 includes not only a "Confirm the image on the Web" button 1802 for the remote FAX preview, but also a "Confirm the image on this screen" button 1801 for performing the FAX preview on the console device 1711.

On the other hand, in a case where the screen size of the console device 1711 is small and is not large enough to display a FAX image, even when the FAX image is displayed on the console device 1711, the user cannot sufficiently confirm the contents. To solve this problem, the information processing apparatus 1700 generates a FAX preview guide screen dependent on the screen size of the console device 1711.

Figure 18B:
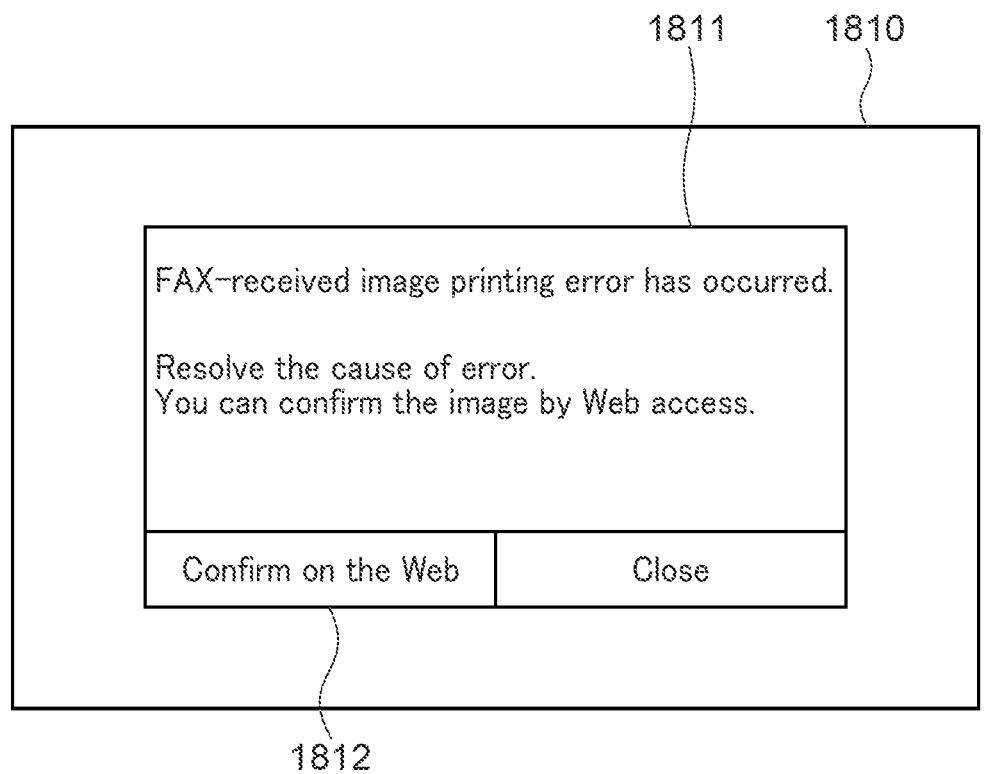
Figure 18C:
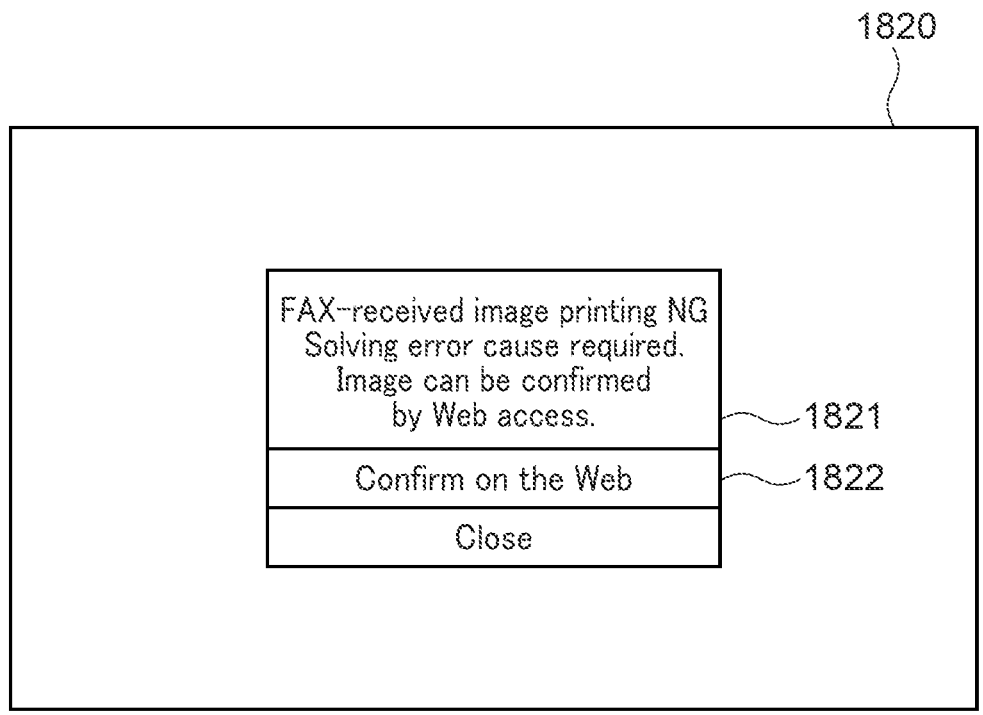

FIG. 18B shows an example of a FAX preview guide screen 1811 for a Quarter Video Graphics Array (QVGA) size (second size). Note that an outer frame 1810 in FIG. 18B is indicated in the WVGA size, and an area illustrated in a central part in FIG. 18B corresponds to the FAX preview guide screen 1811 displayed in the QVGA size. FIG. 18C shows an example of a FAX preview guide screen 1821 for a 1.44-inch size smaller than the QVGA size. Note that an outer frame 1820 in FIG. 18C is indicated in the WVGA size, and an area illustrated in a central part in FIG. 18C corresponds to the FAX preview guide screen 1821 displayed in the 1.44-inch size.

Figure 18D:

FIG. 18D shows an example of a remote FAX preview guide screen 1830 for the WVGA size. The remote FAX preview guide screen 1830 is displayed on the console device 1711 when the "confirm on the Web" button 1802 is pressed on the FAX preview guide screen 1800.

Figure 18E:

FIG. 18E shows an example of a remote FAX preview guide screen 1841 for the QVGA size. The remote FAX preview guide screen 1841 is displayed on the console device 1711 when the "confirm on the Web" button 1812 is pressed on the FAX preview guide screen 1810. Note that an outer frame 1840 in FIG. 18E is indicated in the WVGA size, and an area illustrated in a central part in FIG. 18E corresponds to the remote FAX preview guide screen displayed in the QVGA size.

Figure 18F:
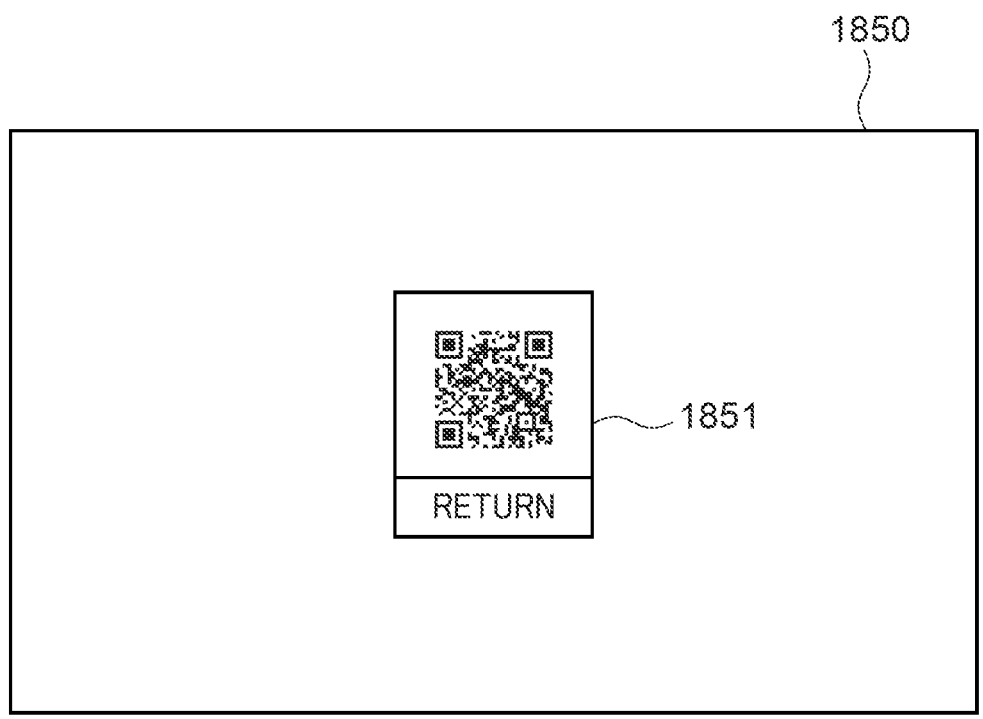

FIG. 18F shows an example of a remote FAX preview guide screen 1851 for the 1.44-inch size. The remote FAX preview guide screen 1851 is displayed on the console device 1711 when a "confirm on the Web" button 1822 is pressed on the FAX preview guide screen 1820. Note that an outer frame 1850 in FIG. 18F is indicated in the WVGA size, and an area illustrated in a central part in FIG. 18F corresponds to the remote FAX preview guide screen 1851 displayed in the 1.44-inch size. Although it is impossible to substantially confirm the FAX image on the console device 1711 of the QVGA size or the 1.44-inch size, the QR code can be sufficiently displayed.

Note that here, the FAX preview guide screen is displayed by differentiating the same according to whether or not the FAX preview can be performed on the console device 1711, i.e. depending on whether the size of the screen of the console device 1711 is the WVGA size, the QVGA size, or a size smaller than the QVGA size. However, the screen sizes used as criteria for determining what type of the FAX preview guide screen is to be displayed are not limited to the WVGA size and the QVGA size.

Figure 19A:
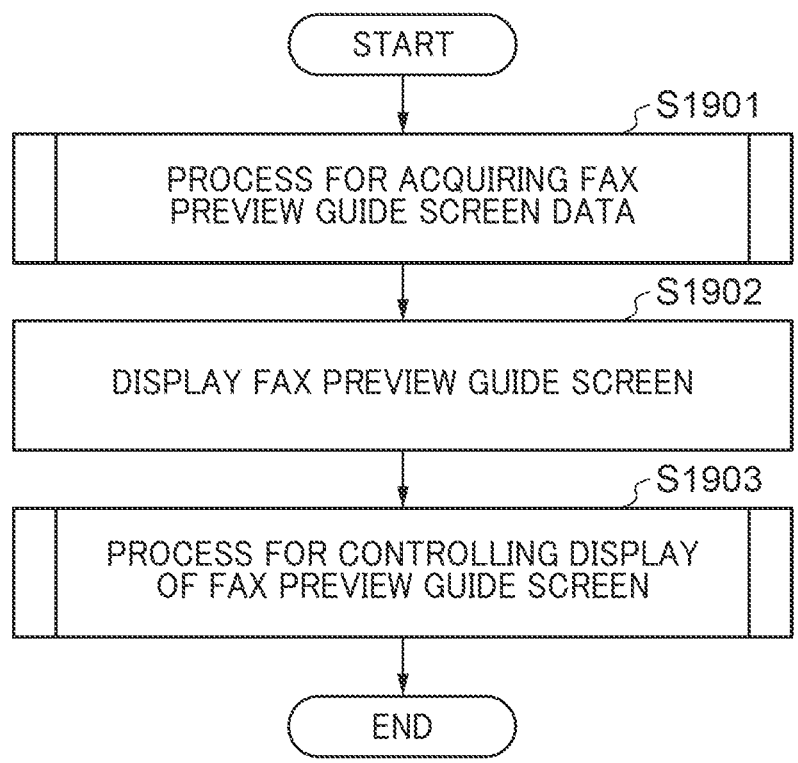
FIG. 19A is a flowchart of a process for controlling the display of the FAX preview guide screen shown in FIGS. 18A to 18F.

FIG. 19A is a flowchart of a process for controlling the display of the FAX preview guide screen for displaying one of the FAX preview guide screens 1800, 1810, and 1820 according to the screen size of the console device 1711. Each processing operation (step) denoted by S number in the present flowchart is realized by the CPU 1701 that loads a predetermined program stored in the ROM 1702 into the DRAM 1703 to perform centralized control of the operations of the components of the information processing apparatus 1700.

In a step S1901, the CPU 1701 executes a process for acquiring FAX preview guide screen data to acquire data of the FAX preview guide screen. Details of the process for acquiring FAX preview guide screen data in the step S1901 will be described hereinafter with reference to FIG. 19B. In the following step S1902, the CPU 1701 displays the FAX preview guide screen acquired in the step S1901 on the console device 1711. In the following step S1903, the CPU 1701 executes a process for controlling the display of the FAX preview guide screen to control the display of the FAX preview guide screen, followed by terminating the present process. Note that the process in the step S1903 follows the process for controlling the display of the FAX preview guide screen in FIG. 9B (steps S904 to S909).

Figure 19B:
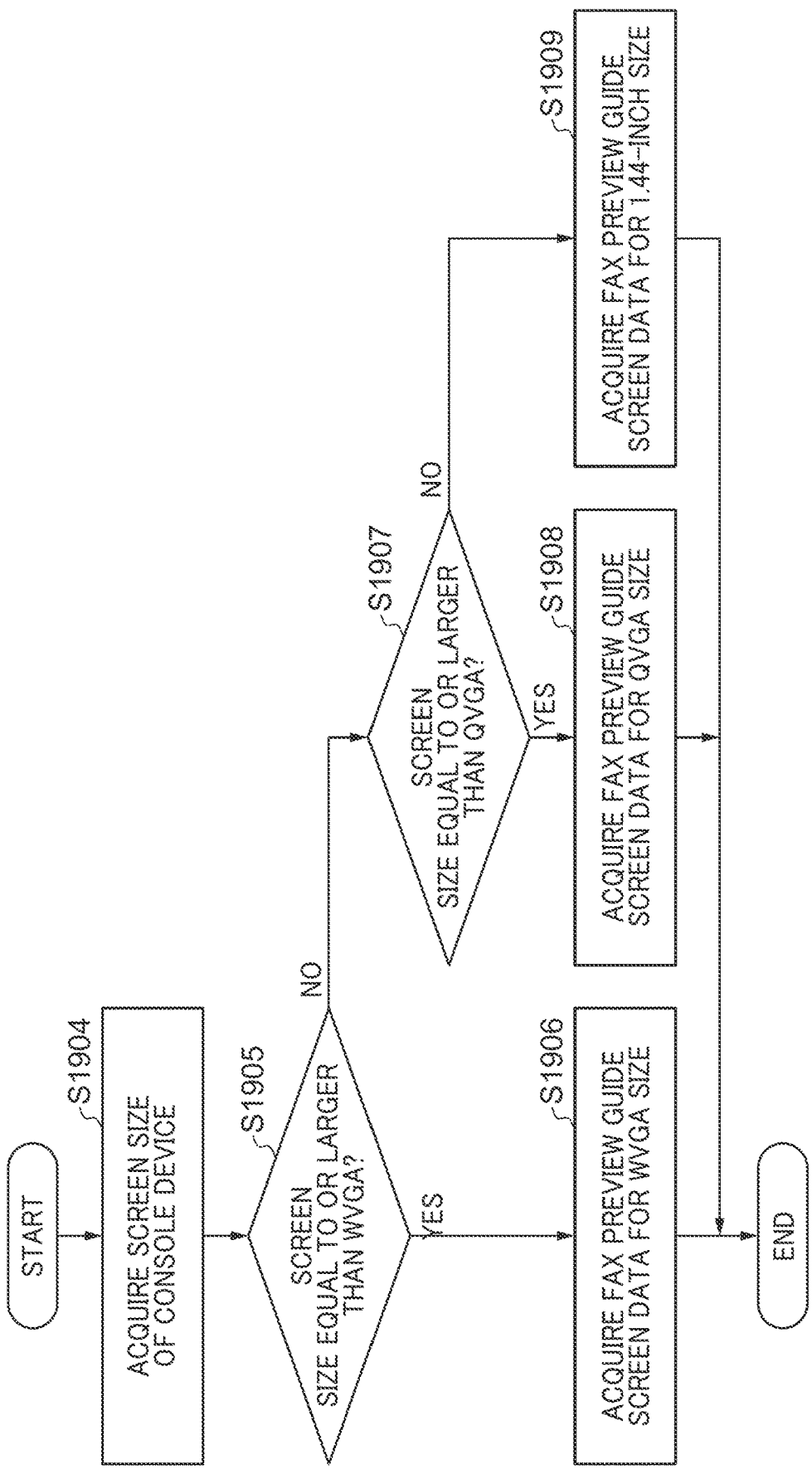
FIG. 19B is a flowchart of a process for acquiring FAX preview guide screen data.

FIG. 19B is a flowchart of the process for acquiring FAX preview guide screen data in the step S1901 in FIG. 19A. In a step S1904, the CPU 1701 acquires the screen size of the console device 1711. In the following step S1905, the CPU 1701 determines whether or not the screen size of the console device 1711 is equal to or larger than the WVGA size. If it is determined that the screen size is equal to or larger than the WVGA size (YES to S1905), the CPU 1701 executes a step S1906, whereas if it is determined that the screen size is smaller than the WVGA size (NO to S1905), the CPU 1701 executes a step S1907.

In the step S1906, the CPU 1701 acquires the screen data of the FAX preview guide screen 1800 for the WVGA size, followed by terminating the present process. In the step S1907, the CPU 1701 determines whether or not the screen size of the console device 1711 is equal to or larger than the QVGA size. If it is determined that the screen size is equal to or larger than the QVGA size (YES to S1907), the CPU 1701 executes a step S1908, whereas if it is determined that the screen size is smaller than the QVGA size (NO to S1907), the CPU 1701 executes a step S1909.

In the step S1908, the CPU 1701 acquires the screen data of the FAX preview guide screen 1810 for the QVGA size, followed by terminating the present process. In the step S1909, the CPU 1701 acquires the screen data of the FAX preview guide screen 1820 for the 1.44-inch size, followed by terminating the present process. Thus, it is possible to acquire the screen data suitable for the screen size of the console device 1711, i.e. screen data of a suitable one of the FAX preview guide screens 1800, 1810, and 1820.

As described above, in the third embodiment, it is possible to display the FAX preview guide screen suitable for the screen size of the console device 1711, which enables a user to easily and positively confirm a FAX image on the console device 1711 or on the mobile terminal 110.

Note that similar to the FAX preview guide screen 1500 shown in FIG. 15 in the second embodiment, a QR code for the remote FAX preview may be included in each of the FAX preview guide screens 1800, 1810, and 1820 in the third embodiment. Further, although in the process for acquiring FAX preview guide screen data in FIG. 19B, the two sizes of the WVGA size and the QVGA size are used as the criteria for determining the screen size of the console device 1711, the FAX preview guide screen may be displayed using one criterion or three or more criteria.

Next, a fourth embodiment of the present invention will be described. Among the multifunction peripherals, many are configured to print, in a case where the small toner remaining amount-time print setting is set to on, FAX-received data without displaying the FAX preview guide screen even when the toner remaining amount in a cartridge is small. Further, there are many multifunction peripherals that cannot perform function setting on a user-by-user basis, and in this case, if one of users sets the small toner remaining amount-time print setting to on, this setting is applied to all the users. In this case, a user who desires to always confirm the FAX-received data using the FAX preview in a case where the toner remaining amount is small suffers a disadvantage. However, if the small toner remaining amount-time print setting is set to off, a user who desires to perform printing even in a case where the toner remaining amount is small is required to change the setting every time.

To eliminate this inconvenience, in the fourth embodiment, there is employed a configuration that makes it possible, in a case where the toner remaining amount is small, to easily perform printing from the FAX preview guide screen while displaying the FAX preview guide screen. Although this configuration can be applied to the multifunction peripheral 100 and the information processing apparatus 1700, here, the description is given of a form in which the configuration is applied to the multifunction peripheral 100.

Figure 20A:
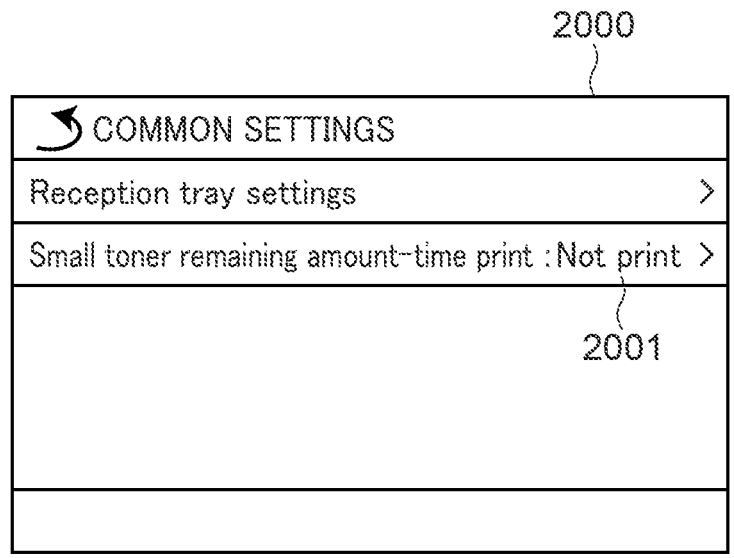
FIGS. 20A to 20D are diagrams showing an example of screens for making print settings and a FAX preview guide screen in a case where a toner remaining amount is small in an information processing system according to a fourth embodiment of the present invention.

FIG. 20A shows a common settings screen 2000 for performing the small toner remaining amount-time print setting. Note that the common settings screen 2000 is the same as the common settings screen 330 shown in FIG. 3.

In the illustrated example in FIG. 20A, the small toner remaining amount-time print setting is set to off ("NOT PRINT" 2001) at present.

Figure 20B:
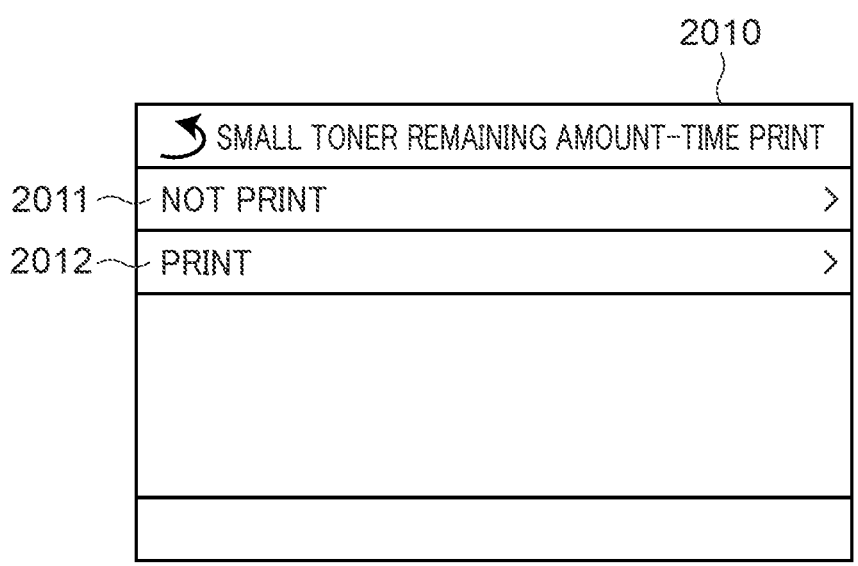

FIG. 20B shows a conventional setting screen 2010 for setting on/off of the small toner remaining amount-time print setting. On the setting screen 2010, it is necessary to select one of on ("PRINT" 2012) and off ("NOT PRINT" 2011), and hence the above-described problem is caused.

Figures 20C, 20D:
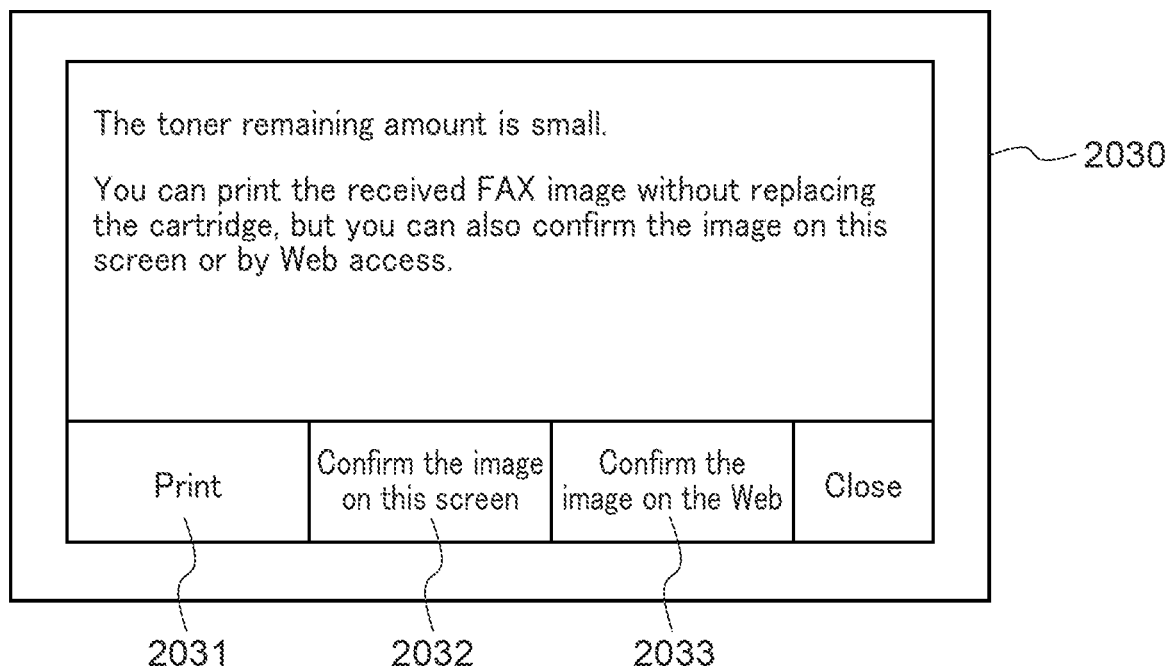

On the other hand, FIG. 20C shows a setting screen 2020 according to the present embodiment, for performing the small toner remaining amount-time print setting. Similar to the conventional setting, the setting for a case where the user intends not to perform printing when the toner remaining amount is small is "NOT PRINT 2021". On the other hand, for a case where the user intends to perform printing even when the toner remaining amount is small, there are provided two settings of "PRINT (not confirm before printing)" 2022 and "PRINT (always confirm before printing)" 2023.

The setting of "PRINT (not confirm before printing) 2022 is the same as the setting of "PRINT" 2012 in the setting screen 2010, and the FAX preview guide screen is not displayed. In a case where the setting of "PRINT (always confirm before printing) 2023 is selected and set, if FAX data is received in a state in which the toner remaining amount is small, a FAX preview guide screen 2030 shown in FIG. 20D is displayed on the console section 104. Therefore, each user of the multifunction peripheral 100 can select and execute an operation (processing) desired to perform, out of forced printing ("Print" button 2031), the local FAX preview ("Confirm the image on this screen" button 2032), and the remote FAX preview ("Confirm the image on the Web" button 2033) of the FAX-received data from the FAX preview guide screen 2030. Thus, it is possible to solve the above-described problem.

Figure 21:
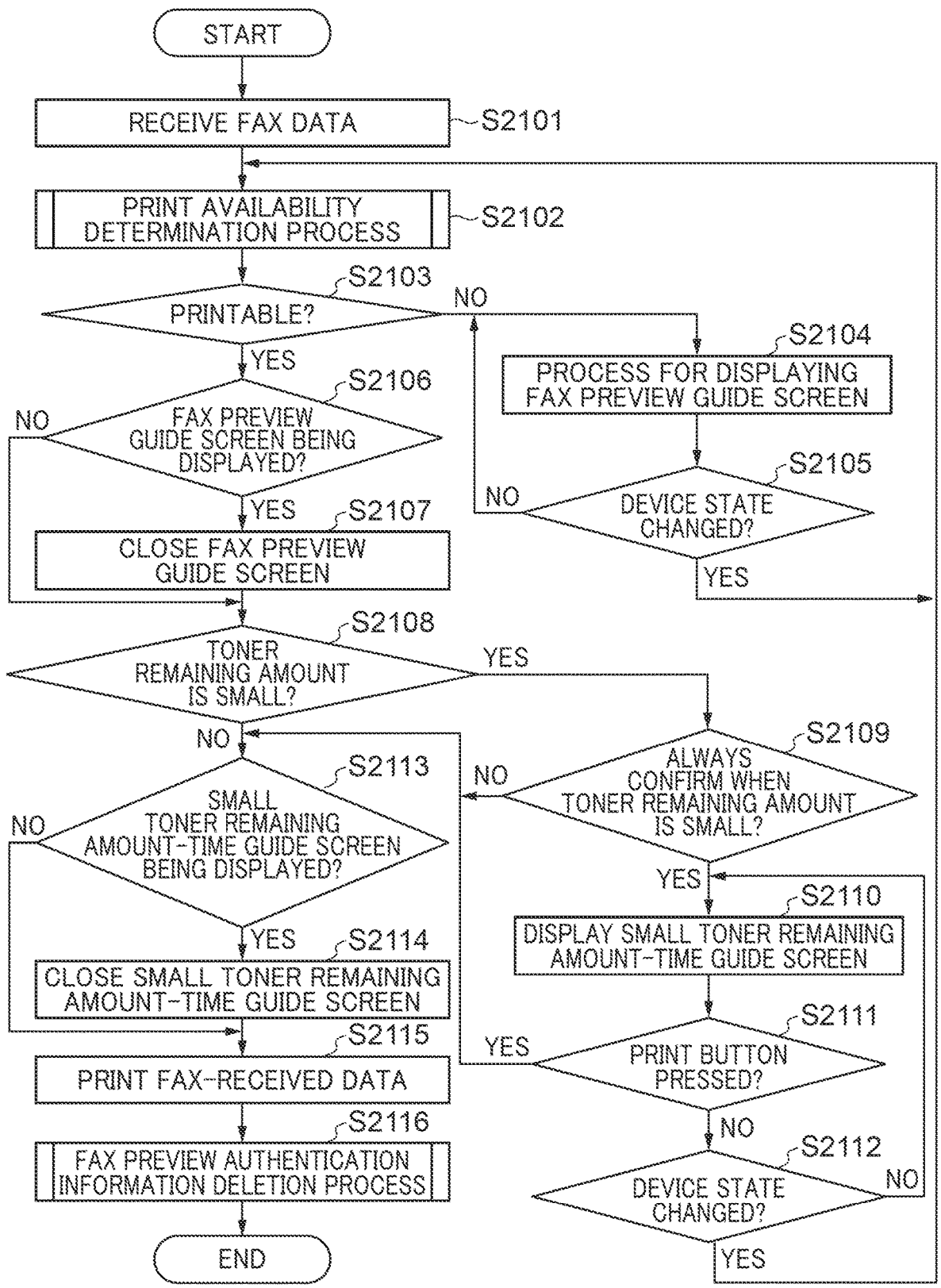
FIG. 21 is a flowchart of a control process performed when FAX data is received by a multifunction peripheral in the fourth embodiment.

FIG. 21 is a flowchart of a control process performed by the multifunction peripheral 100 when FAX data is received in the fourth embodiment. Each processing operation (step) denoted by S number in the present flowchart is realized by the CPU 101 that loads a predetermined program stored in the ROM 102 into the DRAM 103 to perform centralized control of the operations of the components of the multifunction peripheral 100.

In a step S2101, the CPU 101 acquires FAX data via the communication section 107. The FAX data is temporarily stored in the DRAM 103 while the data is being received, and is stored in the ROM 102 after the reception is completed. In the following step S2102, the CPU 101 executes the printing availability determination process to determine whether or not the print unit 106 is in a state capable of printing the FAX-received data. Note that the printing availability determination process in the step S2102 is the same as the printing availability determination process described with reference to FIG. 8 in the first embodiment (steps S801 to S806), and hence detailed description thereof is omitted here.

In the following step S2103, the CPU 101 determines whether or not a result of the determination in the step S2102 indicates that printing can be executed. If the result of the determination in the step S2102 indicates that printing cannot be executed (unprintable) (NO to S2103), in a step S2104, the CPU 101 executes the process for displaying a FAX preview guide screen. Note that the process for displaying a FAX preview guide screen in the step S2104 is the same as the process for displaying a FAX preview guide screen described with reference to FIG. 9A in the first embodiment (steps S901 to S903), and hence detailed description thereof is omitted here.

In the following step S2105, the CPU 101 determines whether or not the device state of the multifunction peripheral 100 has been changed. If it is determined that the device state has not been changed (NO to S2105), the CPU 101 executes the step S2104 to continue to display the FAX preview guide screen. On the other hand, if it is determined that the device state has been changed (YES to S2105), the CPU 101 returns to the step S2102 to determine again whether or not the FAX-received data can be printed by executing the printing availability determination process. This makes it possible to immediately print the FAX-received data in a case where a cause of printing unavailability is eliminated e.g. by replenishing recording sheets or replacing a toner cartridge with a new one while the FAX preview guide screen is being displayed.

If the result of the determination in the step S2103 indicates that printing can be executed (YES to S2103), the CPU 101 determines in a step S2106 whether or not the FAX preview guide screen is being displayed. If it is determined that the FAX preview guide screen is being displayed (YES to S2106), the CPU 101 executes a step S2107, whereas if it is determined that the FAX preview guide screen is not being displayed (NO to S2106), the CPU 101 executes a step S2108.

In the step S2107, the CPU 101 closes the FAX preview guide screen and the process proceeds to the step S2108. In the step S2108, the CPU 101 determines whether or not the toner remaining amount in the print unit 106 is small. Whether or not the toner remaining amount is small is determined based on whether or not the toner remaining amount is equal to or smaller than a predetermined amount. If it is determined that the toner remaining amount is small (YES to S2108), the CPU 101 executes a step S2109, whereas if it is determined that the toner remaining amount is not small (NO to S2108), the CPU 101 executes a step S2113.

In the step S2109, the CPU 101 determines whether or not the setting of "always confirm before printing" 2023 has been made for a case where the toner remaining amount is small. If it is determined that the setting of "always confirm before printing" 2023 has been made (YES to S2109), the CPU 101 executes a step S2110, whereas if it is determined that the setting of "always confirm before printing" 2023 has not made (the setting of "not confirm before printing" 2022 has been made) (NO to S2109), the CPU 101 executes the step S2113.

In the step S2110, the CPU 101 displays the FAX preview guide screen for the case where the toner remaining amount is small, on the console section 104. Note that in the present embodiment, the FAX preview guide screen 2030 is displayed on the console section 104, and the same display process as the process for displaying a FAX preview guide screen described with reference to FIG. 9A (steps S901 to S903) is performed.

In the following step S2111, the CPU 101 determines whether or not a print button ("Print") 2031 on the FAX preview guide screen 2030 has been pressed. If it is determined that the print button 2031 has been pressed (YES to S2111), the CPU 101 executes the step S2113, whereas if it is determined that the print button 2031 has not been pressed (NO to S2111), the CPU 101 executes a step S2112.

In the step S2112, the CPU 101 determines whether or not the device state of the multifunction peripheral 100 has been changed. If it is determined that the device state of the multifunction peripheral 100 has not been changed (NO to S2112), the CPU 101 returns to the step S2110 to continue to display the FAX preview guide screen for the case where the toner remaining amount is small. On the other hand, if it is determined that the device state of the multifunction peripheral 100 has been changed (YES to S2112), the CPU 101 executes the process in the step S2102 to re-execute the process from the determination of whether or not the FAX-received data can be printed.

In the step S2113, the CPU 101 determines whether or not the FAX preview guide screen 2030 is being displayed on the console section 104. If it is determined that the FAX preview guide screen 2030 is being displayed (YES to S2113), the CPU 101 executes a step S2114, whereas if it is determined that the FAX preview guide screen 2030 is not being displayed (NO to S2113), the CPU 101 executes a step S2115.

In the step S2114, the CPU 101 closes the FAX preview guide screen 2030 and proceeds to the step S2115. In the step S2115, the CPU 101 reads out the FAX-received data from the ROM 102, writes the read data into the DRAM 103, and prints the FAX-received data by the print unit 106. Note that when printing is completed, the FAX-received data is deleted from the DRAM 103 and the ROM 102. In the following step S2116, the CPU 101 deletes the authentication information for the FAX preview, followed by terminating the present process. Note that the process in the step S2116 is the same as the FAX preview authentication information deletion process described with reference to FIG. 12 (steps S1201 to S1202) in the first embodiment.

As described above, in the fourth embodiment, in the multifunction peripheral used by a plurality of users sharing the same settings, it is possible to reduce disadvantage caused to some of the users who desire different settings with respect to the small toner remaining amount-time print setting. With this, it is also possible to save the time and effort for printing and previewing the FAX-received data.

Next, a fifth embodiment of the invention will be described. In the first to fourth embodiments, the FAX preview guide screen is displayed under a situation in which the FAX-received data cannot be printed, whereby a user is enabled to easily confirm the FAX image from the FAX preview guide screen. This method is sufficient for one user to confirm the FAX image.

However, in a case where a plurality of users desire to confirm the FAX-received data (FAX image), it is necessary for the users to gather in front of the console section 104 and confirm the data or it is necessary for one of the users to perform the remote FAX preview and acquire a screen shot of the mobile terminal 110 to share the screen shot with the other users on the network. Therefore, in the present embodiment, a description will be given of a configuration in which, to enable a plurality of users to more easily confirm a FAX image, not only the FAX preview, but also download of FAX image data can be performed.

Figure 22A:
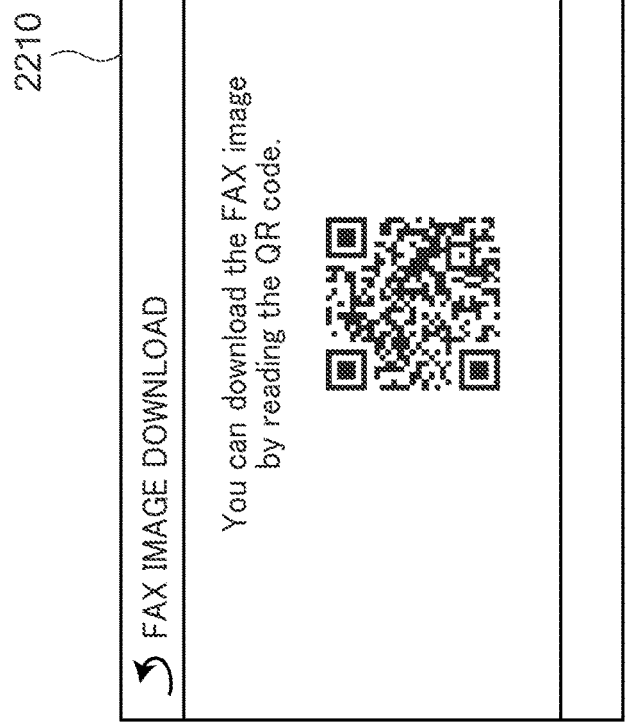
FIGS. 22A to 22C are diagrams showing an example of a FAX preview guide screen, a FAX image download guide screen, and a FAX image download screen in an information processing system according to a fifth embodiment of the present invention, respectively.

FIG. 22A is a diagram showing an example of a FAX preview guide screen in the fifth embodiment. On the FAX preview guide screen, denoted by reference numeral 2200, shown in FIG. 22A, the FAX image can be confirmed by the FAX preview on the console section 104 (pressing a "Confirm the image on this screen" button 2201) and by downloading FAX image data to the mobile terminal 110 (pressing a "Conform the image by downloading the image" button 2202).

Figure 22B:
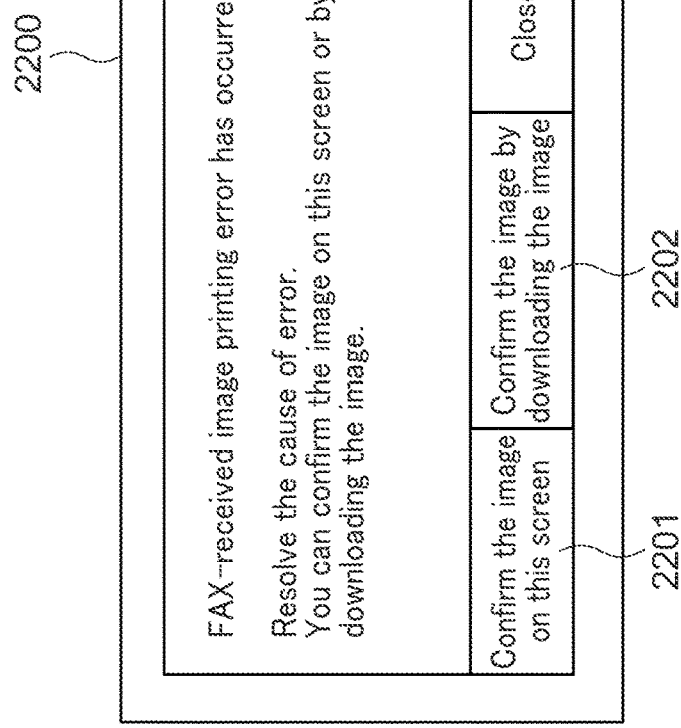
Figure 22C:
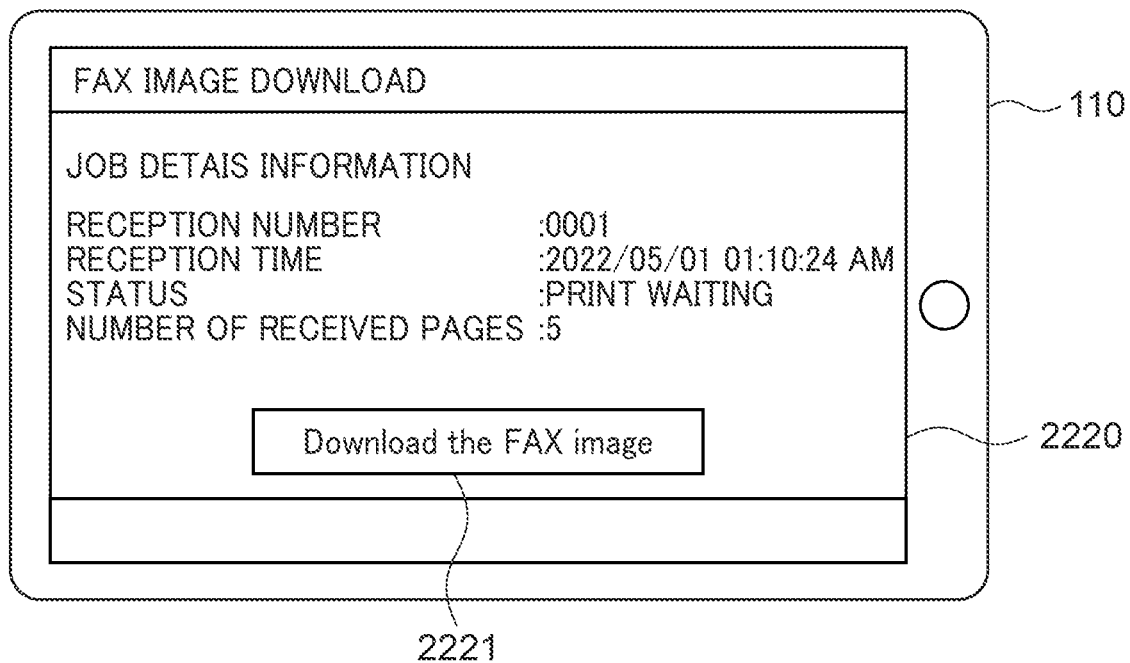

FIG. 22B is a diagram showing an example of a FAX image download guide screen (hereinafter referred to as the "FAX image DL guide screen") 2210 displayed on the console section 104 when the "Conform the image by downloading the image" button 2202 in the FAX preview guide screen 2200 is pressed. A QR code is displayed on the FAX image DL guide screen 2210 shown in FIG. 22B. The user can display a FAX image download page (hereinafter referred to as the "FAX image DL image") 2220 on the touch panel 114 of the mobile terminal 110 by reading the QR code using the mobile terminal 110. FIG. 22C is a diagram showing an example of the FAX image DL page 2220. When a "Download the FAX image" button 2221 in the FAX image DL page 2220 in FIG. 22C is pressed, FAX image data is downloaded into the mobile terminal 110 and stored in the ROM 102. Note that the FAX image may be automatically displayed on the touch panel 114 after completion of downloading of the FAX image data or may be displayed by starting a predetermined application.

FIG. 23A is a flowchart of a URL generation process for generating a URL for downloading FAX image data. Each processing operation (step) denoted by S number in the present flowchart is realized by the CPU 101 that loads a predetermined program stored in the ROM 102 into the DRAM 103 to perform centralized control of the operations of the components of the multifunction peripheral 100.

In a step S2301, the CPU 101 acquires a URL of the remote UI. In the following step S2302, the CPU 101 acquires a page name for downloading the FAX image data. In the following step S2303, the CPU 101 acquires an unused token which is authentication information for downloading the FAX image data, from the token management DB 600. In the following step S2304, the CPU 101 acquires the reception number of the FAX-received data to be downloaded. In the following step S2305, the CPU 101 generates a URL for downloading the FAX image data using the information acquired in the above-described processing operations (steps S2301 to S2304), followed by terminating the present process.

Thus, the URL for downloading the FAX image data is generated, and the FAX image DL guide screen 2210 including the QR code is displayed on the console section 104 by executing the remote FAX preview guide control process described with reference to FIG. 11A in the first embodiment (steps S1101 to S1104).

FIG. 23B is a flowchart of a display control process for displaying the FAX image DL page 2220 on the touch panel 114 of the mobile terminal 110. Each processing operation (step) denoted by S number in the present flowchart is realized by the CPU 101 that loads a predetermined program stored in the ROM 102 into the DRAM 103 to perform centralized control of the operations of the components of the multifunction peripheral 100.

Steps S2311 to 2316 are the same as the steps S1301 to 1306 in the remote FAX preview control process described with reference to FIG. 13 in the first embodiment, and hence description thereof is omitted.

If it is determined in a step S2316 that the received access is the first-time access (YES to S2316), the CPU 101 executes a step S2317, whereas if it is determined in the step S2316 that the received access is not the first-time access (NO to S2316), the CPU 101 executes a step S2318.

In the step S2317, the CPU 101 re-executes the process for controlling the display of the FAX image DL guide screen 2210. Note that, specifically, the process in the step S2317 is performed by the remote FAX preview guide control process described with reference to FIG. 11A in the first embodiment and the URL generation process in FIG. 23A. In the step S2318, the CPU 101 generates the FAX image DL page 2220 by executing a process for controlling generation of a FAX image download page and transmits the generated FAX image DL page 2220 to the mobile terminal 110 as a response, followed by terminating the present process. Note that details of the process for controlling generation of a FAX image download page in the step S2318 will be described hereinafter with reference to FIG. 23C.

When the FAX image DL page 2220 is displayed on the touch panel 114 of the mobile terminal 110, and a download button ("Download the FAX image" button 2221 in the FAX image DL page 2220) is pressed, a FAX image download request is transmitted to the multifunction peripheral 100. The multifunction peripheral 100 generates FAX preview image data corresponding to the FAX image download request from the mobile terminal 110 and transmits the generated FAX preview image data to the mobile terminal 110 as a response.

Figure 23C:
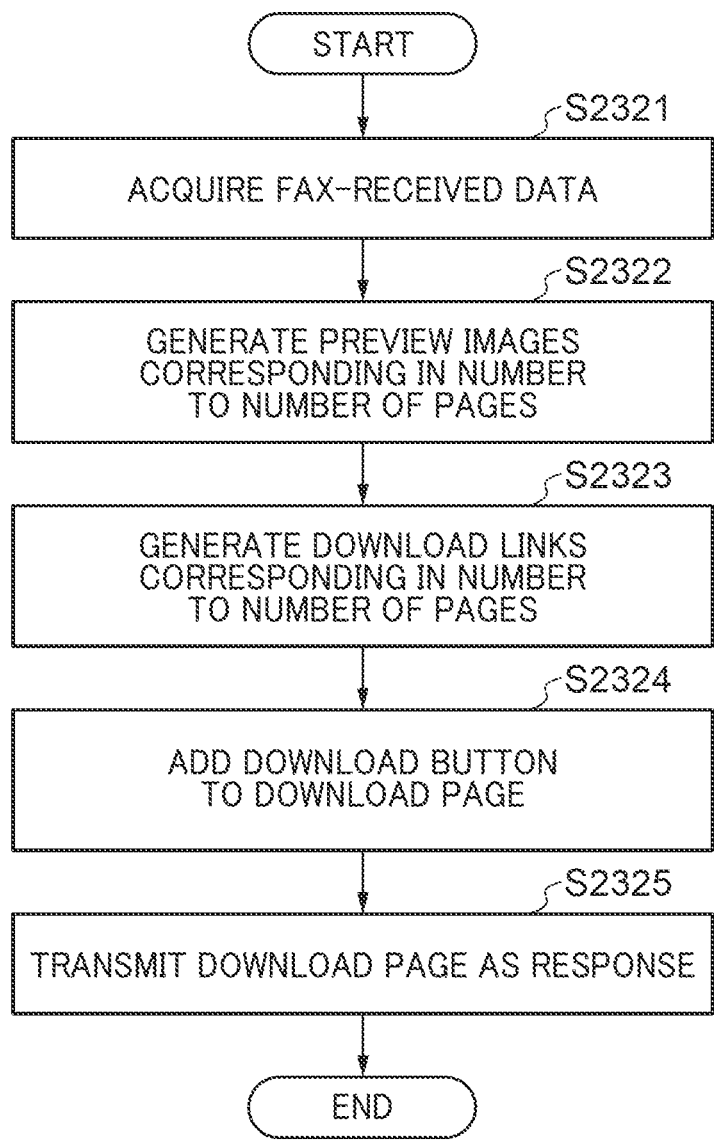
FIG. 23C is a flowchart of a process for controlling generation of a FAX image download page, which is performed in a step of the display control process in FIG. 23B.

FIG. 23C is a flowchart of the process for controlling generation of a FAX image download page in the step 2318. In a step S2321, the CPU 101 acquires the FAX-received data using the FAX reception number acquired in the step S2311 and detects the number of pages of the FAX image from the acquired FAX-received data. In the following step S2322, the CPU 101 controls the image processor 108 to generate FAX preview image data items corresponding in number to the number of pages detected in the step S2321. Note that the FAX preview image data is assumed to be displayed on a html page, and hence the FAX preview image data is generated in a format such as Joint Photographic Experts Group (JPEG) or Portable Network Graphics (PNG), which can be displayed on the touch panel 114 of the mobile terminal 110.

In the following step S2323, the CPU 101 generates download links corresponding in number to the number of pages generated in the step S2322. That is, the links for downloading the FAX preview image data items generated in the step S2322 are generated. In the following step S2324, the CPU 101 adds a download button ("Download the FAX image" button 2221) to the download page (FAX image DL page 2220). With this, when the download button 2221 is pressed, the download links generated in the step S2323 are executed. In the following step S2325, the CPU 101 transmits the downloaded pages to the mobile terminal 110 as a response, followed by terminating the present process.

As described above, in the fifth embodiment, it is possible to perform the FAX preview on the console section 104, download FAX image data items generated for the FAX preview to the mobile terminal 110, and display each FAX image data on the touch panel 114. Therefore, the plurality of users can easily confirm the FAX images by using a method convenient to each user.

Next, a sixth embodiment of the present invention will be described. In the first to fifth embodiments, in a case where the toner remaining amount is small and the small toner remaining amount-time print setting is set to off, it is impossible to print the FAX-received data. Therefore, to change the setting, it is necessary to shift the display from the menu to a setting changing screen and change the setting. In the sixth embodiment, this operation is simplified to display a guide which makes it possible to display a FAX preview, change the setting, and print the FAX image.

Figure 24A:
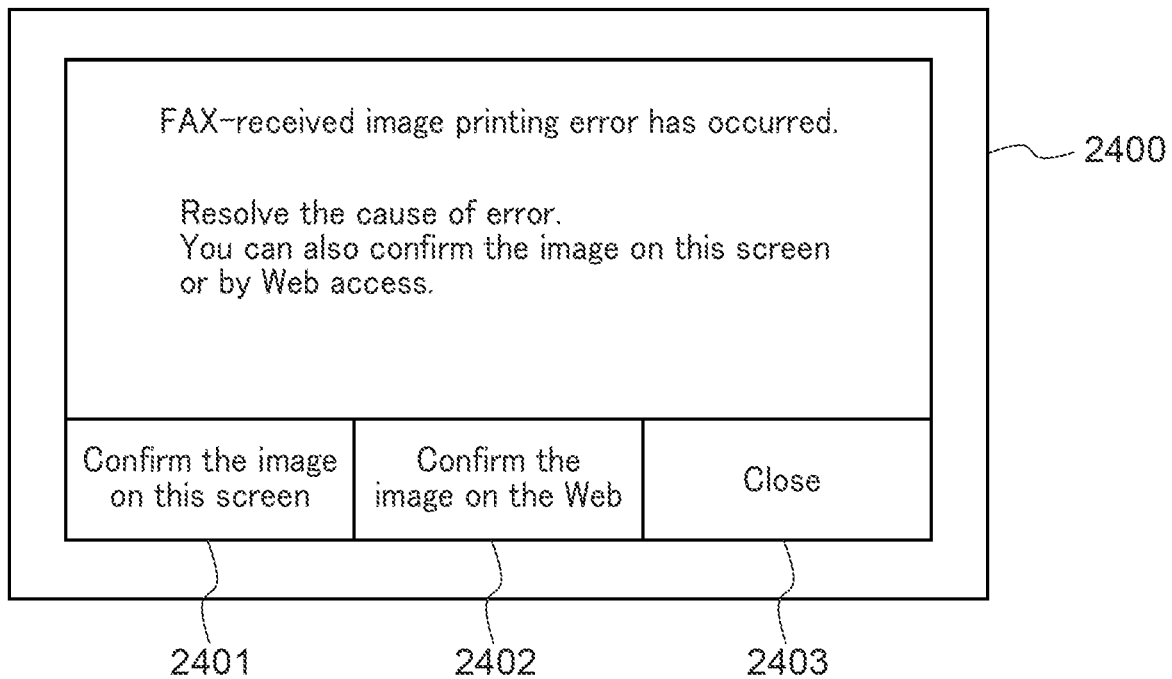
FIGS. 24A and 24B are diagrams each showing an example of a FAX preview guide screen displayed in an information processing system according to a sixth embodiment of the present invention.

FIG. 24A is a diagram showing an example of a FAX preview guide screen in the present embodiment. The FAX preview guide screen, denoted by reference numeral 2400 in FIG. 24A, is an example of the display in a case where a hardware operation (hereinafter referred to as the "HW operation") is required to resolve an error which makes it impossible to print FAX-received data. Examples of the HW operation include replenishing recording sheets and jam release. In a case where the HW operation is required, it is impossible to change the setting such that the FAX image is printed, by operating the console section 104. Therefore, the FAX preview guide screen 2400 is substantially the same screen as the FAX preview guide screen 500 shown in FIG. 5A in the first embodiment.

Figure 24B:
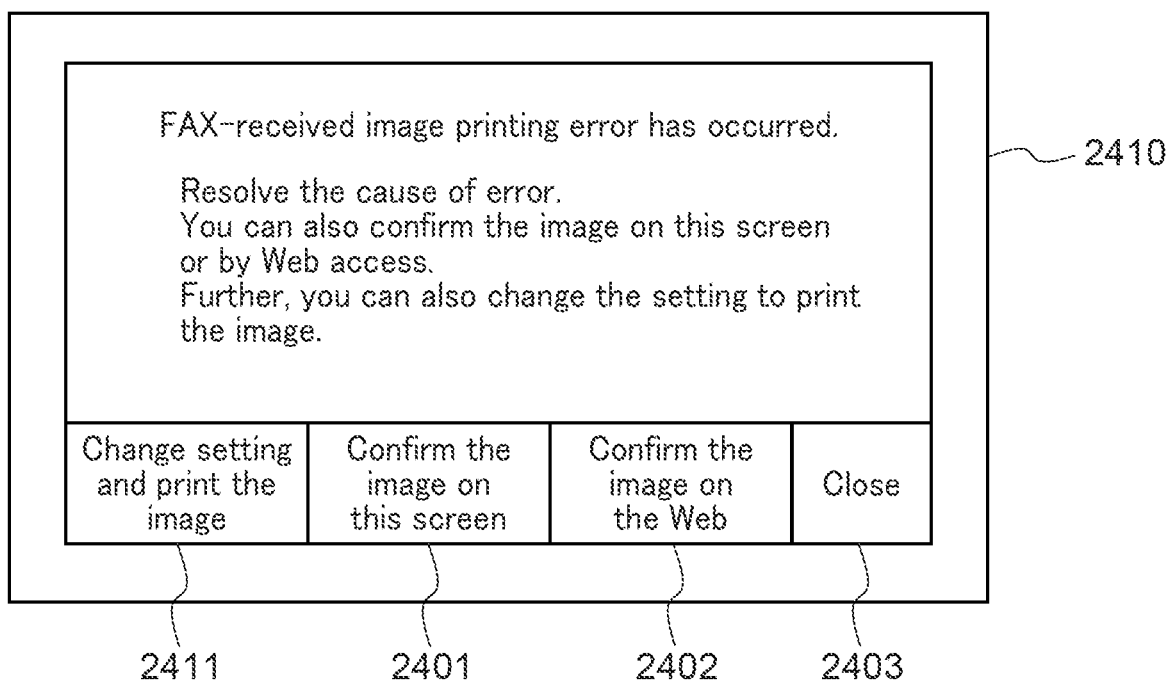

FIG. 24B is a diagram showing another example of the FAX preview guide screen in the sixth embodiment. A FAX preview guide screen 2410 is an example of the display in a case where a HW operation is not required to resolve an error which makes it impossible to print FAX-received data. The FAX preview guide screen 2410 includes, besides buttons 2401 to 2403 included in the FAX preview guide screen 2400, a "Change setting and print the image" button 2411 provided in addition. When the user presses the "Change setting and print the image" button 2411, the small toner remaining amount-time print setting is changed to on, and the FAX-received data is printed.

Figure 25B:
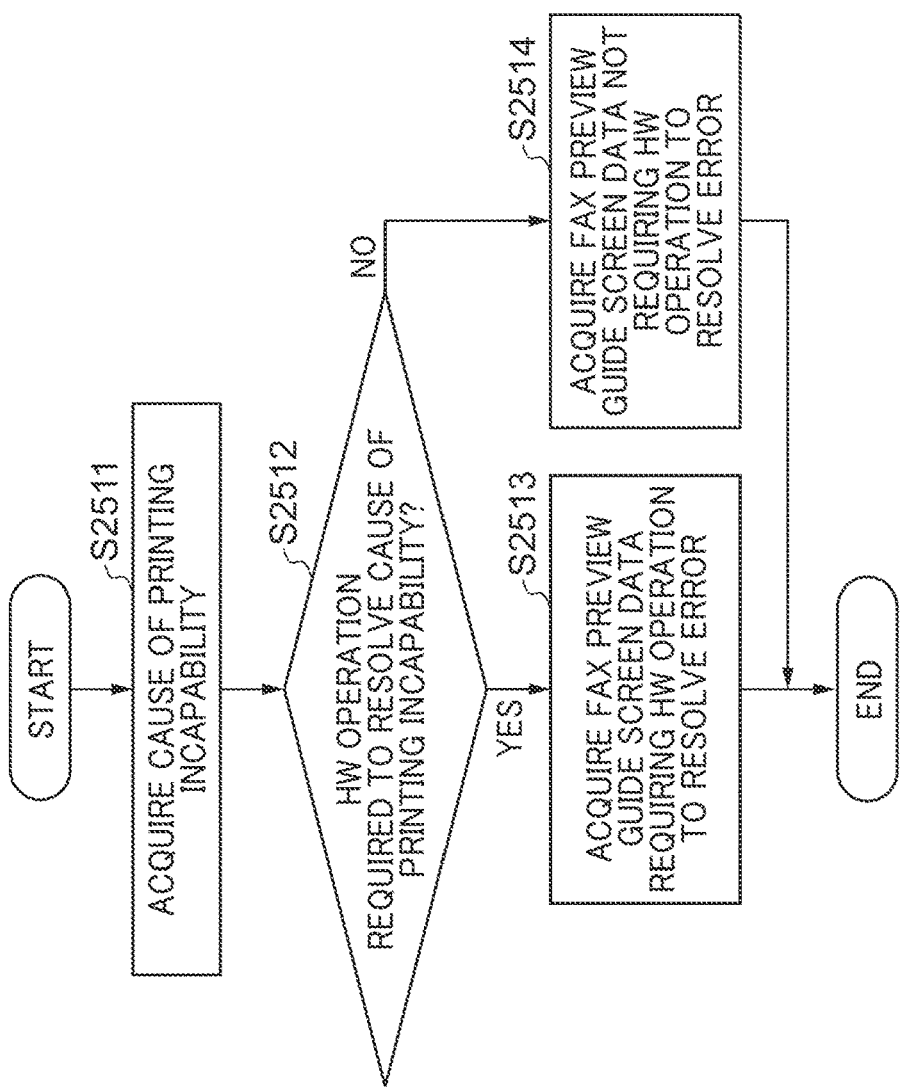
FIG. 25B is a flowchart of a process for acquiring FAX preview guide screen data, which is performed in a step of the process in FIG. 25A.
Figure 25A:
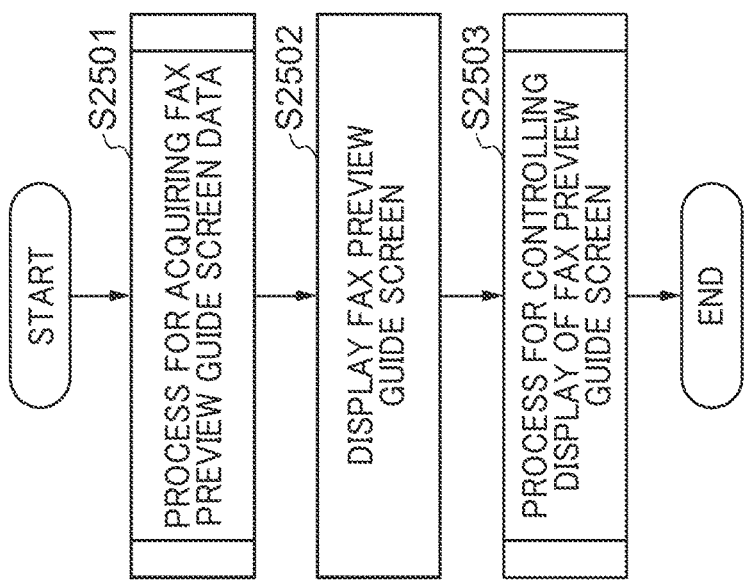
FIG. 25A is a flowchart of a process for controlling the display of the FAX preview guide screen in the sixth embodiment.

FIG. 25A is a flowchart of a control process for displaying the FAX preview guide screen on the console section 104 of the multifunction peripheral 100 in the sixth embodiment. Each processing operation (step) denoted by S number in the present flowchart is realized by the CPU 101 that loads a predetermined program stored in the ROM 102 into the DRAM 103 to perform centralized control of the operations of the components of the multifunction peripheral 100.

In a step S2501, the CPU 101 executes a process for acquiring FAX preview guide screen data to acquire a FAX preview guide screen (screen data). Note that details of the process for acquiring FAX preview guide screen data in the step S2501 will be described hereinafter with reference to FIG. 25B. In the following step S2502, the CPU 101 displays the FAX preview guide screen acquired in the step S2501 on the console section 104. In the following step S2503, the CPU 101 executes a process for controlling the display of the FAX preview guide screen to control the display of the FAX preview guide screen, followed by terminating the present process. Note that details of the process in the step S2503 will be described hereinafter with reference to FIG. 25C. Thus, it is possible to display the FAX preview guide screen 2400 or the FAX preview guide screen 2410 on the console section 104.

FIG. 25B is a flowchart of the process for acquiring FAX preview guide screen data in the step S2501. In a step S2511, the CPU 101 acquires a cause which disable the print unit 106 from performing printing. In the present embodiment, the CPU 101 acquires the cause of printing incapability from information on the toner remaining amount of the multifunction peripheral 100, whether or not the small toner remaining amount-time print setting is set to on, a remaining amount of recording sheets, whether or not the print unit 106 is in an error state, and so forth.

In the following step S2512, the CPU 101 determines whether or not a HW operation is required to resolve the cause of printing incapability, which is acquired in the step S2511. If it is determined that a HW operation is required (YES to S2512), the CPU 101 executes a step S2513, whereas if it is determined that a HW operation is not required (NO to S2512), the CPU 101 executes a step S2514. Note that in the present embodiment, only in a case where the toner remaining amount is small and, at the same time, the small toner remaining amount-time print setting is set to off, it is determined that the FAX-received data can be printed without requiring a HW operation.

In the step S2513, the CPU 101 displays on the console section 104 the FAX preview guide screen 2400 which can notify the user that a HW operation is required to resolve the cause of printing incapability, followed by terminating the present process. In the step S2514, the CPU 101 displays the FAX preview guide screen 2410 which can notify the user that a HW operation is not required to resolve the cause of printing incapability on the console section 104, followed by terminating the present process. Thus, it is possible to display the FAX preview guide screen 2400 or the FAX preview guide screen 2410 on the console section 104.

Figure 25C:
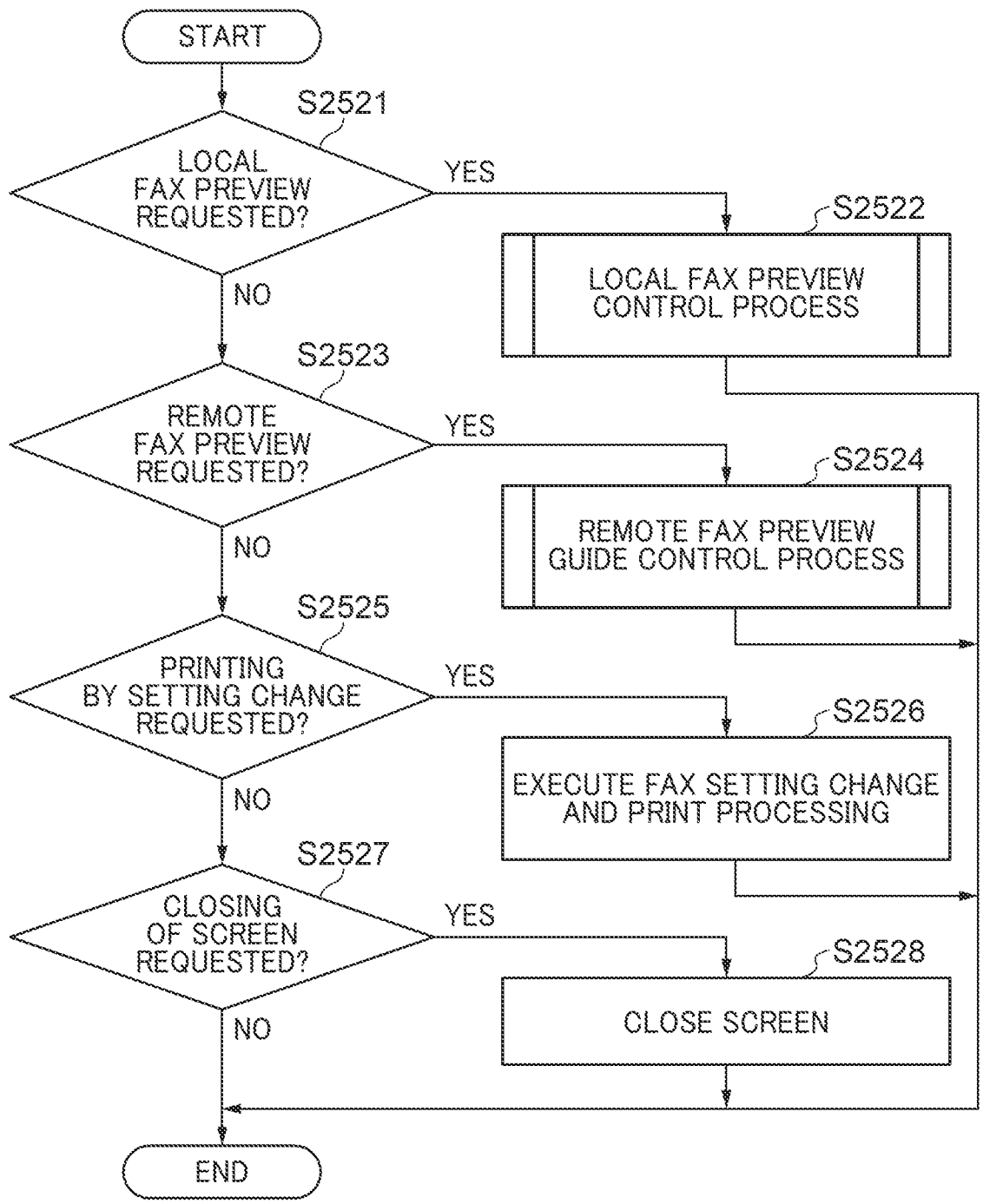
FIG. 25C is a flowchart of a process for controlling the display of the FAX preview guide screen, which is performed in a step of the process in FIG.

FIG. 25C is a flowchart of the process for controlling the display of the FAX preview guide screen in the step S2503. Steps S2521 to S2524 are the same as the steps S904 to S907 in the process for controlling the display of the FAX preview guide screen described with reference to FIG. 9B in the first embodiment, and hence description thereof is omitted.

If the answer to the question of the step S2523 is negative (NO), in a step S2525, the CPU 101 determines whether or not printing by setting change has been requested. If it is determined that printing by setting change has been requested (YES to S2525), in a step S2526, the CPU 101 executes FAX setting change and print processing, followed by terminating the present process. Note that the FAX setting change and print processing refers to processing for changing a setting of continuing printing in a case where the toner remaining amount is small to on and thereby printing the FAX-received data.

If it is determined that printing by setting change has not been requested (NO to S2525), the CPU 101 executes a step S2527. The steps S2527 and S2528 are the same as the steps S908 and S909 in the process for controlling the display of the FAX preview guide screen described with reference to FIG. 9B in the first embodiment, and hence description thereof is omitted. Thus, it is possible to perform the FAX preview and printing of the FAX-received data from the FAX preview guide screens 2400 and 2410.

The present invention has been described heretofore based on the embodiments thereof. However, the present invention is not limited to these specific embodiments, but it is to be understood that the invention includes various forms within the scope of the gist of the present invention. Further, the embodiments of the present invention are described only by way of example, and it is possible to combine the embodiments on an as-needed basis.

For example, although in the above-described embodiments, a method of causing the authentication information to be included in the QR code (two-dimensional code) to thereby skip the authentication processing is employed, a configuration may be employed in which there is employed a method of compelling a user to always execute the authentication processing, without causing the authentication information to be included in the QR code, or in which these methods can be switched. Further, although the QR code is used as the two-dimensional code which can be read by the mobile terminal, a two-dimensional code other than the QR code may be used.

In the above-described embodiments, the timing of closing the FAX preview guide screen is set to a time when the "Close" button is pressed and a time when the FAX-received data is printed. However, this is not limitative, but the FAX preview guide screen may be closed when the QR code is read and an access to the URL indicated by the QR code is detected.

Further, although the print unit 106 performs printing using the electrophotographic method, the printing method is not limited to the electrophotographic method, but any other suitable method may be employed. For example, in a case where an inkjet-type print unit is provided, the above-mentioned "toner remaining amount" is replaced by the "ink remaining amount".

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-124177 filed Aug. 3, 2022, which is hereby incorporated by reference herein in its entirety.

What is claimed is:

1. An image forming apparatus comprising:
 a communication section configured to receive facsimile data;
 a display section;
 a print unit configured to perform printing on a sheet;
 a first determination unit configured to determine whether or not facsimile data received by the communication section can be printed by the print unit; and
 a control unit configured to, in a case where the facsimile data cannot be printed by the print unit, display on the display section a screen for enabling a facsimile image of the facsimile data to be displayed on at least an external device,
 wherein the screen includes a two-dimensional code which enables access to a Web page for causing the facsimile image to be displayed on the external device, and
 wherein the two-dimensional code includes a URL for viewing the facsimile image and authentication information for accessing the image forming apparatus.

2. The image forming apparatus according to claim 1, wherein the screen includes a button for prompting a user to display the facsimile image on the display section.

3. The image forming apparatus according to claim 1, wherein the screen includes:
 a first button for prompting a user to display the facsimile image on the display section, a second button for prompting the user to display the facsimile image on the external device,
a first screen displayed such that the two-dimensional code is not included, and
a second screen displayed such that the two-dimensional code is included, in a case where the second button is tapped on the first screen.

4. The image forming apparatus according to claim 1, wherein the screen includes:
a first button for prompting a user to display the facsimile image on the display section,
a second button for prompting the user to download the facsimile data of the facsimile image to the external device,
a first screen displayed such that the two-dimensional code is not included, and
a second screen displayed such that the two-dimensional code is included, in a case where the second button is tapped on the first screen.

5. The image forming apparatus according to claim 3, wherein the print unit performs printing by an electrophotographic method,
wherein the image forming apparatus further comprises a switching unit configured to switch between on and off of a setting for execution of printing of the facsimile image even in a case where a toner remaining amount in the print unit is small, and
wherein in a case where the setting is set to on, the control unit displays a third button for executing printing of the facsimile image, on the first screen.

6. The image forming apparatus according to claim 1, further comprising a second determination unit configured to determine whether or not an operation of hardware of the image forming apparatus is required so as to enable the print unit to perform printing, and
wherein the control unit changes contents displayed on the screen according to whether or not the operation of the hardware is required.

7. The image forming apparatus according to claim 6, further comprising a switching unit configured to switch between on and off of a setting for execution of printing of the facsimile data even in a case where a toner remaining amount in the print unit is small, and
wherein the print unit performs printing by an electrophotographic method,
wherein a case where the operation of the hardware is not required is a case where the setting is set to off, and
wherein the screen includes, in a case where the operation of the hardware is not required, a button for changing the setting to on to execute printing of the facsimile data.

8. An information processing apparatus comprising:
a communication section configured to receive facsimile data and enable communication with a printer;
a display section;
a determination unit configured to determine whether or not the facsimile data received by the communication section can be printed by the printer; and
a control unit configured to, in a case where the facsimile data cannot be printed by the printer, display on the display section a screen for enabling a facsimile image of the facsimile data to be displayed on at least an external device,
wherein the screen includes a two-dimensional code which enables access to a Web page for causing the facsimile image to be displayed on the external device, and
wherein the two-dimensional code includes a URL for viewing the facsimile image and authentication information for accessing the information processing apparatus.

9. The information processing apparatus according to claim 8, further comprising an acquisition unit configured to acquire a screen size of the display section, and
wherein the control unit changes contents to be displayed on the screen according to the screen size.

10. The information processing apparatus according to claim 9, wherein the screen includes:
in a case where the screen size is large enough to display the facsimile image,
a first button for prompting a user to display the facsimile image on the display section,
a second button for prompting the user to display the facsimile image on the external device, and
a first screen displayed such that the two-dimensional code is not included, and
in a case where the screen size is not large enough to display the facsimile image,
a second screen displayed such that the second button is included and the first button and the two-dimensional code are not included,
the screen further including a third screen displayed, in a case where the second button is tapped on the first screen or the second screen, such that the two-dimensional code is included.

11. A method of controlling an image forming apparatus including:
a communication section configured to receive facsimile data,
a display section, and
a print unit configured to perform printing on a sheet, the method comprising:
determining whether or not facsimile data received by the communication section can be printed by the print unit; and
displaying, in a case where the facsimile data cannot be printed by the print unit, on the display section a screen for enabling a facsimile image of the facsimile data to be displayed on at least an external device,
wherein the screen includes a two-dimensional code which enables access to a Web page for causing the facsimile image to be displayed on the external device, and
wherein the two-dimensional code includes a URL for viewing the facsimile image and authentication information for accessing the image forming apparatus.

12. A method of controlling an information processing apparatus including:
a communication section configured to receive facsimile data and enable communication with a printer, and
a display section,
the method comprising:
determining whether or not the facsimile data received by the communication section can be printed by the printer; and
displaying, in a case where the facsimile data cannot be printed by the printer, on the display section a screen for enabling a facsimile image of the facsimile data to be displayed on at least an external device,
wherein the screen includes a two-dimensional code which enables access to a Web page for causing the facsimile image to be displayed on the external device, and wherein the two-dimensional code includes a URL for viewing the facsimile image and authentication information for accessing the information processing apparatus.

13. A non-transitory computer-readable storage medium storing a program for causing a computer to execute a method of controlling an image forming apparatus including:
a communication section configured to receive facsimile data,
a display section, and
a print unit configured to perform printing on a sheet,
wherein the method comprises:
determining whether or not facsimile data received by the communication section can be printed by the print unit; and
displaying, in a case where the facsimile data cannot be printed by the print unit, on the display section a screen for enabling a facsimile image of the facsimile data to be displayed on at least an external device,
wherein the screen includes a two-dimensional code which enables access to a Web page for causing the facsimile image to be displayed on the external device, and
wherein the two-dimensional code includes a URL for viewing the facsimile image and authentication information for accessing the image forming apparatus.

14. A non-transitory computer-readable storage medium storing a program for causing a computer to execute a method of controlling an information processing apparatus including:
a communication section configured to receive facsimile data and enable communication with a printer, and
a display section,
wherein the method comprises:
determining whether or not the facsimile data received by the communication section can be printed by the printer; and
displaying, in a case where the facsimile data cannot be printed by the printer, on the display section a screen for enabling a facsimile image of the facsimile data to be displayed on at least an external device,
wherein the screen includes a two-dimensional code which enables access to a Web page for causing the facsimile image to be displayed on the external device, and
wherein the two-dimensional code includes a URL for viewing the facsimile image and authentication information for accessing the information processing apparatus.

* * * * *